US012809129B2

(12) United States Patent

Lim et al.

(10) Patent No.: US 12,809,129 B2

(45) Date of Patent: Nov. 24, 2026

(54) OPTICAL IMAGING SYSTEM

(71) Applicants: Samsung Electro-Mechanics Co., Ltd., Suwon-si (KR); Kumoh National Institute of Technology Industry-Academic Cooperation Foundation, Gumi-si (KR)

(72) Inventors: Tae Yeon Lim, Suwon-si (KR); Jae Myung Ryu, Gumi-si (KR); Yong Joo Jo, Suwon-si (KR); Phil Ho Jung, Suwon-si (KR)

(73) Assignees: Samsung Electro-Mechanics Co., Ltd., Suwon-si (KR); Kumoh National Institute of Technology Industry-Academic Cooperation Foundation, Gumi-si (KR)

( * ) Notice: Subject to any disclaimer, the term of this patent is extended or adjusted under 35 U.S.C. 154(b) by 310 days.

(21) Appl. No.: 18/588,921

(22) Filed: Feb. 27, 2024

(65) Prior Publication Data

US 2024/0295719 A1 Sep. 5, 2024

(30) Foreign Application Priority Data

Mar. 3, 2023 (KR) ........................ 10-2023-0028509

(51) Int. Cl.
*G02B 13/00* (2006.01)
*G02B 1/04* (2006.01)
(Continued)

(52) U.S. Cl.
CPC ......... *G02B 13/0045* (2013.01); *G02B 1/041* (2013.01); *G02B 3/00* (2013.01);
(Continued)

(58) Field of Classification Search
None
See application file for complete search history.

(56) References Cited

U.S. PATENT DOCUMENTS 8,767,311 B2 7/2014 Mimura et al.
2007/0139786 A1 * 6/2007 Iwasawa .............. G02B 13/007 359/676

(Continued)

FOREIGN PATENT DOCUMENTS

CN 112612125 A 4/2021
JP 2014-48488 A 3/2014
JP 2016-126086 A 7/2016

OTHER PUBLICATIONS

Chinese Office Action issued on Aug. 11, 2026, in counterpart Chinese Patent Application No. 202410240060.4 (4 pages in English, 6 pages in Chinese).

*Primary Examiner* — Richard H Kim
(74) *Attorney, Agent, or Firm* — NSIP Law

(57) ABSTRACT

An optical imaging system includes a first lens group, a second lens group, a third lens group, and a fourth lens group sequentially disposed in ascending numerical order along an optical axis of the optical imaging system from an object side of the optical imaging system toward an image side of the optical imaging system, at least one lens group among the first lens group to the fourth lens group being configured to be movable along the optical axis; and a reflective member disposed on an object side of the first lens group and comprising a reflective surface configured to change an optical path, wherein the first lens group has a positive refractive power, and $0.8 \leq Fnot/Fnow \leq 1.3$ is satisfied, where Fnot is an F-number of the optical imaging system in a telephoto mode, and Fnow is an F-number of the optical imaging system in a wide-angle mode.

23 Claims, 30 Drawing Sheets

(51) Int. Cl.
*G02B 3/00* (2006.01)
*G02B 7/105* (2021.01)
*G02B 9/64* (2006.01)

(52) U.S. Cl.
CPC ............... *G02B 7/105* (2013.01); *G02B 9/64* (2013.01); *G02B 2003/0093* (2013.01)

(56) References Cited

U.S. PATENT DOCUMENTS

| | | | |
|---|---|---|---|
| 2009/0052052 | A1 | 2/2009 | Yamano |
| 2017/0184825 | A1 | 6/2017 | Yokoyama et al. |
| 2022/0035132 | A1 | 2/2022 | Wang et al. |

* cited by examiner

OPTICAL IMAGING SYSTEM

CROSS-REFERENCE TO RELATED APPLICATIONS

This application claims the benefit under 35 USC 119(a) of Korean Patent Application No. 10-2023-0028509 filed on Mar. 3, 2023, in the Korean Intellectual Property Office, the entire disclosure of which is incorporated herein by reference for all purposes.

BACKGROUND

1. Field

The present disclosure relates to an optical imaging system.

2. Description of Related Art

A camera module has become a basic feature in a portable electronic device, including a smartphone.

In order to simulate an optical zoom effect, a method of providing a plurality of camera modules having different focal lengths in a portable electronic device has been proposed.

However, this method not only requires a plurality of camera modules to simulate the optical zoom effect, but the plurality of camera modules have different fields of view, so that when an image is captured at a medium magnification, imaging processing through software rather than optical zoom is needed, resulting in a reduction in image quality.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens group, a second lens group, a third lens group, and a fourth lens group sequentially disposed in ascending numerical order along an optical axis of the optical imaging system from an object side of the optical imaging system toward an image side of the optical imaging system, at least one lens group among the first lens group to the fourth lens group being configured to be movable along the optical axis; and a reflective member disposed on an object side of the first lens group and including a reflective surface configured to change an optical path of the optical imaging system, wherein the first lens group may have a positive refractive power, and $0.8 \leq Fnot/Fnow \leq 1.3$ is satisfied, where Fnot is an F-number of the optical imaging system in a telephoto mode of the optical imaging system, and Fnow is an F-number of the optical imaging system in a wide-angle mode of the optical imaging system.

The first lens group may include a first lens and a second lens sequentially disposed in ascending numerical order along the optical axis from an object side of the first lens group toward an image side of the first lens group, and one of the first lens and the second lens may have a positive focal length and an Abbe number of 50 or more, and another one of the first lens and the second lens may have a negative focal length and an Abbe number of 30 or less.

All lenses included in the first lens group to the fourth lens group may be made of plastic.

All lenses included in the first lens group to the fourth lens group may have a refractive index of 1.7 or less and an Abbe number between 20 and 60.

The second lens group may have a negative refractive power, may include at least two lenses, and may be configured to move away from the object side of the optical imaging system toward the image side of the optical imaging system to narrow a field of view of the optical imaging system.

The first lens group and the third lens group may be fixedly disposed, and the fourth lens group may be configured to move along the optical axis to correct a focus position of the optical imaging system.

$-1.2 \leq fG2/fG4 \leq -0.7$ may be satisfied, where fG2 is a focal length of the second lens group, and fG4 is a focal length of the fourth lens group.

$LG34/LG3i \leq 0.4$ may be satisfied, where LG34 is a distance along the optical axis from an image-side surface of a rearmost lens among lenses included in the third lens group to an object-side surface of a frontmost lens among lenses included in the fourth lens group in the telephoto mode, and LG3i is a distance along the optical axis from an object-side surface of a frontmost lens among lenses included in the third lens group to an imaging plane of the optical imaging system.

$0.3 \leq LG3i/L \leq 0.7$ may be satisfied, where LG3i is a distance along the optical axis from an object-side surface of a frontmost lens among lenses included in the third lens group to an imaging plane of the optical imaging system, and L is a distance along the optical axis from a first surface of the reflective member to the imaging plane.

Each of the third lens group and the fourth lens group may have a positive refractive power.

The third lens group may include a stop and a plurality of lenses sequentially disposed from an object side of the third lens group toward an image side of the third lens group, and a lens disposed closest to the stop among the plurality of lenses included in the third lens group may have a positive refractive power.

$SD/IMG\ HT \leq 1.2$ may be satisfied, where SD is a radius of the stop, and IMG HT is one half of a diagonal length of an imaging plane of the optical imaging system.

The third lens group may include two lenses, one of the two lenses of the third lens group may have a positive focal length and an Abbe number of 50 or more, and another one of the two lenses of the third lens group may have a negative focal length and an Abbe number of 30 or less.

$EPDt/(2 \times IMG\ HT) \leq 1.5$ may be satisfied, where EPDt is an entrance pupil diameter of the optical imaging system in the telephoto mode, and IMG HT is one half of a diagonal length of an imaging plane of the optical imaging system.

The fourth lens group may include a lens having an Abbe number greater than 50.

The first lens group may include at least one lens having a meniscus shape that is convex toward the object side of the optical imaging system, the second lens group may include a lens having a meniscus shape that is convex toward the image side of the optical imaging system, the third lens group may include a lens having a meniscus shape that is convex toward the object side of the optical imaging system, and the fourth lens group may include a lens having a meniscus shape that is convex toward the object side of the optical imaging system.

In another general aspect, an optical imaging system includes a first lens group having a positive refractive power, a second lens group having a negative refractive power, a third lens group having a positive refractive power, and a fourth lens group having a positive refractive power sequentially disposed in ascending numerical order along an optical axis of the optical imaging system from an object side of the optical imaging system toward an image side of the optical imaging system, at least one lens group among the first lens group to the fourth lens group being configured to be movable along the optical axis to change a focal length of the optical imaging system between a wide-angle mode and a telephoto mode; and a reflective member disposed on an object side of the first lens group and including a reflective surface configured to change an optical path of the optical imaging system, wherein $LG34/LG3i \leq 0.4$ is satisfied, where LG34 is a distance along the optical axis from an image-side surface of a rearmost lens among lenses included in the third lens group to an object-side surface of a frontmost lens among lenses included in the fourth lens group in the telephoto mode, and LG3i is a distance along the optical axis from an object-side surface of a frontmost lens among lenses included in the third lens group to an imaging plane of the optical imaging system.

$0.8 \leq Fnot/Fnow \leq 1.3$ may be satisfied, where Fnot is an F-number of the optical imaging system in the telephoto mode, and Fnow is an F-number of the optical imaging system in the wide-angle mode.

The first lens group may include a first lens and a second lens sequentially disposed in ascending numerical order along the optical axis from an object side of the first lens group toward an image side of the first lens group, and one of the first lens and the second lens may have a positive focal length and an Abbe number of 50 or more, and another one of the first lens and the second lens may have a negative focal length and an Abbe number of 30 or less.

The third lens group may include a stop and a plurality of lenses sequentially disposed from an object side of the third lens group toward an image side of the third lens group, and a lens disposed closest to the stop among the plurality of lenses included in the third lens group may have a positive refractive power.

In another general aspect, an optical imaging system includes a first lens group having a positive refractive power, a second lens group having a negative refractive power, a third lens group having a positive refractive power, and a fourth lens group having a positive refractive power sequentially disposed in ascending numerical order along an optical axis of the optical imaging system from an object side of the optical imaging system toward an image side of the optical imaging system, at least one lens group among the first lens group to the fourth lens group being configured to be movable along the optical axis to change a focal length of the optical imaging system between a wide-angle mode and a telephoto mode, and at least other lens group among the first lens group to the fourth lens group being configured to be movable along the optical axis to change a focal position of the optical imaging system; and a reflective member disposed on an object side of the first lens group and including a reflective surface configured to change an optical path of the optical imaging system, wherein $0.3 \leq LG3i/L \leq 0.7$ is satisfied, where LG3i is a distance along the optical axis from an object-side surface of a frontmost lens among lenses included in the third lens group to an imaging plane of the optical imaging system, and L is a distance along the optical axis from a first surface of the reflective member to the imaging plane.

$0.8 \leq Fnot/Fnow \leq 1.3$ may be satisfied, where Fnot is an F-number of the optical imaging system in the telephoto mode, and Fnow is an F-number of the optical imaging system in the wide-angle mode.

$-1.2 \leq fG2/fG4 \leq -0.7$ may be satisfied, where fG2 is a focal length of the second lens group, and fG4 is a focal length of the fourth lens group.

The first lens group may include at least one lens having a meniscus shape that is convex toward the object side of the optical imaging system, the second lens group may include a lens having a meniscus shape that is convex toward the image side of the optical imaging system, the third lens group may include a lens having a meniscus shape that is convex toward the object side of the optical imaging system, and the fourth lens group may include a lens having a meniscus shape that is convex toward the object side of the optical imaging system.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
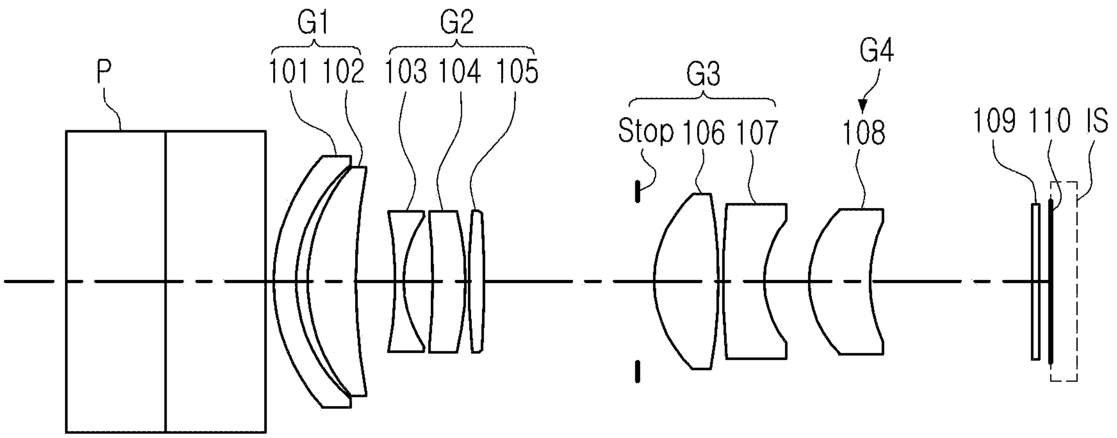
FIG. 1 is a diagram illustrating a wide-angle mode of an optical imaging system according to a first embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In the lens configuration diagrams in the drawings, the thicknesses, sizes, and shapes of the lenses may be illustrated in a somewhat exaggerated manner for explanatory purposes, and in particular, the spherical or aspherical shapes shown in the lens configuration diagrams are only presented as examples, and are not limited thereto.

An optical imaging system according to an embodiment of the present disclosure may be mounted in a portable electronic device. For example, the optical imaging system may be a component of a camera module mounted in a portable electronic device. The portable electronic device may be a mobile communication terminal, a smartphone, a tablet PC, or any other portable electronic device.

In an optical imaging system according to an embodiment of the present disclosure, a first lens (or a frontmost lens) refers to a lens closest to an object side of the optical imaging system, and a last lens (or a rearmost lens) refers to a lens closest to an image side (or an imaging plane or an image sensor) of the optical imaging system.

In addition, in each lens of the optical imaging system, a first surface (or an object-side surface) refers to a surface closest to the object side of the optical imaging system, and a second surface refers to a surface closest to the image side of the optical imaging system.

In addition, in the present specification, all numerical values of radiuses of curvature, thicknesses, distance, focal lengths, and other dimensions are represented in millimeters, and fields of view (FOV) are represented in degrees.

Additionally, in an explanation of the shape of each lens, a statement that a surface of a lens is convex means that the surface is convex in a paraxial region of the surface, and a statement that a surface of a lens is concave means that the surface is concave in a paraxial region of the surface.

Accordingly, even if a surface of a lens is described as having a convex shape, an edge portion of the surface may have a concave shape. Similarly, even if a surface of a lens is described as having a concave shape, an edge portion of the surface may have a convex shape.

A paraxial region of a lens surface is a central portion of the lens surface surrounding the optical axis of the lens surface in which light rays incident to the lens surface make a small angle θ to the optical axis, and the approximations sin θ≈θ, tan θ≈θ, and cos θ≈1 are valid.

An imaging plane may refer to an imaginary plane on which an image is focused by the optical imaging system. Alternatively, the imaging plane may refer to a surface of an image sensor on which light is incident through the optical imaging system.

An optical imaging system according to an embodiment of the present disclosure includes a plurality of lens groups. As an example, the optical imaging system may include a first lens group, a second lens group, a third lens group, and a fourth lens group.

Each of the first lens group, the second lens group, and the third lens group includes a plurality of lenses. As an example, the optical imaging system includes at least eight lenses.

In an embodiment, the optical imaging system includes a first lens, a second lens, a third lens, a fourth lens, a fifth lens, a sixth lens, a seventh lens, and an eighth lens sequentially disposed in ascending numerical order along an optical axis of the optical imaging system from an object side of the optical imaging system toward an image side of the optical imaging system.

The optical imaging system may further include a reflective member having a reflective surface for changing an optical path. For example, the reflective member may be a mirror or a prism.

By bending the optical path with the reflective member, a long optical path may be formed in a relatively narrow space. The reflective member is disposed in front of the first lens group.

Therefore, the optical imaging system may be miniaturized and may be made to have a long focal length.

In addition, the optical imaging system may further include an image sensor for converting an incident image of a subject into an electrical signal.

In addition, the optical imaging system may further include an infrared cut-off filter (hereinafter, referred to as a filter) to block infrared rays. The filter may be disposed between the rearmost lens and the image sensor.

In addition, the optical imaging system may further include a stop disposed between the second lens group and the third lens group. In an embodiment, the stop may be disposed between the fifth lens and the sixth lens.

In an embodiment, the first lens group may include a first lens and a second lens, the second lens group may include a third lens, a fourth lens, and a fifth lens, the third lens group may include a sixth lens and a seventh lens, and the fourth lens group may include an eighth lens. The third lens group may further include a stop disposed in front of the sixth lens.

At least one lens group among the first to fourth lens groups may be moved to change a total focal length of the imaging optical system.

For example, a distance between the first lens group and the second lens group may be variable. For example, the first lens group may be fixedly disposed, and the second lens group may be disposed to be movable along the optical axis of the optical imaging system. direction. As the second lens group moves along the optical axis away from the object side of the optical imaging system toward the image side of the optical imaging system, the total focal length of the optical imaging system is changed from a wide-angle mode to a telephoto mode.

Since the first lens group is located at the front of the optical imaging system, it is easy to implement waterproofing and dustproofing when the first lens group is fixedly disposed.

The first lens group has a positive refractive power overall, and includes at least one lens having a meniscus shape that is convex toward the object side of the optical imaging system.

In an embodiment, the first lens group may include two lenses (e.g., a first lens and a second lens).

The first lens may have a meniscus shape that is convex toward the object side of the optical imaging system. In addition, the second lens may have a meniscus that is convex toward object side the object side of the optical imaging system, or a shape in which both surfaces thereof are convex.

The first lens and the second lens have refractive powers having opposite signs, and a composite focal length of the first lens and the second lens has a positive value.

In addition, the first lens and the second lens may be made of materials having different optical properties. For example, the first lens may be made of a material having a low dispersion coefficient, and the second lens may be made of a material having a high dispersion coefficient. Therefore, a chromatic aberration correction ability of the optical image can be improved. The dispersion coefficient may also be called an Abbe Number.

In an embodiment, the Abbe number of one of the first lens and the second lens may be 50 or more, and the Abbe number of the other one of the first lens and the second lens may be 30 or less.

In an embodiment, the Abbe number of a lens having a positive refractive power among the first lens and the second lens may be 50 or more, and the Abbe number of a lens having a negative refractive power among the first lens and the second lens may be 30 or less.

The second lens group includes a plurality of lenses, and has a negative refractive power overall. The second lens group includes at least one lens having a meniscus shape that is convex toward the image side of the optical imaging system.

In an embodiment, the second lens group includes a third lens, a fourth lens, and a fifth lens. The third lens may have a negative refractive power, and both surfaces of the third lens may be concave. The fourth lens may have a positive refractive power, and may have a meniscus shape that is convex toward the image side of the optical imaging system. The fifth lens may have a positive refractive power, and may have a shape in which both surfaces of the fifth lens are convex, or a meniscus shape that is convex toward the object side of the optical imaging system.

The third lens group includes a stop and a plurality of lenses, and has a positive refractive power overall. The third lens group includes at least one lens having a meniscus shape that is convex toward the object side of the optical imaging system.

Among the plurality of lenses included in the third lens group, a lens disposed closest to a stop (e.g., a lens located directly behind the stop) has a positive refractive power.

A combined focal length of the first lens group and the second lens group may have a negative value. That is, since light passing through the first and second lens groups diverges, among the lenses included in the third lens group, the lens disposed closest to the stop is set to have a positive refractive power so that a diameter of lenses disposed therebehind may be reduced.

In addition, the lens disposed closest to the stop (e.g., the lens located directly behind the stop) has an aspherical surface.

The third lens group may include at least two lenses made of materials having different optical properties. For example, the third lens group may include a lens having an Abbe number of 50 or more and a lens having an Abbe number of 30 or less.

The lens having an Abbe number 50 or more may be disposed closer to the second lens group than the lens having an Abbe number 30 or less. The lens having an Abbe number of 50 or more may have a positive refractive power, and the lens having an Abbe number of 30 or less may have a negative refractive power.

In an embodiment, the third lens group includes a stop, a sixth lens, and a seventh lens.

The sixth lens has a shape in which both surfaces thereof may be convex and has a positive refractive power. The seventh lens may have a meniscus shape that is convex toward the object side of the optical imaging system and may have a negative refractive power.

The third lens group may be fixedly disposed so that it does not move when the second lens group is moved to change a total focal length of the optical imaging system.

The fourth lens group includes at least one lens and has a positive refractive power overall. The fourth lens group includes at least one lens having a meniscus shape that is convex toward the object side of the optical imaging system.

The fourth lens group may include at least one lens having an Abbe number of 50 or more.

In an embodiment, the fourth lens group includes an eighth lens.

The eighth lens has a meniscus shape that is convex toward the object side of the optical imaging system and may have a positive refractive power.

All of the lenses included in the first to fourth lens groups may be made of plastic. In an embodiment, all of the lenses included in the first to fourth lens groups may have a refractive index of 1.7 or less and an Abbe number of 20 to 60.

At least one lens group among the first to fourth lens groups may be moved to correct a focus position according to a change in the total focal length of the optical imaging system.

For example, the fourth lens group may be disposed to be movable along the optical axis of the optical imaging system. As the fourth lens group moves along the optical axis, a distance between the third lens group and the fourth lens group and a distance between the fourth lens group and the image sensor are changed.

When the total focal length of the optical imaging system is changed from the wide-angle mode to the telephoto mode by moving the second lens group along the optical axis, the fourth lens group is also moved along the optical axis to correct a focus position.

More specifically, when the second lens group is moved along the optical axis to change the total focal length of the optical imaging system, thereby performing an optical zoom function, the fourth lens group is also moved along the optical axis to correct the focus position as the total focal length of the optical imaging system changes.

Therefore, the optical imaging system according to an embodiment of the present disclosure has an optical zoom function.

The optical imaging system according to an embodiment of the present disclosure has characteristics of a telephoto lens having a relatively narrow field of view and a long focal length.

Lenses included in the first to fourth lens groups have at least one aspherical surface.

For example, each of the first to eighth lenses may have at least one aspherical surface.

That is, at least one of an object-side surface and an image-side surface of the first to eighth lenses may be aspherical. The aspherical surfaces of the first to eighth lenses are represented by Equation 1 below.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30} \quad (1)$$

In Equation 1, c is a curvature of the lens and is equal to a reciprocal of a radius of curvature of the lens surface at an optical axis of the lens surface, K is a conic constant, and Y is a distance from any point on the aspherical surface of the lens to the optical axis. In addition, constants A to H, J, and L to P are aspherical surface coefficients. Z (also known as sag) is a distance in a direction parallel to an optical axis direction between the point on the aspherical surface of the lens at the distance Y from the optical axis of the aspherical surface to a tangential plane perpendicular to the optical axis and intersecting a vertex of the aspherical surface.

The optical imaging system according to an embodiment of the present disclosure may further include a reflective member having a reflective surface for changing an optical path. As an example, the reflective member may be a mirror or a prism.

By bending the optical path with the reflective member, a long optical path may be formed in a relatively narrow space.

The reflective member is disposed in front of the first lens group. The reflective member may be rotated around two axes to correct shaking during shooting.

That is, when shaking occurs due to factors such as a user's hand shaking when shooting an image or a video, the shaking may be compensated by rotating the reflective member around the two axes in response to the shaking.

Since the reflective member has a relatively lighter weight than the optical imaging system, shaking may be easily compensated with less driving force by moving the reflective member rather than the entire optical imaging system.

The optical imaging system according to an embodiment of the present disclosure may satisfy any one or any combination of any two or more of the following conditional expressions.

$$SD/IMG \leq 1.2 \quad \text{(Conditional Expression 1)}$$

$$EPDt/(2 \times IMG\ HT) \leq 1.5 \quad \text{(Conditional Expression 2)}$$

$$0.3 \leq LG3i/L \leq 0.7 \quad \text{(Conditional Expression 3)}$$

-continued $$LG34/LG3i \leq 0.4 \quad \text{(Conditional Expression 4)}$$

$$-1.2 \leq fG2/fG4 \leq -0.7 \quad \text{(Conditional Expression 5)}$$

$$0.8 \leq Fnot/Fnow \leq 1.3 \quad \text{(Conditional Expression 6)}$$

In an embodiment, the optical imaging system may satisfy the conditional expression SD/IMG HT≤1.2, where SD is a radius of the stop, and IMG HT one half of a diagonal length of the imaging plane.

Since the optical imaging system includes a reflective member, an optical path of light incident on the reflective member is changed by 90° by the reflective member to be incident on a plurality of lenses. This enables optical axes of the plurality of lenses to be disposed perpendicular to a thickness direction of a portable electronic device so that the number of lenses does not affect the thickness of the portable electronic device. However, in this case, diameters of the plurality of lenses may affect the thickness of the portable electronic device.

Therefore, the optical imaging system may satisfy the conditional expression SD/IMG HT≤1.2 so that the diameter of the plurality of lenses may be reduced while securing an appropriate level of resolution.

In an embodiment, the optical imaging system may satisfy the conditional expression EPDt/(2×IMG HT)≤1.5, where EPDt is an entrance pupil diameter in the telephoto mode.

If the entrance pupil becomes too large in the telephoto mode, an amount of light increases and images may be taken brightly, but aberrations rapidly increase and resolution deteriorates. Therefore, the optical imaging system may satisfy the conditional expression EPDt/(2×IMG HT)≤1.5 so that aberrations may be easily corrected while capturing sufficiently bright images.

In an embodiment, the optical imaging system may satisfy the conditional expression 0.3≤LG3i/L≤0.7, where LG3i is a distance on the optical axis from an object-side surface of the first lens among lenses included in the third lens group to an imaging plane, and L is a distance on the optical axis from the first surface of the reflective member to the imaging plane.

This condition is related to an amount of movement of the second lens group, which is a variator. The optical imaging system may satisfy the conditional expression 0.3≤LG3i/L≤0.7 so that a distance between the first lens group and the third lens group may set to an appropriate value.

If LG3i/L is less than the lower limit of 0.3 of the conditional expression 0.3≤LG3i/L≤0.7, the amount of movement of the second lens group may be too small to enable aberrations to be sufficiently corrected. Conversely, if LG3i/L is greater than the upper limit of 0.7 of the conditional expression 0.3≤LG3i/L≤0.7, the amount of movement of the second lens group may be large enough to enable aberrations to be sufficiently corrected, but there is a problem a total track length of the optical system becomes too long.

In an embodiment, the optical imaging system may satisfy the conditional expression LG34/LG3i≤0.4, where LG34 is a distance on the optical axis from an image-side surface of the last lens among lenses included in the third lens in a telephoto mode to an object-side surface of the first lens among lenses included in the fourth lens group, and LG3i is a distance on the optical axis from an object-side surface of the first lens among lenses included in the third lens group to an imaging plane.

The fourth lens group may be moved to correct a focus position according to a change in a total focal length of the optical imaging system. The optical imaging system may satisfy the conditional expression LG34/LG3i≤0.4 so that even if the total focal length is changed, it is possible to ensure that there is no change in field curvature.

In an embodiment, the optical imaging system may satisfy the conditional expression −1.2≤fG2/fG4≤−0.7, where fG2 is a focal length of the second lens group, and fG4 is a focal length of the fourth lens group.

The second lens group and the fourth lens group are configured to move along the optical axis. If a difference in focal length between the second and fourth lens groups is large, there is a problem in which assembly sensitivity of the second or fourth lens group increases.

For example, fG2/fG4 is greater than the upper limit of −0.7 of the conditional expression-1.2≤fG2/fG4≤−0.7, the focal length of the second lens group is relatively short and the focal length of the fourth lens group is relatively long. In this case, the assembly sensitivity of the second lens group increases. Conversely, it fG2/fG4 is less than the lower limit of −1.2 of the conditional expression-1.2≤fG2/fG4≤−0.7, the focal length of the second lens group may be relatively long and the focal length of the fourth lens group may be relatively short. In this case, the assembly sensitivity of the fourth lens group increases.

In an embodiment, the optical imaging system may satisfy the conditional expression 0.8≤Fnot/Fnow≤1.3, where Fnot is an Fno of the optical imaging system in the telephoto mode, and Fnow is an Fno of the optical imaging system in the wide-angle mode.

Generally, the Fno in the telephoto mode is larger than the Fno in the wide-angle mode. As the Fno of the optical imaging system increases, the amount of light decreases, resulting in a darker image. In this case, the image quality is more affected by shaking such as the user's hand shaking. Therefore, it is necessary to design the optical imaging system so that the difference in Fno between the wide-angle mode and the telephoto mode is reduced. Therefore, the optical imaging system can relatively reduce the change in Fno due to magnification by satisfying the conditional expression 0.8≤Fnot/Fnow≤1.

Figure 2:
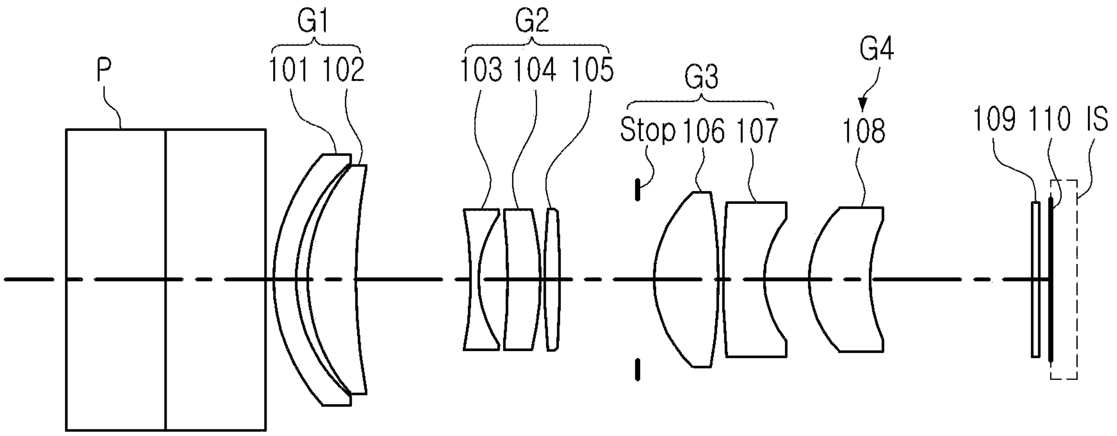
FIG. 2 is a diagram illustrating a normal mode of the optical imaging system of FIG. 1.
Figure 3:
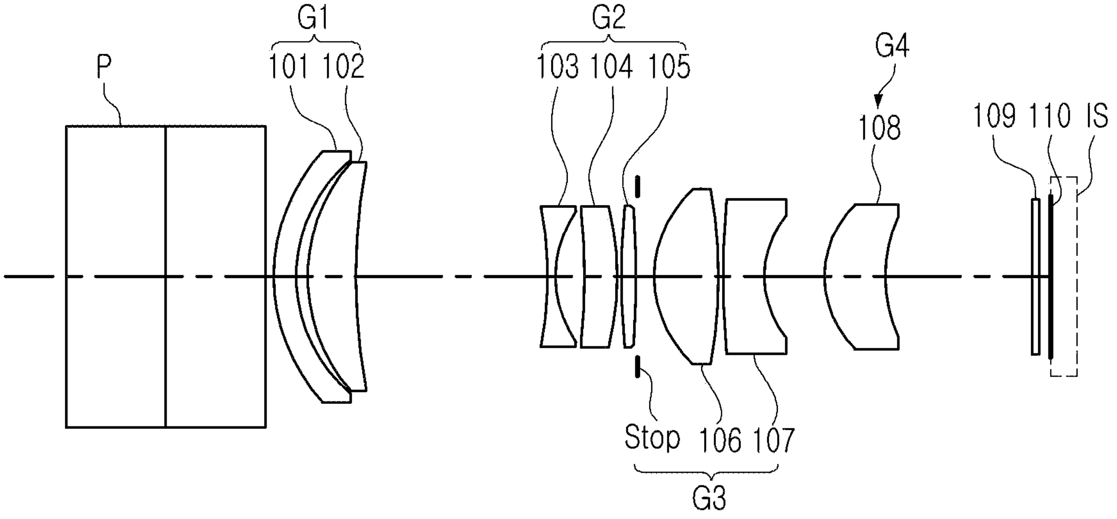
FIG. 3 is a diagram illustrating a telephoto mode of the optical imaging system of FIG. 1.

FIG. 1 is a diagram illustrating a wide-angle mode of an optical imaging system according to a first embodiment of the present disclosure, FIG. 2 is a diagram illustrating a normal mode of the optical imaging system of FIG. 1, and FIG. 3 is a diagram illustrating a telephoto mode of the optical imaging system of FIG. 1.

An optical imaging system according to a first embodiment of the present disclosure will be described with reference to FIGS. 1 to 3.

The optical imaging system according to the first embodiment of the present disclosure includes a first lens group G1, a second lens group G2, a third lens group G3, and a fourth lens group G4. The optical imaging system further includes a reflective member P disposed in front of the first lens group G1.

The first lens group G1 includes a first lens 101 and a second lens 102, the second lens group G2 includes a third lens 103, a fourth lens 104, and a fifth lens 105, the third lens group G3 includes a stop, a sixth lens 106, and a seventh lens 107, and the fourth lens group G4 includes an eighth lens 108 sequentially disposed from an object side of the optical imaging system.

In addition, the optical imaging system may further include a filter 109 and an image sensor IS.

The optical imaging system according to the first embodiment of the present disclosure may focus an image on an imaging plane 110. The imaging plane 110 may refer to a surface on which an image is focused by the optical imaging system. As an example, the imaging plane 110 may refer to one surface of the image sensor IS on which light is incident through the optical imaging system.

In the first embodiment of the present disclosure, the reflective member P may be a prism, but may also be provided as a mirror.

At least one lens group among the first to fourth lens groups G1 to G4 may be moved to change a total focal length of the optical imaging system. For example, the first lens group G1 and the third lens group G3 are fixed and the second lens group G2 is movable along the optical axis so that the total focal length of the optical imaging system may be changed. That is, as the second lens group G2 moves away from the object side of the optical imaging system toward an image side of the optical imaging system, the total focal length of the optical imaging system may be changed from the wide-angle mode to the normal mode, and then from the normal mode to the telephoto mode.

In addition, at least one lens group among the first to fourth lens groups G1 to G4 may be moved to correct a focus position according to a change in the total focal length of the optical imaging system. For example, when the total focal length of the optical imaging system is changed from the wide-angle mode to the telephoto mode, the fourth lens group G4 may be moved along the optical axis to correct the focus position.

Characteristics of each lens including a radius of curvature, a thickness of a lens or a distance between lenses, a refractive index, an Abbe number, and an effective radius are illustrated in Table 1 below.

TABLE 1

| Surface No. | Element | Radius of Curvature | Thickness or Distance | Refractive Index | Abbe Number | Effective Radius | Lens Group |
|---|---|---|---|---|---|---|---|
| Object | | Infinity | D0 | | | | |
| S1 | Prism | Infinity | 4 | 1.5168 | 64.2 | 6 | |
| S2 | | Infinity | 4 | 1.5168 | 64.2 | 5.64 | |
| S3 | | Infinity | 0.4 | | | 5.35 | |
| S4 | First | 7.693 | 0.8 | 1.6355 | 23.89 | 5.1 | |
| S5 | Lens | 5.685 | 0.501 | | | 4.7 | |
| S6 | Second | 7.133 | 2.06 | 1.535 | 55.73 | 4.7 | First |
| S7 | Lens | 41.454 | D1 | | | 4.57 | Lens Group |

TABLE 1-continued

| Surface No. | Element | Radius of Curvature | Thickness or Distance | Refractive Index | Abbe Number | Effective Radius | Lens Group |
|---|---|---|---|---|---|---|---|
| S8 | Third | −17.163 | 0.34 | 1.535 | 55.73 | 2.9 | Second |
| S9 | Lens | 4.916 | 1.211 | | | 2.66 | Lens |
| S10 | Fourth | −38.869 | 1.32 | 1.535 | 55.73 | 2.69 | Group |
| S11 | Lens | −18.883 | 0.15 | | | 2.9 | |
| S12 | Fifth | 24.963 | 0.55 | 1.6355 | 23.89 | 2.9 | |
| S13 | Lens | −559.862 | D2 | | | 2.9 | |
| S14 | Stop | Infinity | 0.763 | | | 3.35 | Third |
| S15 | Sixth | 4.772 | 2.52 | 1.535 | 55.73 | 3.59 | Lens |
| S16 | Lens | −26.426 | 0.213 | | | 3.4 | Group |
| S17 | Seventh | 15.433 | 1.65 | 1.6355 | 23.89 | 3.15 | |
| S18 | Lens | 3.658 | D3 | | | 2.5 | |
| S19 | Eighth | 4.297 | 2.5 | 1.535 | 55.73 | 2.95 | Fourth |
| S20 | Lens | 11.29 | D4 | | | 2.55 | Lens Group |
| S21 | Filter | Infinity | 0.21 | 1.5168 | 64.2 | 3.19 | |
| S22 | | Infinity | D5 | | | 3.21 | |
| S23 | Imaging Plane | Infinity | | | | | |

TABLE 2

| Object at Infinity | | | | Object at Near Focus Position | | | |
|---|---|---|---|---|---|---|---|
| Value | Wide-Angle Mode | Normal Mode | Telephoto Mode | Value | Wide-Angle Mode | Normal Mode | Telephoto Mode |
| D0 | Infinity | Infinity | Infinity | D0 | 400 | 400 | 600 |
| D1 | 1.45734 | 4.50949 | 7.56166 | D1 | 1.45734 | 4.50949 | 7.56166 |
| D2 | 6.20432 | 3.15217 | 0.1 | D2 | 6.20432 | 3.15217 | 0.1 |
| D3 | 1.77104 | 1.8555 | 2.40407 | D3 | 1.50452 | 1.40975 | 1.89978 |
| D4 | 6.57901 | 6.49455 | 5.94598 | D4 | 6.84553 | 6.9403 | 6.45027 |
| D5 | 0.5 | 0.5 | 0.5 | D5 | 0.5 | 0.5 | 0.5 |
| f | 10.3456 | 13.3921 | 17.2198 | MAG | 0.02514 | 0.03249 | 0.02812 |
| HFOV | 17.145 | 13.234 | 10.336 | HFOV | 16.857 | 12.867 | 10.047 |
| Fno | 2.023 | 2.108 | 2.258 | Fno | 2.054 | 2.144 | 2.313 |
| L | 39.69971 | 39.69971 | 39.69971 | L | 39.69971 | 39.69971 | 39.69971 |

In Table 2 above, D0 is an object distance, i.e., a distance on the optical axis between an object and a first surface of the reflective member P, D1 is a distance on the optical axis between the second lens 102 and the third lens 103, D2 is a distance on the optical axis between the fifth lens 105 and the stop, D3 is a distance on the optical axis between the seventh lens 107 and the eighth lens 108, D4 is a distance on the optical axis between the eighth lens 108 and the filter 109, and D5 is a distance on the optical axis between the filter 109 and the imaging plane 110.

f is a total focal length of the optical imaging system, MAG is a magnification of the optical imaging system, HFOV is one half of a field of view of the optical imaging system, Fno is an f-number of the optical imaging system, and L is a distance on the optical axis from the first surface of the reflective member P to the imaging plane 110.

The values in Table 2 above are listed for the wide-angle, normal, and telephoto modes for both an object at infinity and an object at a near focus position of the optical imaging system, i.e., a closest position of the object at which the optical imaging system can focus an image of the object.

A focal length fG1 of the first lens group G1 is 27.3746 mm, a focal length fG2 of the second lens group G2 is −11.8531 mm, and a focal length fG3 of the third lens group G3 is 19.1040 mm, and a focal length fG4 of the fourth lens group G4 is 11.530 mm.

The focal length of the first lens 101 is −40.550 mm, the focal length of the second lens 102 is 15.774 mm, the focal length of the third lens 103 is −7.105 mm, the focal length of the fourth lens 104 is 67.098 mm, the focal length of the fifth lens 105 is 37.618 mm, the focal length of the sixth lens 106 is 7.774 mm, the focal length of the seventh lens 107 is −7.979 mm, and the focal length of the eighth lens 108 is 11.530 mm.

One half of a diagonal length of the imaging plane of the image sensor (IMG HT) is 3.2 mm, and an entrance pupil diameter in the telephoto mode (EPDt) is 7.626 mm.

In the first embodiment of the present disclosure, the first lens group G1 has a positive refractive power overall, the second lens group G2 has a negative refractive power overall, the third lens group G3 has a positive refractive power overall, and the fourth lens group G4 has a positive refractive power overall.

The first lens 101 has a negative refractive power, a first surface of the first lens 101 is convex, and a second surface of the first lens 101 is concave.

The second lens 102 has a positive refractive power, a first surface of the second lens 102 is convex, and a second surface of the second lens 102 is concave.

The third lens 103 has a negative refractive power, and first and second surfaces of the third lens 103 are concave.

The fourth lens 104 has a positive refractive power, a first surface of the fourth lens 104 is concave, and a second surface of the fourth lens 104 is convex.

The fifth lens 105 has a positive refractive power, and first and second surfaces of the fifth lens 105 are convex.

The sixth lens 106 has a positive refractive power, and first and second surfaces of the sixth lens 106 are convex. A stop is disposed in front of the sixth lens 106.

The seventh lens 107 has a negative refractive power, a first surface of the seventh lens 107 is convex, and a second surface of the seventh lens 107 is concave.

The eighth lens 108 has a positive refractive power, a first surface of the eighth lens 108 is convex, and a second surface of the eighth lens 108 is concave.

Each surface of the first to eighth lenses 101 to 108 has aspherical coefficients as illustrated in Table 3 below. For example, both an object-side surface and an image-side surface of the first to eighth lenses 101 to 108 are aspherical surfaces.

TABLE 3

| | S4 | S5 | S6 | S7 | S8 | S9 | S10 | S11 |
|---|---|---|---|---|---|---|---|---|
| Conic Constant (K) | 0.275 | −0.207 | −2.533 | −80.039 | −5.973 | 0.964 | −30.581 | 34.143 |
| 4th Coefficient (A) | −1.329E−01 | −2.687E−02 | 3.714E−01 | 1.842E−02 | 2.741E−02 | −3.970E−02 | 1.255E−02 | 2.274E−02 |
| 6th Coefficient (B) | −1.887E−02 | −1.682E−02 | 1.507E−02 | 1.855E−02 | −3.437E−03 | −1.580E−02 | −1.155E−02 | −2.112E−03 |
| 8th Coefficient (C) | −3.139E−03 | −7.215E−03 | 6.238E−04 | 3.888E−03 | 1.662E−03 | −6.062E−03 | −7.007E−03 | −1.072E−03 |
| 10th Coefficient (D) | −9.428E−04 | −2.112E−03 | 2.104E−03 | 2.292E−03 | 2.385E−03 | 6.407E−04 | −2.199E−03 | 2.701E−04 |
| 12th Coefficient (E) | 2.440E−04 | 9.340E−04 | 2.608E−03 | 1.220E−03 | 1.520E−04 | −2.126E−05 | −1.860E−04 | 5.305E−04 |
| 14th Coefficient (F) | 4.051E−04 | 2.837E−04 | 4.376E−05 | −2.081E−04 | 5.591E−04 | 3.823E−04 | −3.995E−04 | −4.076E−05 |
| 16th Coefficient (G) | −1.421E−04 | −7.747E−05 | 1.705E−05 | 5.585E−05 | 8.311E−05 | 2.505E−04 | −4.670E−05 | 7.346E−05 |
| 18th Coefficient (H) | 2.563E−04 | 1.002E−04 | −3.531E−04 | −1.466E−04 | 9.128E−05 | 4.513E−04 | −4.741E−05 | −4.066E−06 |
| 20th Coefficient (J) | −2.143E−04 | −3.304E−05 | 1.925E−04 | 1.426E−04 | −1.063E−04 | 1.882E−04 | 3.503E−05 | 4.290E−05 |
| 22nd Coefficient (L) | 3.951E−05 | −4.688E−05 | −1.693E−04 | −7.445E−05 | 1.802E−05 | 2.511E−04 | −2.261E−05 | −7.613E−05 |
| 24th Coefficient (M) | −9.004E−05 | 2.343E−05 | 1.556E−04 | 6.923E−05 | −6.890E−05 | 1.013E−04 | −4.421E−06 | −2.387E−05 |
| 26th Coefficient (N) | 5.320E−05 | −1.012E−05 | −1.456E−04 | −8.550E−05 | 2.494E−05 | 1.068E−04 | −3.699E−05 | −5.021E−05 |
| 28th Coefficient (O) | −6.298E−05 | −2.301E−05 | 2.591E−05 | 4.295E−05 | −6.324E−06 | 3.817E−05 | −3.323E−05 | −1.960E−05 |
| 30th Coefficient (P) | 1.386E−05 | −6.882E−06 | −2.612E−05 | −2.882E−05 | 1.217E−05 | 3.703E−05 | −2.186E−05 | −2.344E−05 |

TABLE 3-continued

| | S12 | S13 | S15 | S16 | S17 | S18 | S19 | S20 |
|---|---|---|---|---|---|---|---|---|
| Conic Constant (K) | −78.642 | −56.737 | −0.463 | 61.208 | −71.881 | −0.275 | 0.452 | 28.524 |
| 4th Coefficient (A) | −4.892E−02 | −8.898E−02 | −4.021E−02 | −6.414E−02 | −1.266E−01 | −5.225E−02 | 8.592E−02 | 1.665E−01 |
| 6th Coefficient (B) | −3.015E−03 | −3.645E−03 | −2.614E−02 | −2.832E−02 | −1.023E−02 | 2.343E−03 | 2.907E−03 | 7.359E−03 |
| 8th Coefficient (C) | 1.937E−03 | 1.146E−03 | −1.330E−02 | −1.089E−02 | −1.699E−03 | 6.137E−04 | 3.578E−03 | 2.106E−03 |
| 10th Coefficient (D) | 1.164E−03 | 8.356E−04 | −5.970E−03 | −9.610E−04 | −4.173E−04 | −1.140E−04 | 3.552E−04 | −6.740E−04 |
| 12th Coefficient (E) | 3.183E−04 | 1.664E−04 | −2.374E−03 | 1.033E−03 | 1.208E−04 | 1.644E−04 | 2.616E−04 | 6.797E−06 |
| 14th Coefficient (F) | 4.910E−05 | 6.944E−05 | −1.343E−03 | 1.362E−03 | 9.390E−05 | 3.191E−04 | 7.585E−05 | −2.580E−04 |
| 16th Coefficient (G) | −8.642E−06 | −3.570E−05 | −6.347E−04 | 1.188E−03 | 2.943E−05 | 4.040E−04 | 2.709E−05 | −1.444E−06 |
| 18th Coefficient (H) | 4.742E−06 | −9.795E−06 | −5.293E−04 | 4.786E−04 | −3.088E−04 | 4.361E−04 | 4.785E−05 | −1.219E−04 |
| 20th Coefficient (J) | −1.285E−06 | −4.639E−05 | −3.735E−04 | 2.517E−04 | −4.287E−04 | 3.118E−04 | 2.200E−05 | 2.060E−05 |
| 22nd Coefficient (L) | −9.846E−06 | 1.143E−05 | −2.691E−04 | 1.949E−04 | −2.484E−04 | 2.277E−04 | 2.955E−05 | −3.368E−05 |
| 24th Coefficient (M) | 8.163E−06 | 8.373E−07 | −4.861E−05 | 1.089E−04 | −3.736E−05 | 1.669E−04 | 6.813E−06 | 3.425E−05 |
| 26th Coefficient (N) | −2.682E−06 | 1.122E−05 | 3.227E−05 | −8.787E−05 | 7.294E−06 | 1.300E−04 | 6.803E−06 | −2.023E−05 |
| 28th Coefficient (O) | 7.927E−06 | 1.852E−05 | 6.038E−05 | −7.992E−05 | 9.949E−06 | 7.841E−05 | −9.234E−06 | 1.312E−05 |
| 30th Coefficient (P) | −2.111E−05 | −6.864E−06 | 1.721E−05 | −3.014E−05 | 9.468E−06 | 3.337E−05 | −1.692E−06 | −2.397E−05 |

Figure 4:
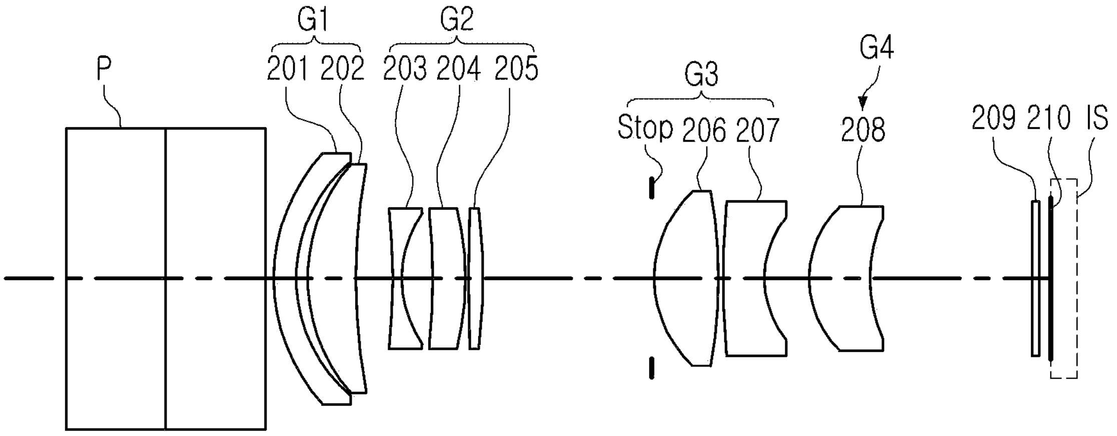
FIG. 4 is a diagram illustrating a wide-angle mode of an optical imaging system according to a second embodiment of the present disclosure.
Figure 5:
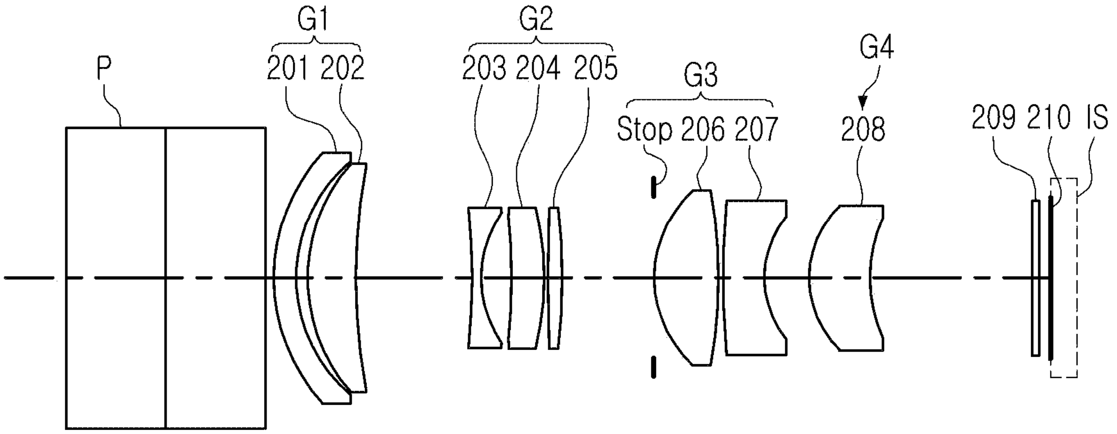
FIG. 5 is a diagram illustrating a normal mode of the optical imaging system of FIG. 4.
Figure 6:
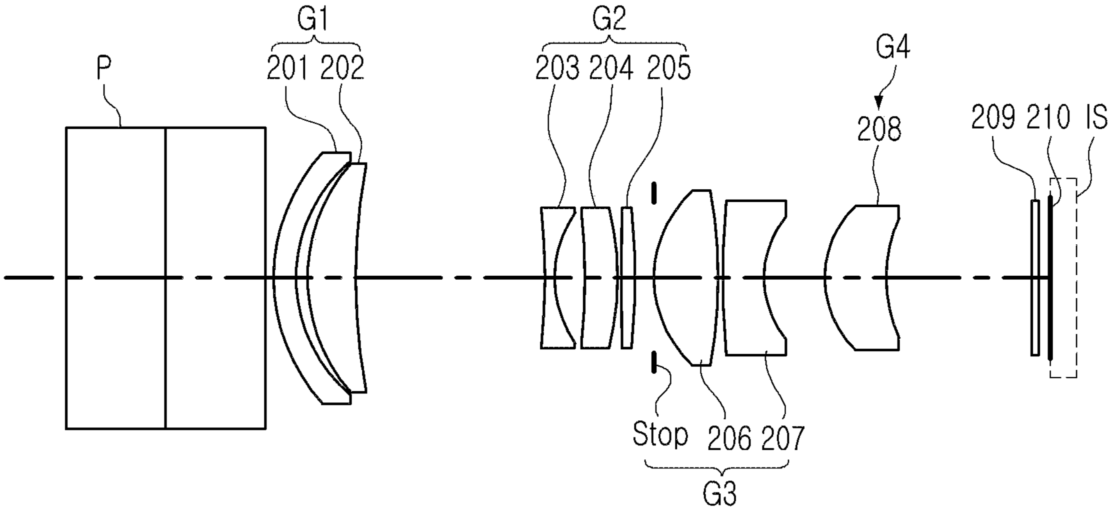
FIG. 6 is a diagram illustrating a telephoto mode of the optical imaging system of FIG. 4.

FIG. 4 is a diagram illustrating a wide-angle mode of an optical imaging system according to a second embodiment of the present disclosure, FIG. 5 is a diagram illustrating a normal mode of the optical imaging system of FIG. 4, and FIG. 6 is a diagram illustrating a telephoto mode of the optical imaging system of FIG. 4.

An optical imaging system according to a second embodiment of the present disclosure will be described with reference to FIGS. 4 to 6.

The optical imaging system according to the second embodiment of the present disclosure includes a first lens group G1, a second lens group G2, a third lens group G3, and a fourth lens group G4. The optical imaging system further includes a reflective member P disposed in front of the first lens group G1.

The first lens group G1 includes a first lens 201 and a second lens 202, the second lens group G2 includes a third lens 203, a fourth lens 204, and a fifth lens 205, the third lens group G3 includes a stop, a sixth lens 206, and a seventh lens 207, and the fourth lens group G4 includes an eighth lens 208 sequentially disposed from an object side of the optical imaging system.

In addition, the optical imaging system may further include a filter 209 and an image sensor IS.

The optical imaging system according to the second embodiment of the present disclosure may focus an image on an imaging plane 210. The imaging plane 210 may refer to a surface on which an image is focused by the optical imaging system. As an example, the imaging plane 210 may refer to one surface of the image sensor IS on which light is incident through the optical imaging system.

In the second embodiment of the present disclosure, the reflective member P may be a prism, but may also be provided as a mirror.

At least one lens group among the first to fourth lens groups G1 to G4 may be moved to change a total focal length of the optical imaging system. For example, the first lens group G1 and the third lens group G3 are fixed and the second lens group G2 is movable along the optical axis so that the total focal length of the optical imaging system may be changed. That is, as the second lens group G2 moves away from the object side of the optical imaging system toward an image side of the optical imaging system, the total focal length of the optical imaging system may be changed from the wide-angle mode to the normal mode, and then from the normal mode to the telephoto mode.

In addition, at least one lens group among the first to fourth lens groups G1 to G4 may be moved to correct a focus position according to a change in the total focal length of the optical imaging system. For example, when the total focal length of the optical imaging system is changed from the wide-angle mode to the telephoto mode, the fourth lens group G4 may be moved along the optical axis to correct the focus position.

Characteristics of each lens including a radius of curvature, a thickness of a lens or a distance between lenses, a refractive index, an Abbe number, and an effective radius are illustrated in Table 4 below.

TABLE 4

| Surface No. | Element | Radius of Curvature | Thickness or Distance | Refractive Index | Abbe Number | Effective Radius | Lens Group |
|---|---|---|---|---|---|---|---|
| Object | | Infinity | D0 | | | | |
| S1 | Prism | Infinity | 4 | 1.5168 | 64.2 | 6 | |
| S2 | | Infinity | 4 | 1.5168 | 64.2 | 5.65 | |
| S3 | | Infinity | 0.4 | | | 5.35 | |
| S4 | First | 7.696 | 0.9 | 1.6355 | 23.89 | 5.1 | First |
| S5 | Lens | 5.686 | 0.81 | | | 4.67 | Lens |
| S6 | Second | 7.116 | 1.95 | 1.535 | 55.73 | 4.71 | Group |
| S7 | Lens | 45.757 | D1 | | | 4.6 | |
| S8 | Third | −16.198 | 0.42 | 1.535 | 55.73 | 2.9 | Second |
| S9 | Lens | 4.907 | 1.227 | | | 2.66 | Lens |
| S10 | Fourth | −40.689 | 1.34 | 1.535 | 55.73 | 2.71 | Group |
| S11 | Lens | −18.816 | 0.15 | | | 2.98 | |
| S12 | Fifth | 25.783 | 0.67 | 1.6355 | 23.89 | 3 | |
| S13 | Lens | −338.025 | D2 | | | 3.03 | |
| S14 | Stop | Infinity | 0.15 | | | 3.08 | Third |
| S15 | Sixth | 4.822 | 2.25 | 1.535 | 55.73 | 3.34 | Lens |
| S16 | Lens | −29.343 | 0.207 | | | 3.25 | Group |
| S17 | Seventh | 13.933 | 1.73 | 1.6355 | 23.89 | 3.07 | |
| S18 | Lens | 3.713 | D3 | | | 2.62 | |
| S19 | Eighth | 4.508 | 2.35 | 1.535 | 55.73 | 2.94 | Fourth |
| S20 | Lens | 11.65 | D4 | | | 2.59 | Lens Group |
| S21 | Filter | Infinity | 0.21 | 1.5168 | 64.2 | 3.16 | |
| S22 | | Infinity | D5 | | | 3.17 | |
| S23 | Imaging Plane | Infinity | | | | | |

system, Fno is an f-number of the optical imaging system, and L is a distance on the optical axis from the first surface of the reflective member P to the imaging plane 210.

The values in Table 5 above are listed for the wide-angle, normal, and telephoto modes for both an object at infinity and an object at a near focus position of the optical imaging system, i.e., a closest position of the object at which the optical imaging system can focus an image of the object.

A focal length fG1 of the first lens group G1 is 25.9987 mm, a focal length fG2 of the second lens group G2 is −11.7160 mm, and a focal length fG3 of the third lens group G3 is 18.5459 mm, and a focal length fG4 of the fourth lens group G4 is 12.331 mm.

The focal length of the first lens 201 is −41.474 mm, the focal length of the second lens 202 is 15.478 mm, the focal length of the third lens 203 is −6.991 mm, the focal length of the fourth lens 204 is 64.057 mm, the focal length of the fifth lens 205 is 37.723 mm, the focal length of the sixth lens 206 is 7.923 mm, the focal length of the seventh lens 207 is −8.526 mm, and the focal length of the eighth lens 208 is 12.331 mm.

One half of a diagonal length of the imaging plane of the image sensor (IMG HT) is 3.2 mm, and an entrance pupil diameter in the telephoto mode (EPDt) is 7.629 mm.

In the second embodiment of the present disclosure, the first lens group G1 has a positive refractive power overall, the second lens group G2 has a negative refractive power overall, the third lens group G3 has a positive refractive power overall, and the fourth lens group G4 has a positive refractive power overall.

The first lens 201 has a negative refractive power, a first surface of the first lens 201 is convex, and a second surface of the first lens 201 is concave.

The second lens 202 has a positive refractive power, a first surface of the second lens 202 is convex, and a second surface of the second lens 202 is concave.

TABLE 5

| Object at Infinity | | | | Object at Near Focus Position | | | |
|---|---|---|---|---|---|---|---|
| Value | Wide-Angle Mode | Normal Mode | Telephoto Mode | Value | Wide-Angle Mode | Normal Mode | Telephoto Mode |
| D0 | Infinity | Infinity | Infinity | D0 | 400 | 400 | 600 |
| D1 | 0.699 | 3.315 | 6.732 | D1 | 0.699 | 3.315 | 6.732 |
| D2 | 6.433 | 3.817 | 0.4 | D2 | 6.433 | 3.817 | 0.4 |
| D3 | 2.33468 | 2.4031 | 3.06362 | D3 | 2.06582 | 1.98312 | 2.55069 |
| D4 | 6.96132 | 6.8929 | 6.23238 | D4 | 7.23018 | 7.31288 | 6.74531 |
| D5 | 0.5 | 0.5 | 0.5 | D5 | 0.5 | 0.5 | 0.5 |
| f | 10.3265 | 12.9213 | 17.2266 | MAG | 0.02512 | 0.03137 | 0.02811 |
| HFOV | 17.462 | 13.962 | 10.557 | HFOV | 17.186 | 13.621 | 10.281 |
| Fno | 2.312 | 2.314 | 2.258 | Fno | 2.344 | 2.363 | 2.304 |
| L | 39.692 | 39.692 | 39.692 | L | 39.692 | 39.692 | 39.692 |

In Table 5 above, D0 is an object distance, i.e., a distance on the optical axis between an object and a first surface of the reflective member P, D1 is a distance on the optical axis between the second lens 202 and the third lens 203, D2 is a distance on the optical axis between the fifth lens 205 and the stop, D3 is a distance on the optical axis between the seventh lens 207 and the eighth lens 208, D4 is a distance on the optical axis between the eighth lens 208 and the filter 209, and D5 is a distance on the optical axis between the filter 209 and the imaging plane 210.

f is a total focal length of the optical imaging system, MAG is a magnification of the optical imaging system, HFOV is one half of a field of view of the optical imaging The third lens 203 has a negative refractive power, and first and second surfaces of the third lens 203 are concave.

The fourth lens 204 has a positive refractive power, a first surface of the fourth lens 204 is concave, and a second surface of the fourth lens 204 is convex.

The fifth lens 205 has a positive refractive power, and first and second surfaces of the fifth lens 205 are convex.

The sixth lens 206 has a positive refractive power, and first and second surfaces of the sixth lens 206 are convex. A stop is disposed in front of the sixth lens 206.

The seventh lens 207 has a negative refractive power, a first surface of the seventh lens 207 is convex, and a second surface of the seventh lens 207 is concave.

The eighth lens 208 has a positive refractive power, a first surface of the eighth lens 208 is convex, and a second surface of the eighth lens 208 is concave.

Each surface of the first to eighth lenses 201 to 208 has aspherical coefficients as illustrated in Table 6 below. For example, both an object-side surface and an image-side surface of the first to eighth lenses 201 to 208 are aspherical surfaces.

TABLE 6

| | S4 | S5 | S6 | S7 | S8 | S9 | S10 | S11 |
|---|---|---|---|---|---|---|---|---|
| Conic Constant (K) | 0.276 | −0.206 | −2.547 | −54.817 | −5.973 | 0.963 | −27.051 | 34.048 |
| 4th Coefficient (A) | −1.323E−01 | −2.661E−02 | 3.702E−01 | 2.044E−02 | 2.741E−02 | −3.953E−02 | 1.196E−02 | 2.351E−02 |
| 6th Coefficient (B) | −1.914E−02 | −1.671E−02 | 1.500E−02 | 1.886E−02 | −3.437E−03 | −1.637E−02 | −1.130E−02 | −2.063E−03 |
| 8th Coefficient (C) | −3.684E−03 | −6.815E−03 | 7.890E−04 | 3.121E−03 | 1.662E−03 | −5.740E−03 | −7.167E−03 | −1.184E−03 |
| 10th Coefficient (D) | −9.195E−04 | −1.977E−03 | 1.958E−03 | 2.344E−03 | 2.385E−03 | 6.108E−04 | −2.144E−03 | 2.981E−04 |
| 12th Coefficient (E) | 1.912E−04 | 9.204E−04 | 2.644E−03 | 1.250E−03 | 1.520E−04 | 2.113E−04 | −2.610E−04 | 5.305E−04 |
| 14th Coefficient (F) | 3.732E−04 | 2.544E−04 | 1.227E−04 | −1.790E−04 | 5.591E−04 | 6.203E−04 | −2.686E−04 | −7.715E−05 |
| 16th Coefficient (G) | −1.541E−04 | −8.518E−05 | 8.265E−05 | 1.449E−05 | 8.311E−05 | 2.687E−04 | 1.145E−05 | 5.646E−05 |
| 18th Coefficient (H) | 2.641E−04 | 1.137E−04 | −3.456E−04 | −1.836E−04 | 9.128E−05 | 3.787E−04 | 1.028E−04 | 1.288E−04 |
| 20th Coefficient (J) | −1.354E−04 | −1.319E−05 | 1.294E−04 | 1.327E−04 | −1.063E−04 | 1.038E−04 | 4.381E−05 | 6.378E−05 |
| 22nd Coefficient (L) | 2.011E−05 | −4.354E−05 | −1.223E−04 | −6.709E−05 | 1.802E−05 | 1.663E−04 | 1.104E−05 | 2.909E−06 |
| 24th Coefficient (M) | −4.839E−05 | 3.271E−05 | 1.260E−04 | 7.823E−05 | −6.890E−05 | 8.077E−05 | 2.059E−05 | 2.994E−05 |
| 26th Coefficient (N) | 2.185E−05 | −2.590E−06 | −7.357E−05 | −6.529E−05 | 2.494E−05 | 6.695E−05 | 1.751E−06 | −1.934E−05 |
| 28th Coefficient (O) | −2.920E−05 | −2.111E−05 | 7.695E−07 | 3.793E−05 | −6.324E−06 | 7.436E−06 | −1.181E−05 | −2.805E−05 |
| 30th Coefficient (P) | 3.388E−06 | −6.813E−06 | 4.368E−07 | −1.762E−05 | 1.217E−05 | 9.927E−06 | −1.432E−05 | −5.075E−05 |

| | S12 | S13 | S15 | S16 | S17 | S18 | S19 | S20 |
|---|---|---|---|---|---|---|---|---|
| Conic Constant (K) | 68.103 | −55.632 | −0.467 | 60.950 | −70.369 | −0.291 | 0.451 | 28.388 |
| 4th Coefficient (A) | −4.886E−02 | −8.913E−02 | −4.137E−02 | −6.355E−02 | −1.258E−01 | −5.471E−02 | 8.482E−02 | 1.641E−01 |
| 6th Coefficient (B) | −3.217E−03 | −3.403E−03 | −2.580E−02 | −2.836E−02 | −1.103E−02 | 2.380E−03 | 3.417E−03 | 6.391E−03 |
| 8th Coefficient (C) | 1.958E−03 | 1.044E−03 | −1.319E−02 | −1.078E−02 | −1.739E−03 | 6.073E−04 | 4.082E−03 | 2.226E−03 |
| 10th Coefficient (D) | 1.212E−03 | 8.236E−04 | −6.130E−03 | −1.097E−03 | −2.429E−04 | −3.925E−04 | −3.775E−06 | −7.783E−04 |
| 12th Coefficient (E) | 3.066E−04 | 9.339E−05 | −2.404E−03 | 9.612E−04 | 2.924E−04 | 4.252E−04 | 5.125E−04 | 1.148E−04 |

TABLE 6-continued

| | | | | | | | | |
|---|---|---|---|---|---|---|---|---|
| 14th Coefficient (F) | 7.207E−05 | 1.396E−04 | −1.277E−03 | 1.427E−03 | −1.502E−05 | 1.481E−04 | −5.875E−05 | −3.093E−04 |
| 16th Coefficient (G) | −1.878E−05 | −1.303E−06 | −5.909E−04 | 1.134E−03 | 5.218E−05 | 4.588E−04 | 1.439E−04 | 3.328E−05 |
| 18th Coefficient (H) | −1.929E−05 | −4.494E−05 | −5.436E−04 | 4.850E−04 | −4.214E−04 | 2.764E−04 | −8.124E−06 | −1.422E−04 |
| 20th Coefficient (J) | 2.719E−05 | −1.673E−05 | −3.662E−04 | 3.586E−04 | −3.386E−04 | 2.585E−04 | 6.733E−05 | 1.655E−05 |
| 22nd Coefficient (L) | 2.605E−05 | 1.649E−05 | −2.454E−04 | 1.891E−04 | −2.150E−04 | 1.773E−04 | 1.660E−05 | −6.735E−05 |
| 24th Coefficient (M) | 5.735E−05 | 2.029E−05 | −8.459E−05 | 1.179E−05 | −1.170E−04 | 1.408E−04 | 4.094E−05 | 4.700E−06 |
| 26th Coefficient (N) | 2.123E−05 | 1.608E−05 | −2.645E−05 | −3.670E−05 | −4.203E−05 | 8.518E−05 | 7.107E−06 | −3.945E−05 |
| 28th Coefficient (O) | 9.289E−07 | 5.987E−06 | 1.132E−05 | −4.201E−05 | −9.564E−06 | 4.872E−05 | 1.202E−05 | −4.516E−06 |
| 30th Coefficient (P) | −4.493E−05 | −1.296E−05 | −7.722E−06 | 4.141E−06 | 2.554E−06 | 8.266E−06 | 4.408E−06 | −3.413E−05 |

Figure 7:
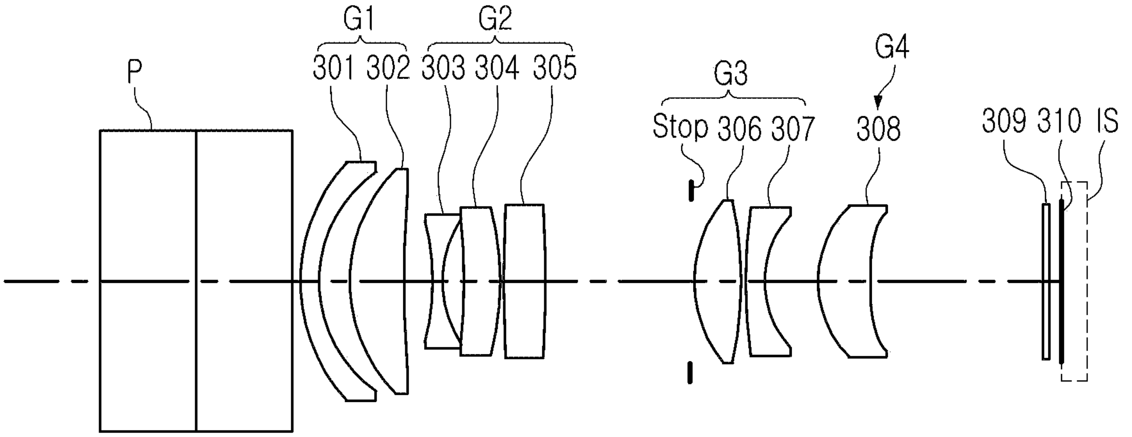
FIG. 7 is a diagram illustrating a wide-angle mode of an optical imaging system according to a third embodiment of the present disclosure.
Figure 8:
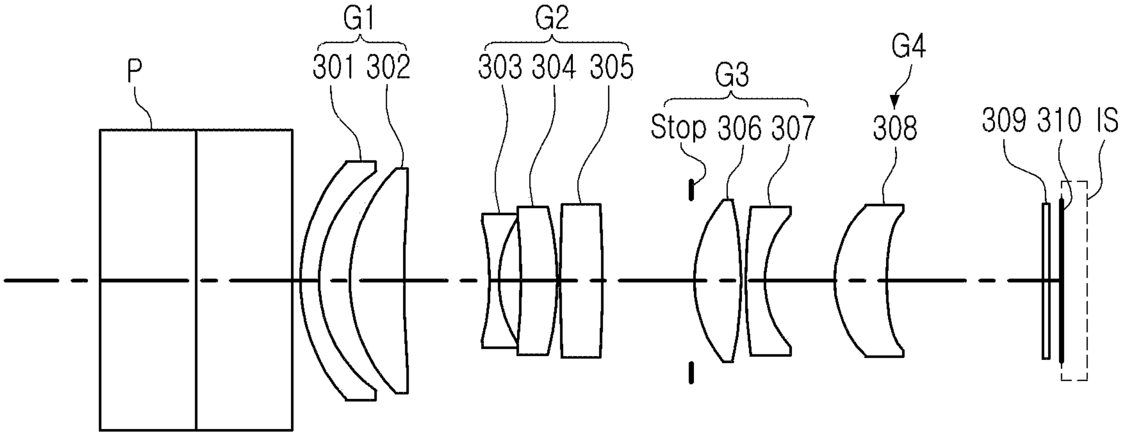
FIG. 8 is a diagram illustrating a normal mode of the optical imaging system of FIG. 7.
Figure 9:
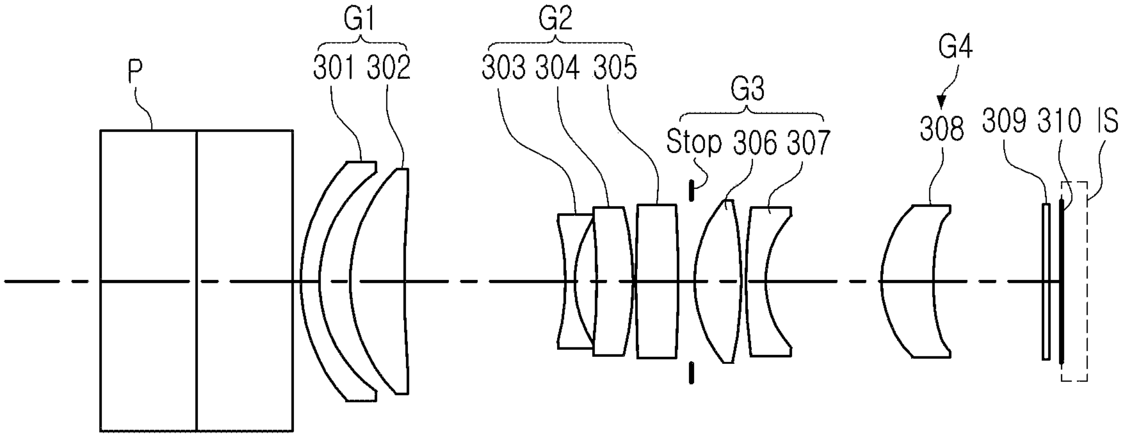
FIG. 9 is a diagram illustrating a telephoto mode of the optical imaging system of FIG. 7.

FIG. 7 is a diagram illustrating a wide-angle mode of an optical imaging system according to a third embodiment of the present disclosure, FIG. 8 is a diagram illustrating a normal mode of the optical imaging system of FIG. 7, and FIG. 9 is a diagram illustrating a telephoto mode of the optical imaging system of FIG. 7.

An optical imaging system according to a third embodiment of the present disclosure will be described with reference to FIGS. 7 to 9.

The optical imaging system according to the third embodiment of the present disclosure includes a first lens group G1, a second lens group G2, a third lens group G3, and a fourth lens group G4. The optical imaging system further includes a reflective member P disposed in front of the first lens group G1.

The first lens group G1 includes a first lens 301 and a second lens 302, the second lens group G2 includes a third lens 303, a fourth lens 304, and a fifth lens 305, the third lens group G3 includes a stop, a sixth lens 306, and a seventh lens 307, and the fourth lens group G4 includes an eighth lens 308 sequentially disposed from an object side of the optical imaging system.

In addition, the optical imaging system may further include a filter 309 and an image sensor IS.

The optical imaging system according to the third embodiment of the present disclosure may focus an image on an imaging plane 310. The imaging plane 310 may refer to a surface on which an image is focused by the optical imaging system. As an example, the imaging plane 310 may refer to one surface of the image sensor IS on which light is incident through the optical imaging system.

In the third embodiment of the present disclosure, the reflective member P may be a prism, but may also be provided as a mirror.

At least one lens group among the first to fourth lens groups G1 to G4 may be moved to change a total focal length of the optical imaging system. For example, the first lens group G1 and the third lens group G3 are fixed and the second lens group G2 is movable along the optical axis so that the total focal length of the optical imaging system may be changed. That is, as the second lens group G2 moves away from the object side of the optical imaging system toward an image side of the optical imaging system, the total focal length of the optical imaging system may be changed from the wide-angle mode to the normal mode, and then from the normal mode to the telephoto mode.

In addition, at least one lens group among the first to fourth lens groups G1 to G4 may be moved to correct a focus position according to a change in the total focal length of the optical imaging system. For example, when the total focal length of the optical imaging system is changed from the wide-angle mode to the telephoto mode, the fourth lens group G4 may be moved along the optical axis to correct the focus position.

Characteristics of each lens including a radius of curvature, a thickness of a lens or a distance between lenses, a refractive index, an Abbe number, and an effective radius are illustrated in Table 7 below.

TABLE 7

| Surface No. | Element | Radius of Curvature | Thickness or Distance | Refractive Index | Abbe Number | Effective Radius | Lens Group |
|---|---|---|---|---|---|---|---|
| Object | | Infinity | D0 | | | | |
| S1 | Prism | Infinity | 4 | 1.5168 | 64.2 | 6 | |
| S2 | | Infinity | 4 | 1.5168 | 64.2 | 5.62 | |
| S3 | | Infinity | 0.4 | | | 5.27 | |
| S4 | First | 7.503 | 0.75 | 1.6355 | 23.89 | 5 | First |
| S5 | Lens | 5.337 | 1.288 | | | 4.6 | Lens |
| S6 | Second | 6.578 | 2.3 | 1.535 | 55.73 | 4.71 | Group |
| S7 | Lens | 169.509 | D1 | | | 4.61 | |
| S8 | Third | −10.65 | 0.4 | 1.535 | 55.73 | 2.8 | Second |
| S9 | Lens | 5.28 | 0.843 | | | 2.69 | Lens |
| S10 | Fourth | −39.769 | 1.53 | 1.535 | 55.73 | 2.69 | Group |
| S11 | Lens | −19.181 | 0.15 | | | 3.1 | |
| S12 | Fifth | 18.643 | 1.78 | 1.6355 | 23.89 | 3.06 | |

TABLE 7-continued

| Surface No. | Element | Radius of Curvature | Thickness or Distance | Refractive Index | Abbe Number | Effective Radius | Lens Group |
|---|---|---|---|---|---|---|---|
| S13 | Lens | −192.377 | D2 | | | 3.2 | |
| S14 | Stop | Infinity | 0.15 | | | 3.45 | Third |
| S15 | Sixth | 4.79 | 1.93 | 1.535 | 55.73 | 3.38 | Lens |
| S16 | Lens | −30.686 | 0.166 | | | 3.3 | Group |
| S17 | Seventh | 11.381 | 0.83 | 1.6355 | 23.89 | 3.13 | |
| S18 | Lens | 3.924 | D3 | | | 2.78 | |
| S19 | Eighth | 4.832 | 2.2 | 1.535 | 55.73 | 3.2 | Fourth |
| S20 | Lens | 10.648 | D4 | | | 2.84 | Lens Group |
| S21 | Filter | Infinity | 0.21 | 1.5168 | 64.2 | 3.19 | |
| S22 | | Infinity | D5 | | | 3.2 | |
| S23 | Imaging Plane | Infinity | | | | | |

TABLE 8

| Object at Infinity | | | | Object at Near Focus Position | | | |
|---|---|---|---|---|---|---|---|
| Value | Wide-Angle Mode | Normal Mode | Telephoto Mode | Value | Wide-Angle Mode | Normal Mode | Telephoto Mode |
| D0 | Infinity | Infinity | Infinity | D0 | 400 | 400 | 600 |
| D1 | 1.16228 | 3.55499 | 6.7477 | D1 | 1.16228 | 3.55499 | 6.7477 |
| D2 | 6.08542 | 3.69271 | 0.5 | D2 | 6.08542 | 3.69271 | 0.5 |
| D3 | 2.17407 | 2.85 | 4.84 | D3 | 1.88688 | 2.4021 | 4.21553 |
| D4 | 7.23364 | 6.55771 | 4.56771 | D4 | 7.52083 | 7.00561 | 5.19218 |
| D5 | 0.1 | 0.1 | 0.1 | D5 | 0.1 | 0.1 | 0.1 |
| f | 10.3377 | 12.8069 | 17.2376 | MAG | 0.02502 | 0.03081 | 0.02761 |
| HFOV | 17.226 | 13.907 | 10.399 | HFOV | 16.984 | 13.634 | 10.286 |
| Fno | 2.014 | 1.959 | 1.928 | Fno | 2.003 | 1.939 | 1.862 |
| L | 39.68241 | 39.68241 | 39.68241 | L | 39.68241 | 39.68241 | 39.68241 |

In Table 8 above, D0 is an object distance, i.e., a distance on the optical axis between an object and a first surface of the reflective member P, D1 is a distance on the optical axis between the second lens 302 and the third lens 303, D2 is a distance on the optical axis between the fifth lens 305 and the stop, D3 is a distance on the optical axis between the seventh lens 307 and the eighth lens 308, D4 is a distance on the optical axis between the eighth lens 308 and the filter 309, and D5 is a distance on the optical axis between the filter 309 and the imaging plane 310.

f is a total focal length of the optical imaging system, MAG is a magnification of the optical imaging system, HFOV is one half of a field of view of the optical imaging system, Fno is an f-number of the optical imaging system, and L is a distance on the optical axis from the first surface of the reflective member P to the imaging plane 310.

The values in Table 8 above are listed for the wide-angle, normal, and telephoto modes for both an object at infinity and an object at a near focus position of the optical imaging system, i.e., a closest position of the object at which the optical imaging system can focus an image of the object.

A focal length fG1 of the first lens group G1 is 20.5641 mm, a focal length fG2 of the second lens group G2 is −12.2399 mm, and a focal length fG3 of the third lens group G3 is 19.2467 mm, and a focal length fG4 of the fourth lens group G4 is 14.609 mm.

The focal length of the first lens 301 is −33.613 mm, the focal length of the second lens 302 is 12.729 mm, the focal length of the third lens 303 is −6.541 mm, the focal length of the fourth lens 304 is 67.506 mm, the focal length of the fifth lens 305 is 26.832 mm, the focal length of the sixth lens 306 is 7.894 mm, the focal length of the seventh lens 307 is −9.850 mm, and the focal length of the eighth lens 308 is 14.609 mm.

One half of a diagonal length of the imaging plane of the image sensor (IMG HT) is 3.2 mm, and an entrance pupil diameter in the telephoto mode (EPDt) is 8.941 mm.

In the third embodiment of the present disclosure, the first lens group G1 has a positive refractive power overall, the second lens group G2 has a negative refractive power overall, the third lens group G3 has a positive refractive power overall, and the fourth lens group G4 has a positive refractive power overall.

The first lens 301 has a negative refractive power, a first surface of the first lens 301 is convex, and a second surface of the first lens 301 is concave.

The second lens 302 has a positive refractive power, a first surface of the second lens 302 is convex, and a second surface of the second lens 302 is concave.

The third lens 303 has a negative refractive power, and first and second surfaces of the third lens 303 are concave.

The fourth lens 304 has a positive refractive power, a first surface of the fourth lens 304 is concave, and a second surface of the fourth lens 304 is convex.

The fifth lens 305 has a positive refractive power, and first and second surfaces of the fifth lens 305 are convex.

The sixth lens 306 has a positive refractive power, and first and second surfaces of the sixth lens 306 are convex. A stop is disposed in front of (e.g., an object-side surface) the sixth lens 306.

The seventh lens 307 has a negative refractive power, a first surface of the seventh lens 307 is convex, and a second surface of the seventh lens 307 is concave.

The eighth lens 308 has a positive refractive power, a first surface of the eighth lens 308 is convex, and a second surface of the eighth lens 308 is concave.

Each surface of the first to eighth lenses 301 to 308 has aspherical coefficients as illustrated in Table 9 below. For example, both an object-side surface and an image-side surface of the first to eighth lenses 301 to 308 are aspherical surfaces.

TABLE 9

| | S4 | S5 | S6 | S7 | S8 | S9 | S10 | S11 |
|---|---|---|---|---|---|---|---|---|
| Conic Constant (K) | 0.281 | −0.240 | −1.944 | 44.898 | −7.403 | 0.711 | −11.223 | 33.451 |
| 4th Coefficient (A) | −1.161E−01 | −2.704E−02 | 4.255E−01 | 7.008E−02 | 4.023E−02 | −9.937E−02 | −9.347E−03 | 1.242E−02 |
| 6th Coefficient (B) | −3.035E−02 | −3.273E−02 | 8.462E−03 | 7.950E−03 | 2.931E−02 | 2.788E−02 | −1.312E−02 | −2.217E−02 |
| 8th Coefficient (C) | −9.960E−03 | −1.315E−02 | −2.496E−04 | −3.587E−03 | −1.721E−02 | −1.495E−02 | −7.979E−03 | −1.050E−03 |
| 10th Coefficient (D) | 3.442E−05 | −2.937E−03 | −4.292E−03 | −7.434E−03 | 3.995E−03 | −5.666E−03 | −6.881E−03 | 4.771E−04 |
| 12th Coefficient (E) | −1.339E−03 | −2.456E−03 | −4.234E−03 | −4.729E−03 | 1.473E−04 | −2.468E−03 | −2.376E−03 | 5.181E−05 |
| 14th Coefficient (F) | 1.013E−03 | 5.072E−04 | −2.435E−03 | −2.406E−03 | 2.290E−03 | −2.013E−03 | −1.893E−03 | 1.024E−03 |
| 16th Coefficient (G) | −2.460E−04 | −1.059E−04 | −1.120E−03 | −4.690E−04 | 2.209E−03 | 4.184E−05 | −4.500E−04 | 1.773E−04 |
| 18th Coefficient (H) | 2.044E−04 | −2.663E−05 | −6.463E−04 | −1.247E−04 | 1.637E−04 | 3.553E−05 | −1.471E−04 | −9.763E−05 |
| 20th Coefficient (J) | 1.912E−04 | 2.636E−04 | −1.944E−04 | 1.922E−04 | −9.045E−05 | 2.733E−04 | 2.446E−04 | 8.881E−06 |
| 22nd Coefficient (L) | 1.145E−04 | 2.747E−05 | −1.671E−04 | 1.198E−04 | −5.267E−04 | −6.062E−05 | 1.910E−04 | −1.057E−04 |
| 24th Coefficient (M) | 7.670E−05 | 1.394E−04 | 8.723E−05 | 1.148E−04 | −1.020E−04 | −4.963E−05 | 7.336E−05 | −2.311E−04 |
| 26th Coefficient (N) | 4.638E−05 | 9.593E−05 | 1.719E−04 | −5.582E−05 | −1.698E−05 | −3.061E−05 | 6.048E−05 | 1.656E−04 |
| 28th Coefficient (O) | −4.505E−05 | −1.714E−05 | −1.082E−05 | −8.083E−05 | 1.504E−04 | −3.559E−05 | 1.543E−06 | −4.632E−05 |
| 30th Coefficient (P) | −7.332E−05 | −1.506E−04 | −4.470E−05 | 2.553E−05 | 7.363E−06 | 3.065E−05 | −7.269E−06 | 7.884E−05 |

| | S12 | S13 | S15 | S16 | S17 | S18 | S19 | S20 |
|---|---|---|---|---|---|---|---|---|
| Conic Constant (K) | −80.000 | −80.000 | −0.539 | 62.683 | −33.580 | −0.184 | 0.279 | 12.531 |
| 4th Coefficient (A) | −7.332E−02 | −1.680E−01 | −6.347E−02 | −1.255E−01 | −3.917E−02 | −4.484E−02 | 4.627E−02 | 7.096E−02 |
| 6th Coefficient (B) | −1.206E−02 | 1.436E−02 | −2.222E−02 | 5.145E−02 | 1.773E−02 | 1.397E−02 | 1.620E−02 | −4.511E−03 |
| 8th Coefficient (C) | 1.771E−03 | 1.094E−02 | −5.233E−03 | −2.210E−02 | −7.672E−03 | −4.754E−03 | −3.625E−04 | −2.622E−03 |
| 10th Coefficient (D) | 6.675E−04 | 8.650E−03 | −1.802E−04 | 3.302E−03 | 4.015E−03 | 2.270E−03 | 1.478E−03 | −1.647E−03 |
| 12th Coefficient (E) | −7.944E−04 | 5.487E−03 | −1.031E−03 | −1.291E−02 | −2.100E−03 | −7.317E−04 | −5.241E−04 | −5.279E−04 |
| 14th Coefficient (F) | 7.014E−04 | 3.278E−03 | −1.491E−03 | 1.313E−03 | 7.013E−04 | 4.090E−04 | 3.689E−04 | −3.557E−04 |
| 16th Coefficient (G) | −3.780E−05 | 1.088E−03 | −1.623E−03 | −2.973E−04 | −1.270E−04 | −4.623E−04 | −2.173E−04 | −7.044E−05 |
| 18th Coefficient (H) | −2.385E−05 | 4.417E−04 | −7.008E−04 | 4.601E−03 | −3.458E−04 | 2.747E−04 | 1.987E−04 | −1.044E−04 |
| 20th Coefficient (J) | 6.328E−05 | 1.366E−05 | −3.896E−04 | 9.693E−04 | −2.023E−03 | −1.565E−04 | −1.034E−04 | 5.197E−06 |

TABLE 9-continued

| | | | | | | | | |
|---|---|---|---|---|---|---|---|---|
| 22nd Coefficient (L) | 2.194E−05 | 1.907E−05 | −1.385E−04 | 2.769E−03 | −5.697E−04 | 9.755E−05 | 9.329E−05 | −2.050E−05 |
| 24th Coefficient (M) | −1.708E−04 | −3.273E−05 | −2.060E−04 | 5.028E−04 | −8.663E−04 | −4.570E−05 | −6.235E−05 | 3.062E−05 |
| 26th Coefficient (N) | 8.539E−05 | 1.066E−05 | −1.548E−04 | 1.333E−03 | −2.526E−05 | 1.981E−05 | 2.550E−05 | −3.377E−05 |
| 28th Coefficient (O) | −6.972E−05 | −1.738E−05 | −6.694E−05 | 1.246E−04 | 5.993E−03 | −1.421E−05 | −5.331E−05 | 3.621E−05 |
| 30th Coefficient (P) | 3.024E−05 | 6.802E−06 | −5.283E−05 | 2.713E−04 | 8.025E−04 | 5.409E−06 | 2.858E−05 | −1.744E−05 |

Figure 10:
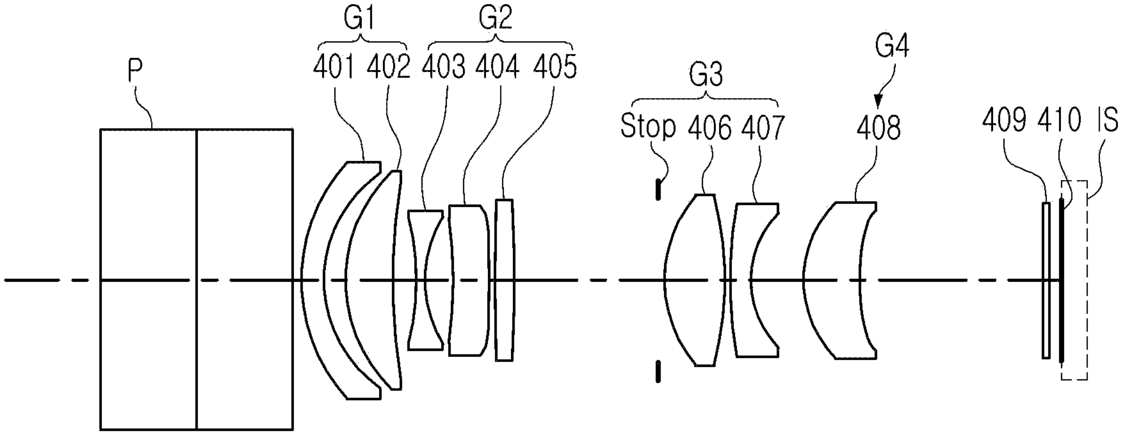
FIG. 10 is a diagram illustrating a wide-angle mode of an optical imaging system according to a fourth embodiment of the present disclosure.
Figure 11:
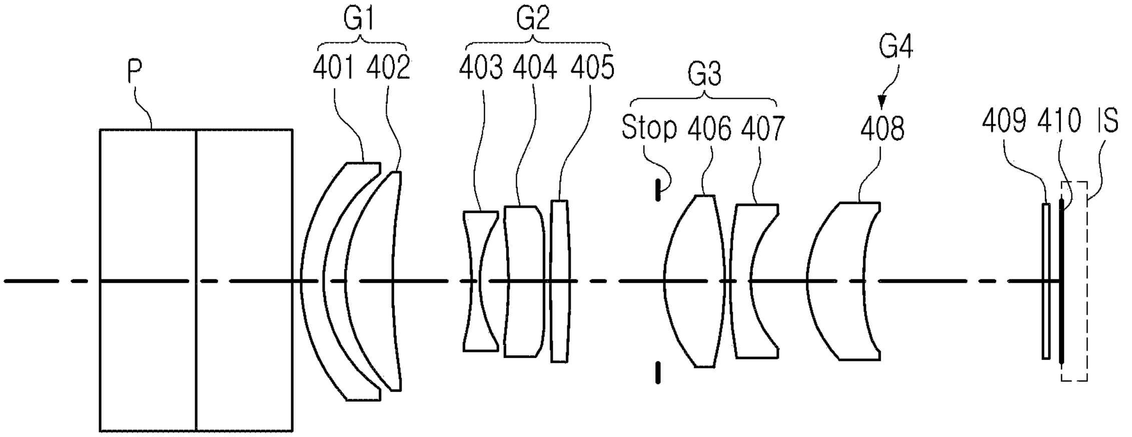
FIG. 11 is a diagram illustrating a normal mode of the optical imaging system of FIG. 10.
Figure 12:
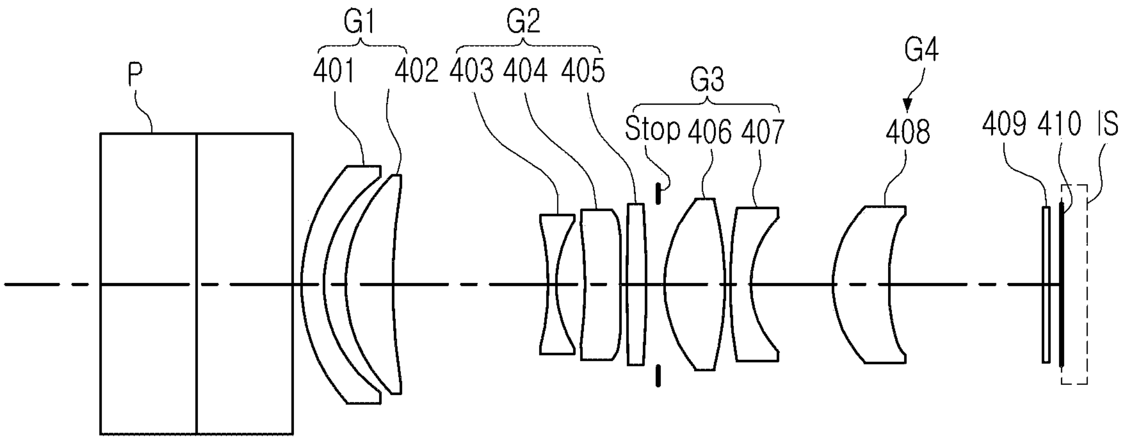
FIG. 12 is a diagram illustrating a telephoto mode of the optical imaging system of FIG. 10.

FIG. 10 is a diagram illustrating a wide-angle mode of an optical imaging system according to a fourth embodiment of the present disclosure, FIG. 11 is a diagram illustrating a normal mode of the optical imaging system of FIG. 10, and FIG. 12 is a diagram illustrating a telephoto mode of the optical imaging system of FIG. 10.

An optical imaging system according to a fourth embodiment of the present disclosure will be described with reference to FIGS. 10 to 12.

The optical imaging system according to the fourth embodiment of the present disclosure includes a first lens group G1, a second lens group G2, a third lens group G3, and a fourth lens group G4. The optical imaging system further includes a reflective member P disposed in front of the first lens group G1.

The first lens group G1 includes a first lens 401 and a second lens 402, the second lens group G2 includes a third lens 403, a fourth lens 404, and a fifth lens 405, the third lens group G3 includes a stop, a sixth lens 406, and a seventh lens 407, and the fourth lens group G4 includes an eighth lens 408 sequentially disposed from an object side of the optical imaging system.

In addition, the optical imaging system may further include a filter 409 and an image sensor IS.

The optical imaging system according to the fourth embodiment of the present disclosure may focus an image on an imaging plane 410. The imaging plane 410 may refer to a surface on which an image is focused by the optical imaging system. As an example, the imaging plane 410 may refer to one surface of the image sensor IS on which light is incident through the optical imaging system.

In the fourth embodiment of the present disclosure, the reflective member P may be a prism, but may also be provided as a mirror.

At least one lens group among the first to fourth lens groups G1 to G4 may be moved to change a total focal length of the optical imaging system. For example, the first lens group G1 and the third lens group G3 are fixed and the second lens group G2 is movable along the optical axis so that the total focal length of the optical imaging system may be changed. That is, as the second lens group G2 moves away from the object side of the optical imaging system toward an image side of the optical imaging system, the total focal length of the optical imaging system may be changed from the wide-angle mode to the normal mode, and then from the normal mode to the telephoto mode.

In addition, at least one lens group among the first to fourth lens groups G1 to G4 may be moved to correct a focus position according to a change in the total focal length of the optical imaging system. For example, when the total focal length of the optical imaging system is changed from the wide-angle mode to the telephoto mode, the fourth lens group G4 may be moved along the optical axis to correct the focus position.

Characteristics of each lens including a radius of curvature, a thickness of a lens or a distance between lenses, a refractive index, an Abbe number, and an effective radius are illustrated in Table 10 below.

TABLE 10

| Surface No. | Element | Radius of Curvature | Thickness or Distance | Refractive Index | Abbe Number | Effective Radius | Lens Group |
|---|---|---|---|---|---|---|---|
| Object | | Infinity | D0 | | | | |
| S1 | Prism | Infinity | 4 | 1.5168 | 64.2 | 6 | |
| S2 | | Infinity | 4 | 1.5168 | 64.2 | 5.63 | |
| S3 | | Infinity | 0.4 | | | 5.26 | |
| S4 | First | 7.37 | 0.92 | 1.6355 | 23.89 | 5 | First |
| S5 | Lens | 5.265 | 0.972 | | | 4.54 | Lens |
| S6 | Second | 6.53 | 2.03 | 1.535 | 55.73 | 4.59 | Group |
| S7 | Lens | 57.606 | D1 | | | 4.51 | |
| S8 | Third | −12.593 | 0.4 | 1.535 | 55.73 | 2.9 | |
| S9 | Lens | 5.145 | 1.2 | | | 2.75 | |
| S10 | Fourth | −41.29 | 1.55 | 1.535 | 55.73 | 2.79 | Second |
| S11 | Lens | −19.355 | 0.169 | | | 3.17 | Lens |
| S12 | Fifth | 20.424 | 0.84 | 1.6355 | 23.89 | 3.2 | Group |
| S13 | Lens | −113.975 | D2 | | | 3.35 | |
| S14 | Stop | Infinity | 0.172 | | | 3.5 | Third |
| S15 | Sixth | 4.791 | 2.55 | 1.535 | 55.73 | 3.6 | Lens |
| S16 | Lens | −30.562 | 0.205 | | | 3.45 | Group |
| S17 | Seventh | 11.236 | 0.87 | 1.6355 | 23.89 | 3.23 | |
| S18 | Lens | 3.948 | D3 | | | 2.82 | |
| S19 | Eighth | 4.929 | 2.35 | 1.535 | 55.73 | 3.3 | Fourth |
| S20 | Lens | 10.806 | D4 | | | 2.92 | Lens Group |
| S21 | Filter | Infinity | 0.21 | 1.5168 | 64.2 | 3.37 | |
| S22 | | Infinity | D5 | | | 3.38 | |
| S23 | Imaging Plane | Infinity | | | | | |

TABLE 11

| Object at Infinity | | | | Object at Near Focus Position | | | |
|---|---|---|---|---|---|---|---|
| Value | Wide-Angle Mode | Normal Mode | Telephoto Mode | Value | Wide-Angle Mode | Normal Mode | Telephoto Mode |
| D0 | Infinity | Infinity | Infinity | D0 | 400 | 400 | 600 |
| D1 | 0.82524 | 3.2112 | 6.39717 | D1 | 0.82524 | 3.2112 | 6.39717 |
| D2 | 6.07193 | 3.68597 | 0.5 | D2 | 6.07193 | 3.68597 | 0.5 |
| D3 | 2.22209 | 2.4404 | 3.48477 | D3 | 1.9396 | 2.00008 | 2.92921 |
| D4 | 7.69104 | 7.47273 | 6.42836 | D4 | 7.97353 | 7.91305 | 6.98392 |
| D5 | 0.1 | 0.1 | 0.1 | D5 | 0.1 | 0.1 | 0.1 |
| f | 10.3255 | 12.8738 | 17.224 | MAG | 0.02507 | 0.03116 | 0.02797 |
| HFOV | 17.467 | 14.007 | 10.568 | HFOV | 17.208 | 13.693 | 10.331 |
| Fno | 2.062 | 2.051 | 2.036 | Fno | 2.055 | 2.037 | 1.998 |
| L | 39.7483 | 39.7483 | 39.7483 | L | 39.7483 | 39.7483 | 39.7483 |

In Table 11 above, D0 is an object distance, i.e., a distance on the optical axis between an object and a first surface of the reflective member P, D1 is a distance on the optical axis between the second lens 402 and the third lens 403, D2 is a distance on the optical axis between the fifth lens 405 and the stop, D3 is a distance on the optical axis between the seventh lens 407 and the eighth lens 408, D4 is a distance on the optical axis between the eighth lens 408 and the filter 409, and D5 is a distance on the optical axis between the filter 409 and the imaging plane 410.

f is a total focal length of the optical imaging system, MAG is a magnification of the optical imaging system, HFOV is one half of a field of view of the optical imaging system, Fno is an f-number of the optical imaging system, and L is a distance on the optical axis from the first surface of the reflective member P to the imaging plane 410.

The values in Table 11 above are listed for the wide-angle, normal, and telephoto modes for both an object at infinity and an object at a near focus position of the optical imaging system, i.e., a closest position of the object at which the optical imaging system can focus an image of the object.

A focal length fG1 of the first lens group G1 is 23.1731 mm, a focal length fG2 of the second lens group G2 is −13.3389 mm, and a focal length fG3 of the third lens group G3 is 17.1871 mm, and a focal length fG4 of the fourth lens group G4 is 14.868 mm.

The focal length of the first lens 401 is −34.940 mm, the focal length of the second lens 402 is 13.578 mm, the focal length of the third lens 403 is −6.774 mm, the focal length of the fourth lens 404 is 66.463 mm, the focal length of the fifth lens 405 is 27.321 mm, the focal length of the sixth lens 406 is 7.941 mm, the focal length of the seventh lens 407 is −10.044 mm, and the focal length of the eighth lens 408 is 14.868 mm.

One half of a diagonal length of the imaging plane of the image sensor (IMG HT) is 3.2 mm, and an entrance pupil diameter in the telephoto mode (EPDt) is 8.460 mm.

In the fourth embodiment of the present disclosure, the first lens group G1 has a positive refractive power overall, the second lens group G2 has a negative refractive power overall, the third lens group G3 has a positive refractive power overall, and the fourth lens group G4 has a positive refractive power overall.

The first lens 401 has a negative refractive power, a first surface of the first lens 401 is convex, and a second surface of the first lens 401 is concave.

The second lens 402 has a positive refractive power, a first surface of the second lens 402 is convex, and a second surface of the second lens 402 is concave.

The third lens 403 has a negative refractive power, and first and second surfaces of the third lens 403 are concave.

The fourth lens 404 has a positive refractive power, a first surface of the fourth lens 404 is concave, and a second surface of the fourth lens 404 is convex.

The fifth lens 405 has a positive refractive power, and first and second surfaces of the fifth lens 405 are convex.

The sixth lens 406 has a positive refractive power, and first and second surfaces of the sixth lens 406 are convex. A stop is disposed in front of (e.g., an object-side surface) the sixth lens 406.

The seventh lens 407 has a negative refractive power, a first surface of the seventh lens 407 is convex, and a second surface of the seventh lens 407 is concave.

The eighth lens 408 has a positive refractive power, a first surface of the eighth lens 408 is convex, and a second surface of the eighth lens 408 is concave.

Each surface of the first to eighth lenses 401 to 408 has aspherical coefficients as illustrated in Table 12 below. For example, both an object-side surface and an image-side surface of the first to eighth lenses 401 to 408 are aspherical surfaces.

TABLE 12

| | S4 | S5 | S6 | S7 | S8 | S9 | S10 | S11 |
|---|---|---|---|---|---|---|---|---|
| Conic Constant (K) | 0.277 | −0.225 | −1.813 | 64.432 | −7.582 | 0.752 | 78.350 | 33.323 |
| 4th Coefficient (A) | −1.190E−01 | −2.229E−02 | 4.463E−01 | 5.044E−02 | 4.125E−02 | −9.292E−02 | −2.754E−02 | 2.087E−02 |
| 6th Coefficient (B) | −2.857E−02 | −2.480E−02 | 1.701E−02 | 2.467E−03 | 1.878E−02 | 2.523E−02 | −4.881E−03 | −1.114E−02 |
| 8th Coefficient (C) | −5.968E−03 | −1.567E−02 | −3.481E−03 | 5.837E−03 | −1.541E−02 | −1.563E−02 | −6.236E−03 | 3.982E−02 |

TABLE 12-continued

| | | | | | | | | |
|---|---|---|---|---|---|---|---|---|
| 10th Coefficient (D) | −9.513E−04 | −5.198E−03 | −7.848E−03 | −1.238E−03 | 5.416E−03 | −4.829E−03 | −6.548E−03 | 3.714E−02 |
| 12th Coefficient (E) | −5.228E−04 | −3.425E−03 | −7.082E−03 | 2.126E−04 | 5.843E−05 | −1.282E−03 | −1.301E−03 | 3.291E−02 |
| 14th Coefficient (F) | 3.234E−04 | 4.364E−04 | −3.224E−03 | −8.598E−04 | 1.157E−03 | −1.470E−03 | −1.309E−03 | 2.125E−02 |
| 16th Coefficient (G) | −1.367E−05 | −3.870E−06 | −1.058E−03 | 1.603E−04 | 1.813E−03 | −2.253E−04 | −5.893E−04 | 1.150E−02 |
| 18th Coefficient (H) | −1.387E−04 | −1.181E−04 | −4.457E−04 | −6.292E−04 | 4.474E−04 | −1.768E−04 | −4.757E−04 | 5.434E−03 |
| 20th Coefficient (J) | 1.537E−04 | 7.788E−05 | 2.203E−04 | 2.591E−04 | 3.928E−04 | 1.616E−04 | −1.145E−04 | 1.755E−03 |
| 22nd Coefficient (L) | −9.449E−05 | −2.247E−04 | 1.873E−04 | 5.778E−04 | −2.103E−04 | −2.962E−05 | −1.250E−04 | −2.569E−02 |
| 24th Coefficient (M) | 6.229E−05 | −4.117E−05 | 5.052E−04 | 4.807E−04 | −1.721E−04 | 8.309E−05 | −5.968E−05 | −2.371E−04 |
| 26th Coefficient (N) | −1.607E−05 | −1.466E−04 | 2.566E−04 | −2.456E−05 | −3.252E−04 | 2.129E−05 | −9.882E−06 | −2.597E−03 |
| 28th Coefficient (O) | −7.229E−05 | −2.616E−04 | −3.764E−06 | 7.211E−05 | −7.907E−05 | 5.769E−06 | −2.620E−07 | 1.497E−05 |
| 30th Coefficient (P) | −1.313E−05 | −4.781E−06 | 7.645E−05 | −2.552E−06 | −1.029E−04 | 1.868E−05 | −3.860E−06 | 2.478E−04 |

| | S12 | S13 | S15 | S16 | S17 | S18 | S19 | S20 |
|---|---|---|---|---|---|---|---|---|
| Conic Constant (K) | −61.336 | −80.000 | −0.545 | 62.815 | −33.078 | −0.134 | 0.202 | 12.259 |
| 4th Coefficient (A) | −6.406E−02 | −1.324E−01 | −6.584E−02 | −1.340E−01 | −3.123E−02 | −3.357E−02 | 3.662E−02 | 3.511E−02 |
| 6th Coefficient (B) | −1.437E−02 | 5.065E−03 | −1.883E−02 | 5.080E−02 | 3.066E−02 | 1.545E−02 | 8.509E−03 | −1.066E−02 |
| 8th Coefficient (C) | 2.639E−03 | −2.663E−04 | −5.796E−03 | −1.869E−02 | −2.775E−02 | −4.067E−03 | 1.099E−03 | −2.304E−03 |
| 10th Coefficient (D) | 1.138E−03 | 2.133E−03 | −1.996E−05 | 4.410E−03 | −1.059E−03 | 2.039E−03 | 7.615E−04 | −1.610E−03 |
| 12th Coefficient (E) | −1.093E−03 | −9.275E−04 | −3.094E−05 | −1.208E−02 | −1.009E−02 | −5.587E−04 | 6.503E−05 | −2.086E−04 |
| 14th Coefficient (F) | 6.618E−04 | 4.850E−04 | 3.753E−04 | 1.555E−04 | 5.791E−03 | 4.253E−04 | 2.217E−04 | −2.412E−04 |
| 16th Coefficient (G) | −3.201E−04 | −1.729E−04 | −1.191E−04 | −1.640E−03 | 9.790E−04 | −3.128E−04 | −2.523E−05 | −3.194E−05 |
| 18th Coefficient (H) | −7.242E−05 | 4.753E−05 | −4.506E−05 | 3.725E−03 | 1.686E−03 | 1.944E−04 | 1.642E−04 | −1.180E−04 |
| 20th Coefficient (J) | 1.517E−04 | 8.961E−06 | −1.730E−04 | 2.094E−03 | −2.234E−03 | −2.053E−04 | 4.074E−05 | −3.647E−06 |
| 22nd Coefficient (L) | −8.398E−05 | −3.211E−06 | 4.681E−05 | 3.169E−03 | −8.245E−04 | 9.661E−05 | 7.408E−05 | −3.289E−05 |
| 24th Coefficient (M) | −9.981E−05 | −6.241E−05 | 6.645E−06 | 1.137E−03 | −1.554E−03 | −1.494E−05 | −2.792E−05 | 3.015E−05 |
| 26th Coefficient (N) | 1.181E−04 | 3.889E−05 | 6.324E−06 | 1.647E−03 | 4.900E−05 | 8.561E−06 | −6.824E−06 | −2.421E−06 |

TABLE 12-continued

| | | | | | | | | |
|---|---|---|---|---|---|---|---|---|
| 28th Coefficient (O) | −3.019E−05 | 4.660E−08 | −1.152E−05 | 2.824E−04 | −5.826E−04 | −6.419E−06 | −3.768E−05 | 2.753E−05 |
| 30th Coefficient (P) | 4.304E−07 | −2.525E−06 | −1.211E−05 | 3.267E−04 | 7.500E−05 | 1.146E−06 | 8.067E−06 | −1.504E−05 |

Figure 13:
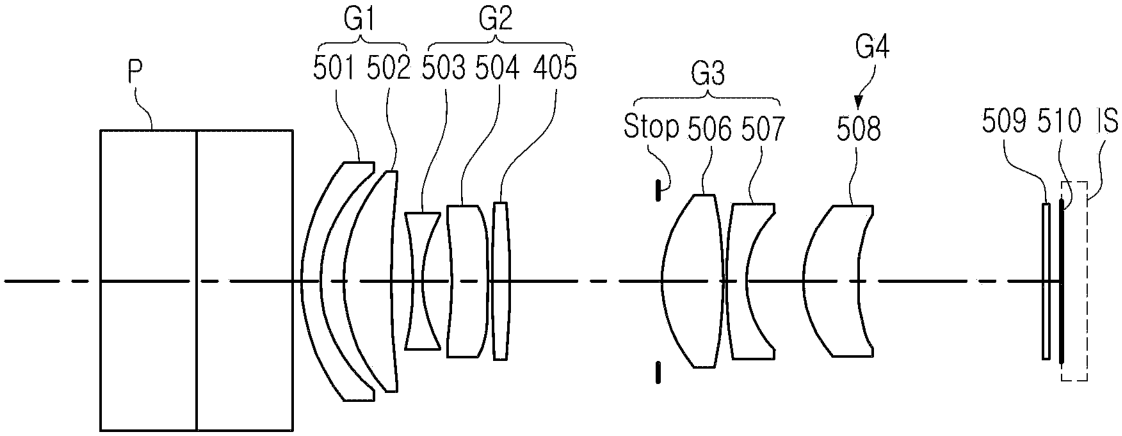
FIG. 13 is a diagram illustrating a wide-angle mode of an optical imaging system according to a fifth embodiment of the present disclosure.
Figure 14:
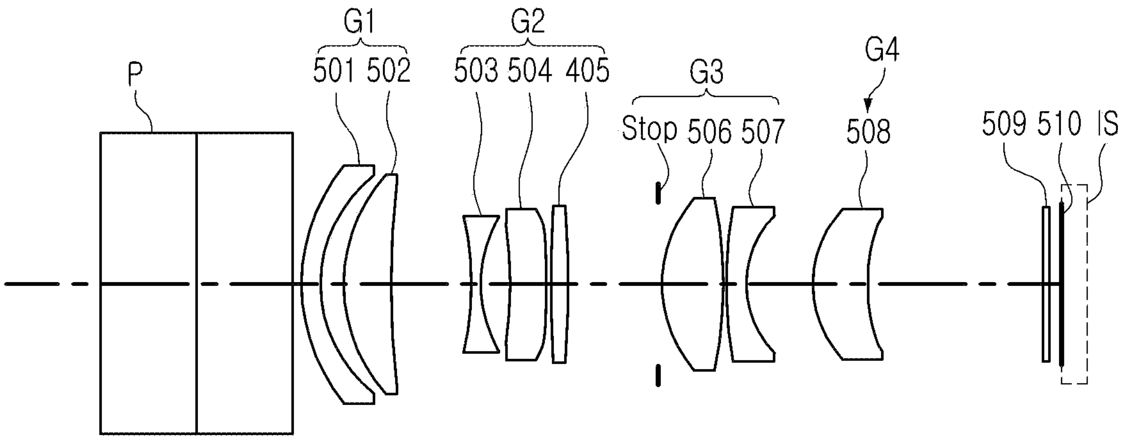
FIG. 14 is a diagram illustrating a normal mode of the optical imaging system of FIG. 13.
Figure 15:
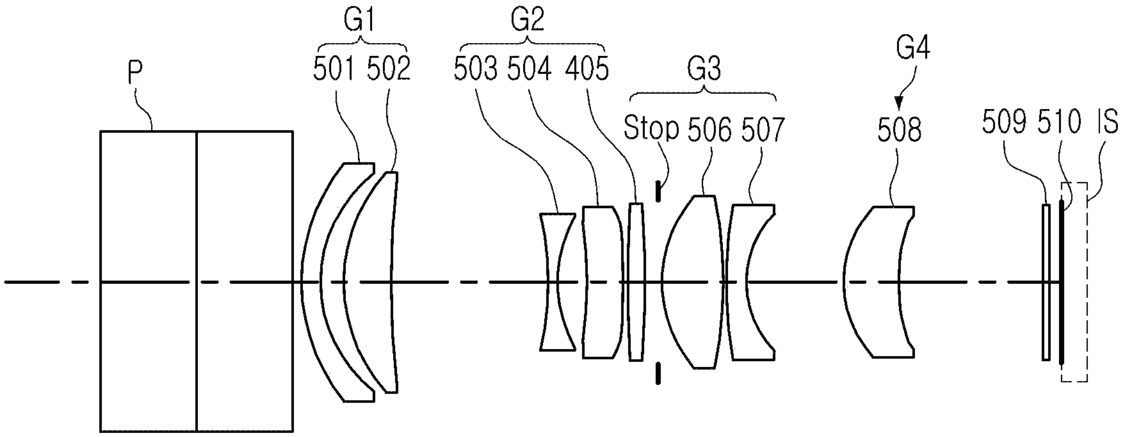
FIG. 15 is a diagram illustrating a telephoto mode of the optical imaging system of FIG. 13.

FIG. 13 is a diagram illustrating a wide-angle mode of an optical imaging system according to a fifth embodiment of the present disclosure, FIG. 14 is a diagram illustrating a normal mode of the optical imaging system of FIG. 13, and FIG. 15 is a diagram illustrating a telephoto mode of the optical imaging system of FIG. 13.

An optical imaging system according to a fifth embodiment of the present disclosure will be described with reference to FIGS. 13 to 15.

The optical imaging system according to the fifth embodiment of the present disclosure includes a first lens group G1, a second lens group G2, a third lens group G3, and a fourth lens group G4. The optical imaging system further includes a reflective member P disposed in front of the first lens group G1.

The first lens group G1 includes a first lens 501 and a second lens 502, the second lens group G2 includes a third lens 503, a fourth lens 504, and a fifth lens 505, the third lens group G3 includes a stop, a sixth lens 506, and a seventh lens 507, and the fourth lens group G4 includes an eighth lens 508 sequentially disposed from an object side of the optical imaging system.

In addition, the optical imaging system may further include a filter 509 and an image sensor IS.

The optical imaging system according to the fifth embodiment of the present disclosure may focus an image on an imaging plane 510. The imaging plane 510 may refer to a surface on which an image is focused by the optical imaging system. As an example, the imaging plane 510 may refer to one surface of the image sensor IS on which light is incident through the optical imaging system.

In the fifth embodiment of the present disclosure, the reflective member P may be a prism, but may also be provided as a mirror.

At least one lens group among the first to fourth lens groups G1 to G4 may be moved to change a total focal length of the optical imaging system. For example, the first lens group G1 and the third lens group G3 are fixed and the second lens group G2 is movable along the optical axis so that the total focal length of the optical imaging system may be changed. That is, as the second lens group G2 moves away from the object side of the optical imaging system toward an image side of the optical imaging system, the total focal length of the optical imaging system may be changed from the wide-angle mode to the normal mode, and then from the normal mode to the telephoto mode.

In addition, at least one lens group among the first to fourth lens groups G1 to G4 may be moved to correct a focus position according to a change in the total focal length of the optical imaging system. For example, when the total focal length of the optical imaging system is changed from the wide-angle mode to the telephoto mode, the fourth lens group G4 may be moved along the optical axis to correct the focus position.

Characteristics of each lens including a radius of curvature, a thickness of a lens or a distance between lenses, a refractive index, an Abbe number, and an effective radius are illustrated in Table 13 below.

TABLE 13

| Surface No. | Element | Radius of Curvature | Thickness or Distance | Refractive Index | Abbe Number | Effective Radius | Lens Group |
|---|---|---|---|---|---|---|---|
| Object | | Infinity | D0 | | | | |
| S1 | Prism | Infinity | 4 | 1.5168 | 64.2 | 6 | |
| S2 | | Infinity | 4 | 1.5168 | 64.2 | 5.63 | |
| S3 | | Infinity | 0.4 | | | 5.26 | |
| S4 | First | 7.603 | 0.84 | 1.6355 | 23.89 | 5 | First |
| S5 | Lens | 5.487 | 0.92 | | | 4.6 | Lens |
| S6 | Second | 6.732 | 2.04 | 1.535 | 55.73 | 4.62 | Group |
| S7 | Lens | 76.621 | D1 | | | 4.52 | |
| S8 | Third | −12.359 | 0.38 | 1.535 | 55.73 | 2.9 | Second |
| S9 | Lens | 5.198 | 1.247 | | | 2.74 | Lens |
| S10 | Fourth | −35.75 | 1.55 | 1.535 | 55.73 | 2.78 | Group |
| S11 | Lens | −19.283 | 0.15 | | | 3.17 | |
| S12 | Fifth | 21.209 | 0.74 | 1.6355 | 23.89 | 3.27 | |
| S13 | Lens | 660.848 | D2 | | | 3.32 | |
| S14 | Stop | Infinity | 0.15 | | | 3.45 | Third |
| S15 | Sixth | 4.798 | 2.55 | 1.535 | 55.73 | 3.59 | Lens |
| S16 | Lens | −30.439 | 0.15 | | | 3.45 | Group |
| S17 | Seventh | 11.736 | 0.78 | 1.6355 | 23.89 | 3.25 | |
| S18 | Lens | 3.952 | D3 | | | 2.87 | |
| S19 | Eighth | 4.823 | 2.35 | 1.535 | 55.73 | 3.2 | Fourth |
| S20 | Lens | 10.642 | D4 | | | 2.82 | Lens Group |
| S21 | Filter | Infinity | 0.21 | 1.5168 | 64.2 | 3.19 | |
| S22 | | Infinity | D5 | | | 3.2 | |
| S23 | Imaging Plane | Infinity | | | | | |

TABLE 14

| Object at Infinity | | | | Object at Near Focus Position | | | |
|---|---|---|---|---|---|---|---|
| Value | Wide-Angle Mode | Normal Mode | Telephoto Mode | Value | Wide-Angle Mode | Normal Mode | Telephoto Mode |
| D0 | Infinity | Infinity | Infinity | D0 | 400 | 400 | 600 |
| D1 | 0.85672 | 3.29266 | 6.52858 | D1 | 0.85672 | 3.29266 | 6.52858 |
| D2 | 6.254 | 3.81806 | 0.58214 | D2 | 6.254 | 3.81806 | 0.58214 |
| D3 | 2.37727 | 2.71999 | 4 | D3 | 2.09824 | 2.28351 | 3.44282 |
| D4 | 7.70787 | 7.36515 | 6.08514 | D4 | 7.9869 | 7.80163 | 6.64232 |
| D5 | 0.1 | 0.1 | 0.1 | D5 | 0.1 | 0.1 | 0.1 |
| f | 10.3335 | 12.8801 | 17.2348 | MAG | 0.02509 | 0.03115 | 0.02791 |
| HFOV | 17.421 | 13.957 | 10.487 | HFOV | 17.172 | 13.66 | 10.288 |

TABLE 14-continued

| Object at Infinity | | | | Object at Near Focus Position | | | |
|---|---|---|---|---|---|---|---|
| Value | Wide-Angle Mode | Normal Mode | Telephoto Mode | Value | Wide-Angle Mode | Normal Mode | Telephoto Mode |
| Fno | 2.037 | 2.013 | 2.009 | Fno | 2.03 | 1.997 | 1.97 |
| L | 39.75286 | 39.75286 | 39.75286 | L | 39.75286 | 39.75286 | 39.75286 |

In Table 14 above, D0 is an object distance, i.e., a distance on the optical axis between an object and a first surface of the reflective member P, D1 is a distance on the optical axis between the second lens 502 and the third lens 503, D2 is a distance on the optical axis between the fifth lens 505 and the stop, D3 is a distance on the optical axis between the seventh lens 507 and the eighth lens 508, D4 is a distance on the optical axis between the eighth lens 508 and the filter 509, and D5 is a distance on the optical axis between the filter 509 and the imaging plane 510.

f is a total focal length of the optical imaging system, MAG is a magnification of the optical imaging system, HFOV is one half of a field of view of the optical imaging system, Fno is an f-number of the optical imaging system, and L is a distance on the optical axis from the first surface of the reflective member P to the imaging plane 510.

The values in Table 14 above are listed for the wide-angle, normal, and telephoto modes for both an object at infinity and an object at a near focus position of the optical imaging system, i.e., a closest position of the object at which the optical imaging system can focus an image of the object.

A focal length fG1 of the first lens group G1 is 22.5202 mm, a focal length fG2 of the second lens group G2 is −11.4380 mm, and a focal length fG3 of the third lens group G3 is 18.5548 mm, and a focal length fG4 of the fourth lens group G4 is 14.453 mm.

The focal length of the first lens 501 is −36.682 mm, the focal length of the second lens 502 is 13.656 mm, the focal length of the third lens 503 is −6.788 mm, the focal length of the fourth lens 504 is 75.764 mm, the focal length of the fifth lens 505 is 34.465 mm, the focal length of the sixth lens 506 is 7.948 mm, the focal length of the seventh lens 507 is −9.756 mm, and the focal length of the eighth lens 508 is 14.453 mm.

One half of a diagonal length of the imaging plane of the image sensor (IMG HT) is 3.2 mm, and an entrance pupil diameter in the telephoto mode (EPDt) is 8.579 mm.

In the fifth embodiment of the present disclosure, the first lens group G1 has a positive refractive power overall, the second lens group G2 has a negative refractive power overall, the third lens group G3 has a positive refractive power overall, and the fourth lens group G4 has a positive refractive power overall.

The first lens 501 has a negative refractive power, a first surface of the first lens 501 is convex, and a second surface of the first lens 501 is concave.

The second lens 502 has a positive refractive power, a first surface of the second lens 502 is convex, and a second surface of the second lens 502 is concave.

The third lens 503 has a negative refractive power, and first and second surfaces of the third lens 503 are concave.

The fourth lens 504 has a positive refractive power, a first surface of the fourth lens 504 is concave, and a second surface of the fourth lens 504 is convex.

The fifth lens 505 has a positive refractive power, and a first surface of the fifth lens 505 is convex, and a second surface of the fifth lens 505 is concave.

The sixth lens 506 has a positive refractive power, and first and second surfaces of the sixth lens 506 are convex. A stop is disposed in front of (e.g., an object-side surface) the sixth lens 506.

The seventh lens 507 has a negative refractive power, a first surface of the seventh lens 507 is convex, and a second surface of the seventh lens 507 is concave.

The eighth lens 508 has a positive refractive power, a first surface of the eighth lens 508 is convex, and a second surface of the eighth lens 508 is concave.

Each surface of the first to eighth lenses 501 to 508 has aspherical coefficients as illustrated in Table 15 below. For example, both an object-side surface and an image-side surface of the first to eighth lenses 501 to 508 are aspherical surfaces.

TABLE 15

| | S4 | S5 | S6 | S7 | S8 | S9 | S10 | S11 |
|---|---|---|---|---|---|---|---|---|
| Conic Constant (K) | 0.280 | −0.243 | −2.039 | 75.737 | −7.250 | 0.764 | 75.546 | 33.413 |
| 4th Coefficient (A) | −1.161E−01 | −3.443E−02 | 4.131E−01 | 7.065E−02 | 3.758E−02 | −9.006E−02 | −7.616E−03 | 1.924E−02 |
| 6th Coefficient (B) | −3.091E−02 | −3.008E−02 | 6.284E−03 | 8.919E−03 | 1.820E−02 | 2.172E−02 | −3.743E−04 | −2.451E−02 |
| 8th Coefficient (C) | −8.347E−03 | −1.597E−02 | −2.904E−03 | 3.800E−03 | −1.573E−02 | −1.588E−02 | 1.441E−03 | −1.160E−04 |
| 10th Coefficient (D) | −1.478E−03 | −4.806E−03 | −7.030E−03 | −5.617E−03 | 5.740E−03 | −3.926E−03 | −6.167E−04 | −2.705E−03 |
| 12th Coefficient (E) | −1.018E−03 | −3.692E−03 | −6.334E−03 | −1.707E−03 | 2.678E−04 | −1.659E−03 | 1.851E−04 | 8.177E−05 |

TABLE 15-continued

| | | | | | | | | |
|---|---|---|---|---|---|---|---|---|
| 14th Coefficient (F) | 8.788E−05 | 7.346E−05 | −2.641E−03 | −6.962E−04 | 1.955E−03 | −1.397E−03 | −5.241E−05 | 2.069E−04 |
| 16th Coefficient (G) | −5.134E−04 | −8.530E−04 | −1.427E−03 | 1.349E−03 | 1.688E−03 | −1.957E−04 | −1.006E−05 | −1.032E−04 |
| 18th Coefficient (H) | −4.772E−05 | 9.537E−05 | −2.215E−04 | 9.951E−04 | 2.397E−04 | −1.389E−04 | 8.462E−06 | −1.112E−04 |
| 20th Coefficient (J) | 8.710E−05 | 2.119E−04 | 1.124E−04 | 1.167E−03 | 9.411E−05 | 1.130E−04 | −1.225E−06 | 2.069E−04 |
| 22nd Coefficient (L) | −2.587E−04 | −3.836E−04 | −2.180E−04 | 6.521E−04 | −2.991E−04 | −2.963E−05 | −1.464E−03 | −7.219E−05 |
| 24th Coefficient (M) | 7.960E−05 | 1.145E−04 | 3.181E−04 | 6.919E−04 | −1.210E−04 | 1.007E−04 | −6.385E−04 | −7.777E−05 |
| 26th Coefficient (N) | 2.334E−05 | 1.721E−04 | 2.927E−04 | 1.778E−04 | −1.316E−04 | 2.971E−05 | −4.505E−04 | 1.003E−04 |
| 28th Coefficient (O) | −9.064E−05 | −1.302E−04 | −5.284E−06 | 1.214E−04 | 6.969E−05 | 6.957E−06 | −1.507E−04 | −3.966E−05 |
| 30th Coefficient (P) | −7.537E−05 | −8.991E−05 | 3.222E−05 | 2.774E−05 | −4.177E−05 | 2.089E−05 | −1.472E−04 | 6.963E−06 |

| | S12 | S13 | S15 | S16 | S17 | S18 | S19 | S20 |
|---|---|---|---|---|---|---|---|---|
| Conic Constant (K) | −62.855 | 76.791 | −0.548 | 62.689 | −33.506 | −0.165 | 0.215 | 12.732 |
| 4th Coefficient (A) | −6.437E−02 | −1.216E−01 | −6.681E−02 | −1.204E−01 | −3.282E−02 | −4.082E−02 | 3.556E−02 | 4.501E−02 |
| 6th Coefficient (B) | −1.326E−02 | 4.260E−03 | −1.943E−02 | 4.539E−02 | 2.688E−02 | 1.553E−02 | 1.272E−02 | −9.011E−03 |
| 8th Coefficient (C) | 2.878E−03 | 4.780E−05 | −5.018E−03 | −2.134E−02 | −2.896E−02 | −3.947E−03 | 6.166E−05 | −3.734E−03 |
| 10th Coefficient (D) | 1.053E−03 | 2.196E−03 | −7.088E−04 | 2.891E−03 | 9.536E−05 | 1.821E−03 | 1.435E−03 | −1.732E−03 |
| 12th Coefficient (E) | −1.001E−03 | −8.673E−04 | −1.174E−04 | −1.083E−02 | −8.227E−03 | −5.706E−04 | −2.854E−04 | −6.783E−04 |
| 14th Coefficient (F) | 6.900E−04 | 4.922E−04 | 3.902E−05 | 1.246E−03 | 5.272E−03 | 4.458E−04 | 4.859E−04 | −2.738E−04 |
| 16th Coefficient (G) | −3.088E−04 | −1.821E−04 | −2.206E−04 | −8.528E−04 | 6.769E−04 | −3.042E−04 | −1.693E−04 | −1.161E−04 |
| 18th Coefficient (H) | −6.345E−05 | 4.296E−05 | −1.856E−04 | 3.912E−03 | 1.535E−03 | 1.947E−04 | 1.714E−04 | −9.202E−05 |
| 20th Coefficient (J) | 1.515E−04 | 1.544E−05 | −1.264E−04 | 1.526E−03 | −2.394E−03 | −2.104E−04 | −9.437E−05 | −9.100E−06 |
| 22nd Coefficient (L) | −8.220E−05 | −3.134E−06 | 3.430E−05 | 2.586E−03 | −9.311E−04 | 8.594E−05 | 5.206E−05 | −1.245E−05 |
| 24th Coefficient (M) | −1.010E−04 | −6.255E−05 | 8.323E−06 | 7.095E−04 | −1.605E−03 | −1.497E−05 | −7.962E−05 | 3.327E−05 |
| 26th Coefficient (N) | 1.193E−04 | 3.928E−05 | −2.648E−05 | 1.510E−03 | 8.959E−05 | 1.906E−05 | 9.115E−06 | −1.796E−06 |
| 28th Coefficient (O) | −3.015E−05 | 5.702E−08 | −3.652E−06 | 1.451E−04 | −5.824E−04 | −1.108E−05 | −3.272E−05 | 2.247E−05 |
| 30th Coefficient (P) | −5.572E−08 | −2.628E−06 | −2.277E−05 | 3.160E−04 | −3.215E−06 | 1.497E−06 | 2.885E−05 | −2.141E−05 |

Figure 16:
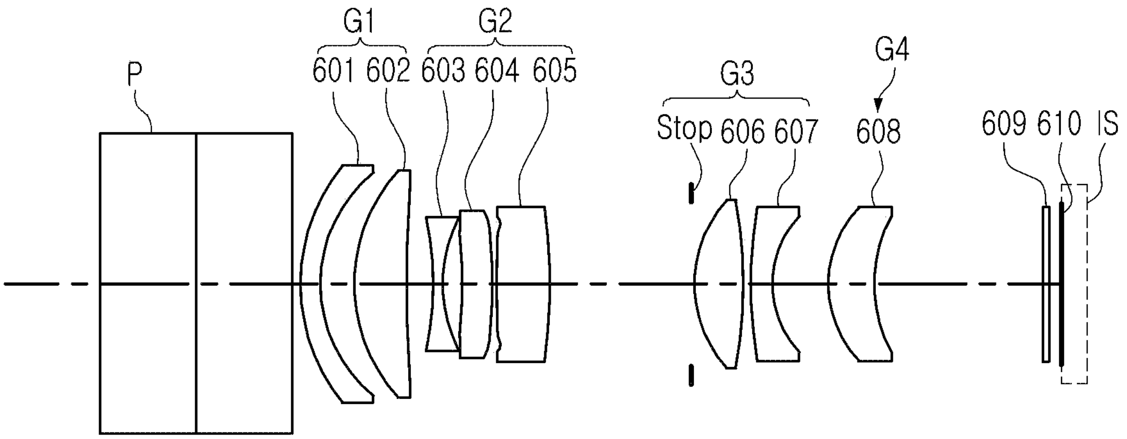
FIG. 16 is a diagram illustrating a wide-angle mode of an optical imaging system according to a sixth embodiment of the present disclosure.
Figure 17:
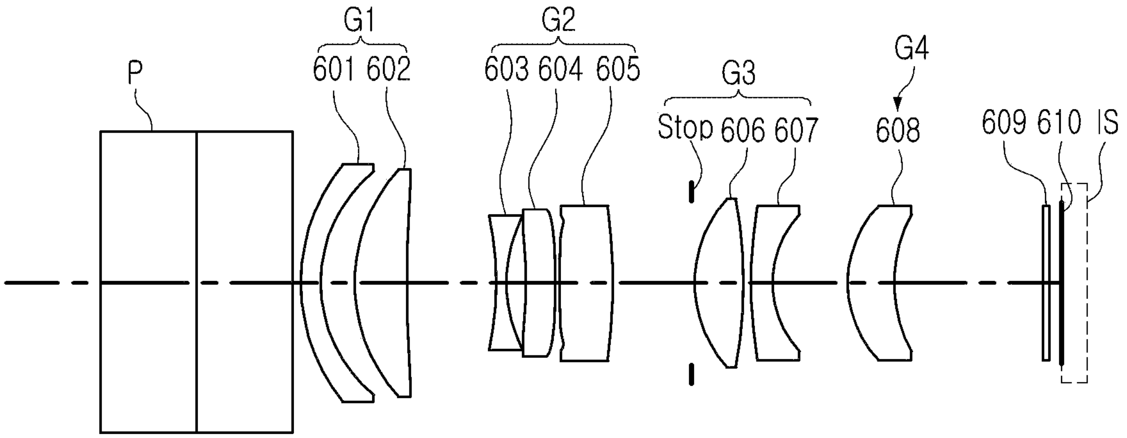
FIG. 17 is a diagram illustrating a normal mode of the optical imaging system of FIG. 16.
Figure 18:
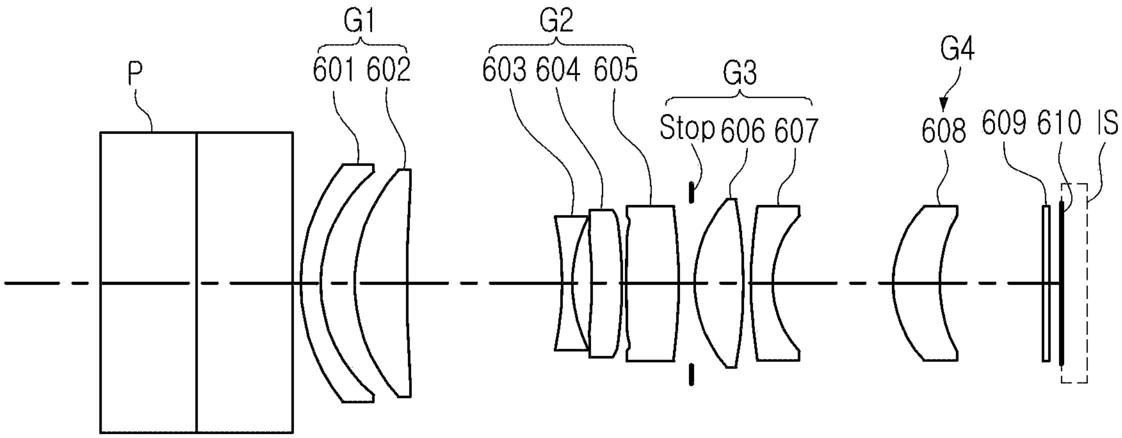
FIG. 18 is a diagram illustrating a telephoto mode of the optical imaging system of FIG. 16.

FIG. 16 is a diagram illustrating a wide-angle mode of an optical imaging system according to a sixth embodiment of the present disclosure, FIG. 17 is a diagram illustrating a normal mode of the optical imaging system of FIG. 16, and FIG. 18 is a diagram illustrating a telephoto mode of the optical imaging system of FIG. 16.

An optical imaging system according to a sixth embodiment of the present disclosure will be described with reference to FIGS. 16 to 18.

The optical imaging system according to the sixth embodiment of the present disclosure includes a first lens group G1, a second lens group G2, a third lens group G3, and a fourth lens group G4. The optical imaging system further includes a reflective member P disposed in front of the first lens group G1.

The first lens group G1 includes a first lens 601 and a second lens 602, the second lens group G2 includes a third lens 603, a fourth lens 604, and a fifth lens 605, the third lens group G3 includes a stop, a sixth lens 606, and a seventh lens 607, and the fourth lens group G4 includes an eighth lens 608 sequentially disposed from an object side of the optical imaging system.

In addition, the optical imaging system may further include a filter 609 and an image sensor IS.

The optical imaging system according to the sixth embodiment of the present disclosure may focus an image on an imaging plane 610. The imaging plane 610 may refer to a surface on which an image is focused by the optical imaging system. As an example, the imaging plane 610 may refer to one surface of the image sensor IS on which light is incident through the optical imaging system.

In the sixth embodiment of the present disclosure, the reflective member P may be a prism, but may also be provided as a mirror.

At least one lens group among the first to fourth lens groups G1 to G4 may be moved to change a total focal length of the optical imaging system. For example, the first lens group G1 and the third lens group G3 are fixed and the second lens group G2 is movable along the optical axis so that the total focal length of the optical imaging system may be changed. That is, as the second lens group G2 moves away from the object side of the optical imaging system toward an image side of the optical imaging system, the total focal length of the optical imaging system may be changed from the wide-angle mode to the normal mode, and then from the normal mode to the telephoto mode.

In addition, at least one lens group among the first to fourth lens groups G1 to G4 may be moved to correct a focus position according to a change in the total focal length of the optical imaging system. For example, when the total focal length of the optical imaging system is changed from the wide-angle mode to the telephoto mode, the fourth lens group G4 may be moved along the optical axis to correct the focus position.

Characteristics of each lens including a radius of curvature, a thickness of a lens or a distance between lenses, a refractive index, an Abbe number, and an effective radius are illustrated in Table 16 below.

TABLE 16

| Surface No. | Element | Radius of Curvature | Thickness or Distance | Refractive Index | Abbe Number | Effective Radius | Lens Group |
|---|---|---|---|---|---|---|---|
| Object | | Infinity | D0 | | | | |
| S1 | Prism | Infinity | 4 | 1.5168 | 64.2 | 6 | |
| S2 | | Infinity | 4 | 1.5168 | 64.2 | 5.62 | |
| S3 | | Infinity | 0.4 | | | 5.25 | |
| S4 | First | 7.876 | 0.77 | 1.6355 | 23.89 | 5 | First |
| S5 | Lens | 5.553 | 1.387 | | | 4.63 | Lens |
| S6 | Second | 6.645 | 2.3 | 1.535 | 55.73 | 4.71 | Group |
| S7 | Lens | 160.969 | D1 | | | 4.6 | |
| S8 | Third | −10.996 | 0.37 | 1.535 | 55.73 | 2.8 | Second |
| S9 | Lens | 5.271 | 0.869 | | | 2.7 | Lens |
| S10 | Fourth | −37.274 | 1.26 | 1.535 | 55.73 | 2.7 | Group |
| S11 | Lens | −19.258 | 0.15 | | | 3.1 | |
| S12 | Fifth | 18.182 | 2.18 | 1.6355 | 23.89 | 3.01 | |
| S13 | Lens | −228.926 | D2 | | | 3.2 | |
| S14 | Stop | Infinity | 0.15 | | | 3.45 | Third |
| S15 | Sixth | 4.794 | 2.07 | 1.535 | 55.73 | 3.52 | Lens |
| S16 | Lens | −30.539 | 0.309 | | | 3.45 | Group |
| S17 | Seventh | 11.374 | 0.89 | 1.6355 | 23.89 | 3.22 | |
| S18 | Lens | 4.081 | D3 | | | 2.83 | |
| S19 | Eighth | 5.088 | 2 | 1.535 | 55.73 | 3.2 | Fourth |
| S20 | Lens | 10.628 | D4 | | | 2.85 | Lens Group |
| S21 | Filter | Infinity | 0.21 | 1.5168 | 64.2 | 3.22 | |
| S22 | | Infinity | D5 | | | 3.23 | |
| S23 | Imaging Plane | Infinity | | | | | |

TABLE 17

| Object at Infinity | | | | Object at Near Focus Position | | | |
|---|---|---|---|---|---|---|---|
| Value | Wide-Angle Mode | Normal Mode | Telephoto Mode | Value | Wide-Angle Mode | Normal Mode | Telephoto Mode |
| D0 | Infinity | Infinity | Infinity | D0 | 400 | 400 | 600 |
| D1 | 1.03337 | 3.66393 | 6.50843 | D1 | 1.03337 | 3.66393 | 6.50843 |
| D2 | 5.97506 | 3.3445 | 0.5 | D2 | 5.97506 | 3.3445 | 0.5 |
| D3 | 2.2987 | 3.09431 | 5.04327 | D3 | 1.98968 | 2.57689 | 4.34719 |
| D4 | 6.97188 | 6.17627 | 4.22731 | D4 | 7.2809 | 6.69369 | 4.92339 |
| D5 | 0.1 | 0.1 | 0.1 | D5 | 0.1 | 0.1 | 0.1 |
| f | 10.328 | 13.117 | 17.2253 | MAG | 0.02498 | 0.03149 | 0.02755 |
| HFOV | 17.126 | 13.523 | 10.372 | HFOV | 16.923 | 13.302 | 10.305 |
| Fno | 1.959 | 1.908 | 1.994 | Fno | 1.946 | 1.883 | 1.914 |
| L | 39.69401 | 39.69401 | 39.69401 | L | 39.69401 | 39.69401 | 39.69401 |

In Table 17 above, D0 is an object distance, i.e., a distance on the optical axis between an object and a first surface of the reflective member P, D1 is a distance on the optical axis between the second lens 602 and the third lens 603, D2 is a distance on the optical axis between the fifth lens 605 and the stop, D3 is a distance on the optical axis between the seventh lens 607 and the eighth lens 608, D4 is a distance on the optical axis between the eighth lens 608 and the filter 609, and D5 is a distance on the optical axis between the filter 609 and the imaging plane 610.

f is a total focal length of the optical imaging system, MAG is a magnification of the optical imaging system, HFOV is one half of a field of view of the optical imaging system, Fno is an f-number of the optical imaging system, and L is a distance on the optical axis from the first surface of the reflective member P to the imaging plane 610.

The values in Table 17 above are listed for the wide-angle, normal, and telephoto modes for both an object at infinity and an object at a near focus position of the optical imaging system, i.e., a closest position of the object at which the optical imaging system can focus an image of the object.

A focal length fG1 of the first lens group G1 is 20.7242 mm, a focal length fG2 of the second lens group G2 is −12.0816 mm, and a focal length fG3 of the third lens group G3 is 16.6347 mm, and a focal length fG4 of the fourth lens group G4 is 16.206 mm.

The focal length of the first lens 601 is −34.006 mm, the focal length of the second lens 602 is 12.888 mm, the focal length of the third lens 603 is −6.608 mm, the focal length of the fourth lens 604 is 72.702 mm, the focal length of the fifth lens 605 is 26.597 mm, the focal length of the sixth lens 606 is 7.906 mm, the focal length of the seventh lens 607 is −10.514 mm, and the focal length of the eighth lens 608 is 16.206 mm.

One half of a diagonal length of the imaging plane of the image sensor (IMG HT) is 3.2 mm, and an entrance pupil diameter in the telephoto mode (EPDt) is 8.639 mm.

In the sixth embodiment of the present disclosure, the first lens group G1 has a positive refractive power overall, the second lens group G2 has a negative refractive power overall, the third lens group G3 has a positive refractive power overall, and the fourth lens group G4 has a positive refractive power overall.

The first lens 601 has a negative refractive power, a first surface of the first lens 601 is convex, and a second surface of the first lens 601 is concave.

The second lens 602 has a positive refractive power, a first surface of the second lens 602 is convex, and a second surface of the second lens 602 is concave.

The third lens 603 has a negative refractive power, and first and second surfaces of the third lens 603 are concave.

The fourth lens 604 has a positive refractive power, a first surface of the fourth lens 604 is concave, and a second surface of the fourth lens 604 is convex.

The fifth lens 605 has a positive refractive power, and first and second surfaces of the sixth lens 605 are convex.

The sixth lens 606 has a positive refractive power, and first and second surfaces of the sixth lens 606 are convex. A stop is disposed in front of (e.g., an object-side surface) the sixth lens 606.

The seventh lens 607 has a negative refractive power, a first surface of the seventh lens 607 is convex, and a second surface of the seventh lens 607 is concave.

The eighth lens 608 has a positive refractive power, a first surface of the eighth lens 608 is convex, and a second surface of the eighth lens 608 is concave.

Each surface of the first to eighth lenses 601 to 608 has aspherical coefficients as illustrated in Table 18 below. For example, both an object-side surface and an image-side surface of the first to eighth lenses 601 to 608 are aspherical surfaces.

TABLE 18

| | S4 | S5 | S6 | S7 | S8 | S9 | S10 | S11 |
|---|---|---|---|---|---|---|---|---|
| Conic Constant (K) | 0.278 | −0.243 | −1.987 | −31.786 | −8.774 | 0.689 | 12.625 | 33.403 |
| 4th Coefficient (A) | −1.214E−01 | −2.764E−02 | 4.205E−01 | 6.710E−02 | 5.014E−02 | −8.122E−02 | −1.192E−02 | 1.388E−02 |
| 6th Coefficient (B) | −2.782E−02 | −3.478E−02 | 7.896E−03 | 1.147E−02 | 1.656E−02 | 2.497E−02 | −9.699E−03 | −2.247E−02 |
| 8th Coefficient (C) | −1.075E−02 | −1.397E−02 | −2.447E−05 | −2.512E−03 | −1.511E−02 | −5.351E−03 | −7.348E−03 | 6.015E−04 |
| 10th Coefficient (D) | −4.322E−04 | −3.547E−03 | −5.179E−03 | −8.547E−03 | 4.852E−03 | −1.008E−03 | −7.143E−03 | −9.386E−04 |
| 12th Coefficient (E) | −1.370E−03 | −2.284E−03 | −4.569E−03 | −4.222E−03 | −5.525E−04 | 8.198E−04 | −1.551E−03 | −1.298E−04 |
| 14th Coefficient (F) | 9.568E−04 | 6.181E−04 | −2.396E−03 | −2.054E−03 | 1.949E−03 | −4.997E−04 | −1.567E−03 | 7.149E−04 |
| 16th Coefficient (G) | −3.058E−04 | −3.076E−04 | −1.431E−03 | 2.971E−04 | 2.463E−03 | 2.791E−04 | −4.648E−04 | −5.837E−05 |
| 18th Coefficient (H) | 1.943E−04 | −2.430E−05 | −3.792E−04 | 5.010E−04 | 2.678E−04 | −2.501E−04 | −3.262E−04 | −1.371E−04 |
| 20th Coefficient (J) | 1.741E−04 | 1.856E−04 | −3.769E−05 | 5.762E−04 | 9.951E−05 | 5.704E−05 | 1.420E−04 | 4.690E−05 |
| 22nd Coefficient (L) | 8.196E−05 | −8.487E−05 | −5.822E−05 | 2.212E−04 | −6.851E−04 | −2.442E−05 | 1.188E−04 | −1.014E−04 |

TABLE 18-continued

| | | | | | | | | |
|---|---|---|---|---|---|---|---|---|
| 24th Coefficient (M) | 1.176E−04 | 6.922E−05 | 4.902E−05 | 2.500E−04 | −1.757E−04 | 9.996E−05 | −9.709E−05 | −1.666E−04 |
| 26th Coefficient (N) | 1.401E−04 | 1.436E−04 | 2.549E−04 | 1.979E−05 | −1.889E−04 | −1.892E−06 | 5.207E−05 | 3.003E−04 |
| 28th Coefficient (O) | 6.179E−05 | 1.436E−04 | 9.602E−05 | −7.653E−05 | 1.668E−04 | 3.954E−05 | −3.011E−06 | −6.917E−05 |
| 30th Coefficient (P) | −8.938E−05 | −1.310E−04 | 3.741E−06 | 2.099E−05 | 4.525E−05 | −1.973E−04 | −3.667E−07 | 2.979E−05 |

| | S12 | S13 | S15 | S16 | S17 | S18 | S19 | S20 |
|---|---|---|---|---|---|---|---|---|
| Conic Constant (K) | −80.000 | −80.000 | −0.538 | 62.655 | −35.122 | −0.136 | 0.382 | 12.588 |
| 4th Coefficient (A) | −7.279E−02 | −2.348E+01 | −6.383E−02 | −1.253E−01 | −3.844E−02 | −3.690E−02 | 6.024E−02 | 7.136E−02 |
| 6th Coefficient (B) | −1.326E−02 | −2.257E+01 | −2.040E−02 | 5.064E−02 | 3.101E−02 | 1.602E−02 | 1.778E−02 | −4.716E−03 |
| 8th Coefficient (C) | 2.167E−03 | −1.781E+01 | −6.344E−03 | −2.155E−02 | −2.752E−02 | −4.292E−03 | −1.479E−03 | −3.439E−03 |
| 10th Coefficient (D) | 4.081E−04 | −1.155E+01 | −3.226E−04 | 2.789E−03 | −1.606E−03 | 2.253E−03 | 1.994E−03 | −1.539E−03 |
| 12th Coefficient (E) | −1.142E−03 | −6.151E+00 | −5.628E−04 | −1.118E−02 | −8.268E−03 | −8.603E−04 | −8.408E−04 | −7.210E−04 |
| 14th Coefficient (F) | 5.545E−04 | −2.628E+00 | −6.833E−04 | 5.867E−04 | 5.384E−03 | 3.833E−04 | 6.427E−04 | −2.681E−04 |
| 16th Coefficient (G) | −1.997E−04 | −8.616E−01 | −9.989E−04 | −2.510E−04 | 6.193E−04 | −4.177E−04 | −3.798E−04 | −1.325E−04 |
| 18th Coefficient (H) | −5.579E−05 | −1.958E−01 | −7.010E−04 | 3.731E−03 | 1.027E−03 | 1.834E−04 | 3.168E−04 | −6.491E−05 |
| 20th Coefficient (J) | 2.759E−06 | −2.428E−02 | −4.146E−04 | 1.917E−03 | −1.729E−03 | −1.439E−04 | −1.896E−04 | −1.551E−05 |
| 22nd Coefficient (L) | −3.940E−05 | 0.000E+00 | −1.172E−04 | 2.275E−03 | −6.290E−04 | 1.252E−04 | 1.391E−04 | −2.519E−05 |
| 24th Coefficient (M) | −1.455E−04 | 0.000E+00 | −1.680E−04 | 7.935E−04 | −1.412E−03 | −4.521E−05 | −1.041E−04 | 3.886E−05 |
| 26th Coefficient (N) | 1.367E−04 | 0.000E+00 | −2.133E−04 | 1.094E−03 | −6.598E−04 | 2.642E−05 | 6.215E−05 | −3.199E−05 |
| 28th Coefficient (O) | −6.183E−05 | 0.000E+00 | −1.032E−04 | 2.327E−04 | −8.612E−04 | −1.898E−05 | −8.339E−05 | 4.207E−05 |
| 30th Coefficient (P) | 1.187E−06 | 0.000E+00 | −9.621E−05 | 1.751E−04 | −1.145E−04 | 4.341E−06 | 3.745E−05 | −2.180E−05 |

Figure 19:
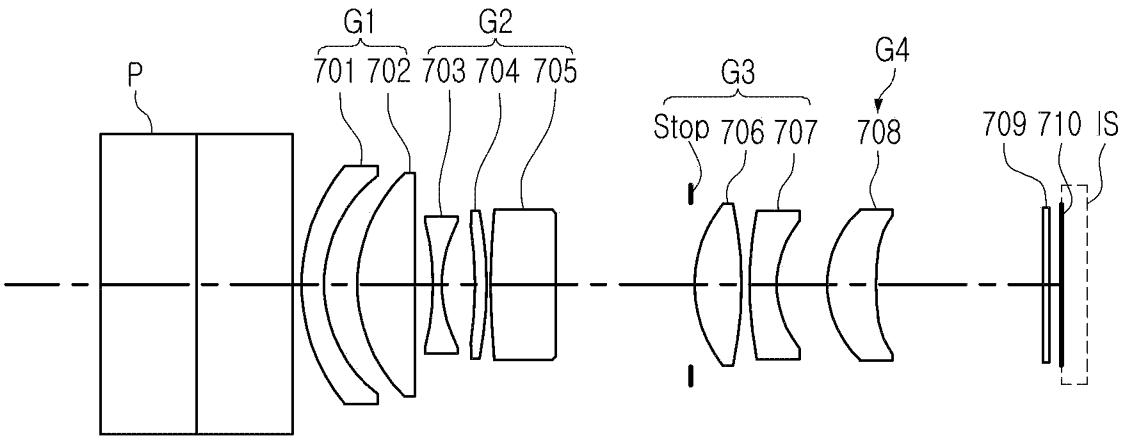
FIG. 19 is a diagram illustrating a wide-angle mode of an optical imaging system according to a seventh embodiment of the present disclosure.
Figure 20:
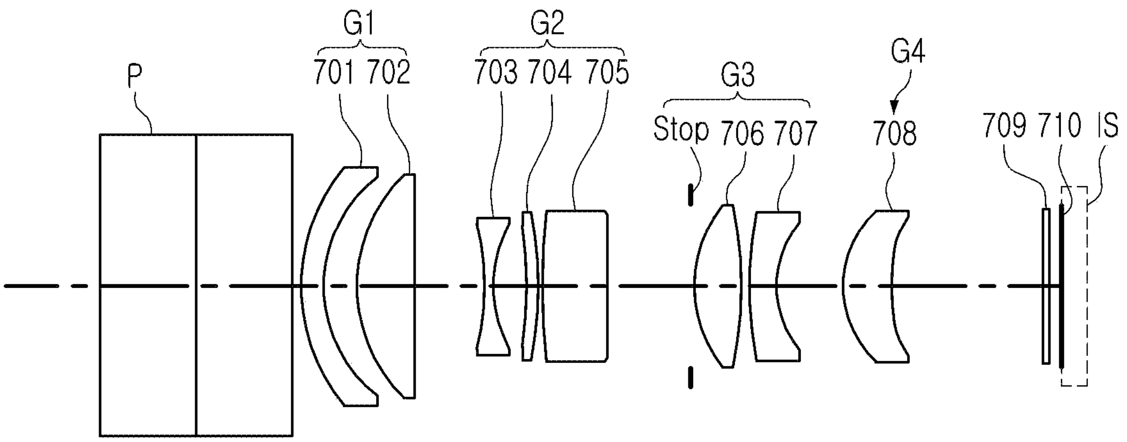
FIG. 20 is a diagram illustrating a normal mode of the optical imaging system of FIG. 19.
Figure 21:
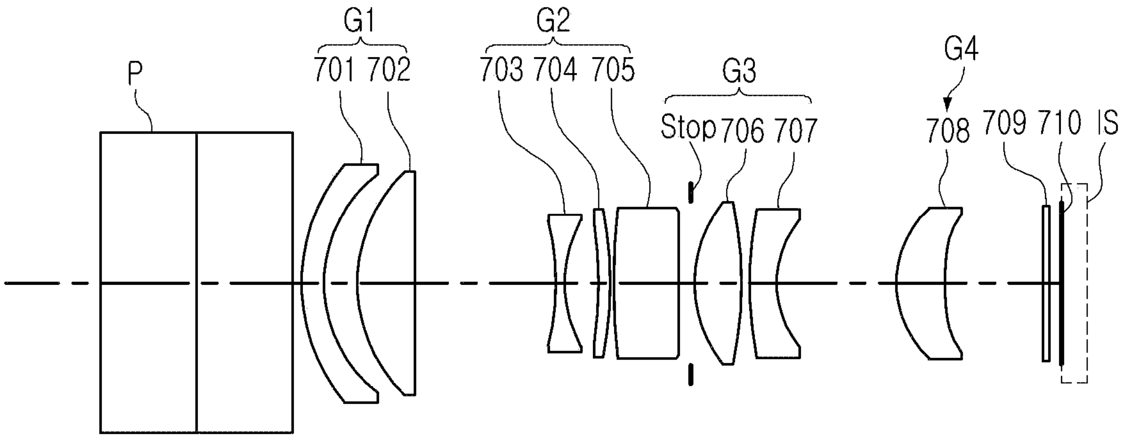
FIG. 21 is a diagram illustrating a telephoto mode of the optical imaging system of FIG. 19.

FIG. 19 is a diagram illustrating a wide-angle mode of an optical imaging system according to a seventh embodiment of the present disclosure, FIG. 20 is a diagram illustrating a normal mode of the optical imaging system of FIG. 19, and FIG. 21 is a diagram illustrating a telephoto mode of the optical imaging system of FIG. 19.

An optical imaging system according to a seventh embodiment of the present disclosure will be described with reference to FIGS. 19 to 21.

The optical imaging system according to the seventh embodiment of the present disclosure includes a first lens group G1, a second lens group G2, a third lens group G3, and a fourth lens group G4. The optical imaging system further includes a reflective member P disposed in front of the first lens group G1.

The first lens group G1 includes a first lens 701 and a second lens 702, the second lens group G2 includes a third lens 703, a fourth lens 704, and a fifth lens 705, the third lens group G3 includes a stop, a sixth lens 706, and a seventh lens 707, and the fourth lens group G4 includes an eighth lens 708 sequentially disposed from an object side of the optical imaging system.

In addition, the optical imaging system may further include a filter 709 and an image sensor IS.

The optical imaging system according to the seventh embodiment of the present disclosure may focus an image on an imaging plane 710. The imaging plane 710 may refer to a surface on which an image is focused by the optical imaging system. As an example, the imaging plane 710 may refer to one surface of the image sensor IS on which light is incident through the optical imaging system.

In the seventh embodiment of the present disclosure, the reflective member P may be a prism, but may also be provided as a mirror.

At least one lens group among the first to fourth lens groups G1 to G4 may be moved to change a total focal length of the optical imaging system. For example, the first lens group G1 and the third lens group G3 are fixed and the second lens group G2 is movable along the optical axis so that the total focal length of the optical imaging system may be changed. That is, as the second lens group G2 moves away from the object side of the optical imaging system toward an image side of the optical imaging system, the total focal length of the optical imaging system may be changed from the wide-angle mode to the normal mode, and then from the normal mode to the telephoto mode.

In addition, at least one lens group among the first to fourth lens groups G1 to G4 may be moved to correct a focus position according to a change in the total focal length of the optical imaging system. For example, when the total focal length of the optical imaging system is changed from the wide-angle mode to the telephoto mode, the fourth lens group G4 may be moved along the optical axis to correct the focus position.

Characteristics of each lens including a radius of curvature, a thickness of a lens or a distance between lenses, a refractive index, an Abbe number, and an effective radius are illustrated in Table 19 below.

TABLE 19

| Surface No. | Element | Radius of Curvature | Thickness or Distance | Refractive Index | Abbe Number | Effective Radius | Lens Group |
|---|---|---|---|---|---|---|---|
| Object | | Infinity | D0 | | | | |
| S1 | Prism | Infinity | 4 | 1.5168 | 64.2 | 6 | |
| S2 | | Infinity | 4 | 1.5168 | 64.2 | 5.63 | |
| S3 | | Infinity | 0.4 | | | 5.26 | |
| S4 | First | 7.753 | 0.9 | 1.6355 | 23.89 | 5 | First |
| S5 | Lens | 5.424 | 1.505 | | | 4.57 | Lens |
| S6 | Second | 6.656 | 2.3 | 1.535 | 55.73 | 4.69 | Group |
| S7 | Lens | −555.464 | D1 | | | 4.6 | |
| S8 | Third | −9.798 | 0.38 | 1.535 | 55.73 | 2.9 | Second |
| S9 | Lens | 5.539 | 1.303 | | | 2.77 | Lens |
| S10 | Fourth | −34.022 | 0.58 | 1.535 | 55.73 | 2.83 | Group |
| S11 | Lens | −19.462 | 0.15 | | | 3.1 | |
| S12 | Fifth | 15.498 | 2.72 | 1.6355 | 23.89 | 3.01 | |
| S13 | Lens | 183.872 | D2 | | | 3.2 | |
| S14 | Stop | Infinity | 0.15 | | | 3.45 | Third |
| S15 | Sixth | 4.79 | 1.95 | 1.535 | 55.73 | 3.38 | Lens |
| S16 | Lens | −30.478 | 0.372 | | | 3.3 | Group |
| S17 | Seventh | 11.206 | 1.03 | 1.6355 | 23.89 | 3.08 | |
| S18 | Lens | 3.914 | D3 | | | 2.71 | |
| S19 | Eighth | 4.874 | 2.04 | 1.535 | 55.73 | 3.2 | Fourth |
| S20 | Lens | 10.667 | D4 | | | 2.84 | Lens Group |
| S21 | Filter | Infinity | 0.21 | 1.5168 | 64.2 | 3.19 | |
| S22 | | Infinity | D5 | | | 3.2 | |
| S23 | Imaging Plane | Infinity | | | | | |

TABLE 20

| | Object at Infinity | | | | Object at Near Focus Position | | |
|---|---|---|---|---|---|---|---|
| Value | Wide-Angle Mode | Normal Mode | Telephoto Mode | Value | Wide-Angle Mode | Normal Mode | Telephoto Mode |
| D0 | Infinity | Infinity | Infinity | D0 | 400 | 400 | 600 |
| D1 | 0.81249 | 2.98443 | 5.95637 | D1 | 0.81249 | 2.98443 | 5.95637 |
| D2 | 5.64388 | 3.47194 | 0.5 | D2 | 5.64388 | 3.47194 | 0.5 |
| D3 | 2.19968 | 2.87932 | 5 | D3 | 1.90291 | 2.41516 | 4.33406 |
| D4 | 6.94907 | 6.26943 | 4.14875 | D4 | 7.24584 | 6.73359 | 4.81469 |
| D5 | 0.1 | 0.1 | 0.1 | D5 | 0.1 | 0.1 | 0.1 |
| f | 10.331 | 12.7308 | 17.2314 | MAG | 0.025 | 0.03063 | 0.02755 |
| HFOV | 16.959 | 13.759 | 10.221 | HFOV | 16.741 | 13.523 | 10.151 |
| Fno | 2.05 | 1.995 | 1.944 | Fno | 2.037 | 1.973 | 1.891 |
| L | 39.69512 | 39.69512 | 39.69512 | L | 39.69512 | 39.69512 | 39.69512 |

In Table 20 above, D0 is an object distance, i.e., a distance on the optical axis between an object and a first surface of the reflective member P, D1 is a distance on the optical axis between the second lens 702 and the third lens 703, D2 is a distance on the optical axis between the fifth lens 705 and the stop, D3 is a distance on the optical axis between the seventh lens 707 and the eighth lens 708, D4 is a distance on the optical axis between the eighth lens 708 and the filter 709, and D5 is a distance on the optical axis between the filter 709 and the imaging plane 710.

f is a total focal length of the optical imaging system, MAG is a magnification of the optical imaging system, HFOV is one half of a field of view of the optical imaging system, Fno is an f-number of the optical imaging system, and L is a distance on the optical axis from the first surface of the reflective member P to the imaging plane 710.

The values in Table 20 above are listed for the wide-angle, normal, and telephoto modes for both an object at infinity and an object at a near focus position of the optical imaging system, i.e., a closest position of the object at which the optical imaging system can focus an image of the object.

A focal length fG1 of the first lens group G1 is 19.4741 mm, a focal length fG2 of the second lens group G2 is −11.3364 mm, and a focal length fG3 of the third lens group G3 is 17.0254 mm, and a focal length fG4 of the fourth lens group G4 is 14.941 mm.

The focal length of the first lens 701 is −33.432 mm, the focal length of the second lens 702 is 12.311 mm, the focal length of the third lens 703 is −6.558 mm, the focal length of the fourth lens 704 is 83.839 mm, the focal length of the fifth lens 705 is 26.466 mm, the focal length of the sixth lens 706 is 7.889 mm, the focal length of the seventh lens 707 is −10.014 mm, and the focal length of the eighth lens 708 is 14.941 mm.

One half of a diagonal length of the imaging plane of the image sensor (IMG HT) is 3.2 mm, and an entrance pupil diameter (in the telephoto mode (EPDt) is 8.864 mm.

In the seventh embodiment of the present disclosure, the first lens group G1 has a positive refractive power overall, the second lens group G2 has a negative refractive power overall, the third lens group G3 has a positive refractive power overall, and the fourth lens group G4 has a positive refractive power overall.

The first lens 701 has a negative refractive power, a first surface of the first lens 701 is convex, and a second surface of the first lens 701 is concave.

The second lens 702 has a positive refractive power, and first and second surfaces of the second lens 702 are convex.

The third lens 703 has a negative refractive power, and first and second surfaces of the third lens 703 are concave.

The fourth lens 704 has a positive refractive power, a first surface of the fourth lens 704 is concave, and a second surface of the fourth lens 704 is convex.

The fifth lens 705 has a positive refractive power, and a first surface of the fifth lens 705 is convex, and a second surface of the fifth lens 705 is concave.

The sixth lens 706 has a positive refractive power, and first and second surfaces of the sixth lens 706 are convex. A stop is disposed in front of (e.g., an object-side surface) the sixth lens 706.

The seventh lens 707 has a negative refractive power, a first surface of the seventh lens 707 is convex, and a second surface of the seventh lens 707 is concave.

The eighth lens 708 has a positive refractive power, a first surface of the eighth lens 708 is convex, and a second surface of the eighth lens 708 is concave.

Each surface of the first to eighth lenses 701 to 708 has aspherical coefficients as illustrated in Table 21 below. For example, both an object-side surface and an image-side surface of the first to eighth lenses 701 to 708 are aspherical surfaces.

TABLE 21

| | S4 | S5 | S6 | S7 | S8 | S9 | S10 | S11 |
|---|---|---|---|---|---|---|---|---|
| Conic Constant (K) | −0.247 | −0.247 | −1.965 | −80.000 | −8.797 | 0.577 | −29.951 | 33.693 |
| 4th Coefficient (A) | −2.781E−02 | −2.781E−02 | 4.233E−01 | 6.614E−02 | 5.007E−02 | −9.005E−02 | −5.543E−03 | 1.829E−02 |
| 6th Coefficient (B) | −3.647E−02 | −3.647E−02 | 7.492E−03 | 1.232E−02 | 1.422E−02 | 2.261E−02 | −1.019E−02 | −2.206E−02 |
| 8th Coefficient (C) | −1.341E−02 | −1.341E−02 | −1.125E−04 | −4.525E−03 | −1.641E−02 | −4.733E−03 | −5.602E−03 | −8.209E−03 |
| 10th Coefficient (D) | −2.095E−03 | −2.095E−03 | −5.438E−03 | −7.641E−03 | 5.527E−03 | −8.851E−04 | −5.855E−03 | 1.491E−04 |
| 12th Coefficient (E) | −1.401E−03 | −1.401E−03 | −4.408E−03 | −4.744E−03 | 6.982E−04 | 8.247E−04 | −5.279E−04 | 7.269E−04 |
| 14th Coefficient (F) | 7.951E−04 | 7.951E−04 | −2.293E−03 | −1.723E−03 | 1.597E−03 | −6.513E−04 | −1.328E−03 | 2.801E−03 |
| 16th Coefficient (G) | 3.386E−05 | 3.386E−05 | −1.034E−03 | −2.848E−04 | 1.720E−03 | 2.232E−04 | −6.372E−05 | 5.874E−04 |
| 18th Coefficient (H) | 3.600E−05 | 3.600E−05 | −3.396E−04 | 2.094E−04 | 3.524E−05 | −1.260E−04 | 1.232E−05 | −2.517E−04 |
| 20th Coefficient (J) | 4.025E−04 | 4.025E−04 | 1.605E−04 | 1.065E−04 | 3.856E−04 | 3.560E−05 | 1.478E−04 | −9.120E−04 |
| 22nd Coefficient (L) | −3.289E−04 | −3.289E−04 | −2.635E−04 | 1.578E−05 | −3.687E−04 | 0.000E+00 | 1.295E−04 | −5.890E−04 |

TABLE 21-continued

| | | | | | | | | |
|---|---|---|---|---|---|---|---|---|
| 24th Coefficient (M) | −9.965E−06 | −9.965E−06 | −3.765E−05 | 1.331E−04 | −8.336E−05 | 0.000E+00 | −8.191E−05 | −2.681E−04 |
| 26th Coefficient (N) | 7.346E−05 | 7.346E−05 | 1.023E−04 | 6.129E−05 | −1.569E−04 | 0.000E+00 | −1.978E−05 | 2.083E−04 |
| 28th Coefficient (O) | 1.828E−04 | 1.828E−04 | 1.108E−04 | −4.696E−05 | 1.966E−05 | 0.000E+00 | 2.252E−05 | −3.625E−05 |
| 30th Coefficient (P) | −1.604E−04 | −1.604E−04 | −3.861E−05 | −4.498E−06 | 1.978E−05 | 0.000E+00 | 2.948E−06 | −4.640E−05 |

| | S12 | S13 | S15 | S16 | S17 | S18 | S19 | S20 |
|---|---|---|---|---|---|---|---|---|
| Conic Constant (K) | −79.960 | 80.000 | −0.550 | 63.214 | −35.474 | −0.171 | 0.441 | 12.418 |
| 4th Coefficient (A) | −2.848E−01 | −1.151E−01 | −6.806E−02 | −1.336E−01 | −4.033E−02 | −4.262E−02 | 6.542E−02 | 1.224E−01 |
| 6th Coefficient (B) | −5.494E−02 | −1.133E−03 | −1.661E−02 | 5.403E−02 | 1.535E−02 | 1.153E−02 | 7.207E−03 | −2.747E−03 |
| 8th Coefficient (C) | −9.112E−02 | 2.740E−04 | −7.301E−03 | −2.118E−02 | −7.832E−03 | 2.486E−03 | 8.511E−04 | −7.700E−04 |
| 10th Coefficient (D) | −3.297E−02 | 3.783E−04 | −2.824E−04 | 3.903E−03 | 3.906E−03 | 1.879E−03 | 3.525E−04 | −1.755E−03 |
| 12th Coefficient (E) | −1.032E−02 | −9.494E−05 | −1.003E−03 | −1.250E−02 | −1.293E−03 | −1.037E−03 | −5.832E−05 | −2.117E−04 |
| 14th Coefficient (F) | −1.812E−02 | 8.594E−05 | −1.782E−03 | −4.691E−05 | 5.954E−04 | −1.570E−04 | 1.161E−04 | −3.536E−04 |
| 16th Coefficient (G) | −1.191E−02 | 3.498E−05 | −1.709E−03 | 4.598E−04 | −1.930E−04 | −1.332E−04 | −8.793E−05 | 2.288E−05 |
| 18th Coefficient (H) | −4.750E−03 | −1.726E−05 | −1.402E−03 | 3.332E−03 | 2.905E−05 | 2.652E−05 | 6.918E−05 | −1.171E−04 |
| 20th Coefficient (J) | −1.544E−03 | 9.135E−06 | −8.156E−04 | 2.494E−03 | −1.597E−06 | −9.269E−07 | −1.720E−05 | 1.300E−05 |
| 22nd Coefficient (L) | −5.797E−03 | −3.832E−05 | −5.525E−04 | 1.882E−03 | 0.000E+00 | −1.085E−05 | 0.000E+00 | −4.331E−05 |
| 24th Coefficient (M) | 5.499E−05 | −2.892E−06 | −3.589E−04 | 1.083E−03 | 0.000E+00 | −2.795E−05 | 0.000E+00 | 2.738E−05 |
| 26th Coefficient (N) | 0.000E+00 | −8.356E−06 | −2.646E−04 | 7.131E−04 | 0.000E+00 | 1.300E−05 | 0.000E+00 | −2.236E−05 |
| 28th Coefficient (O) | 0.000E+00 | 4.828E−07 | −1.222E−04 | 3.049E−04 | 0.000E+00 | 1.142E−05 | 0.000E+00 | 4.166E−05 |
| 30th Coefficient (P) | 0.000E+00 | −3.137E−06 | −8.392E−05 | 1.244E−04 | 0.000E+00 | 1.689E−05 | 0.000E+00 | −1.924E−05 |

Figure 22:
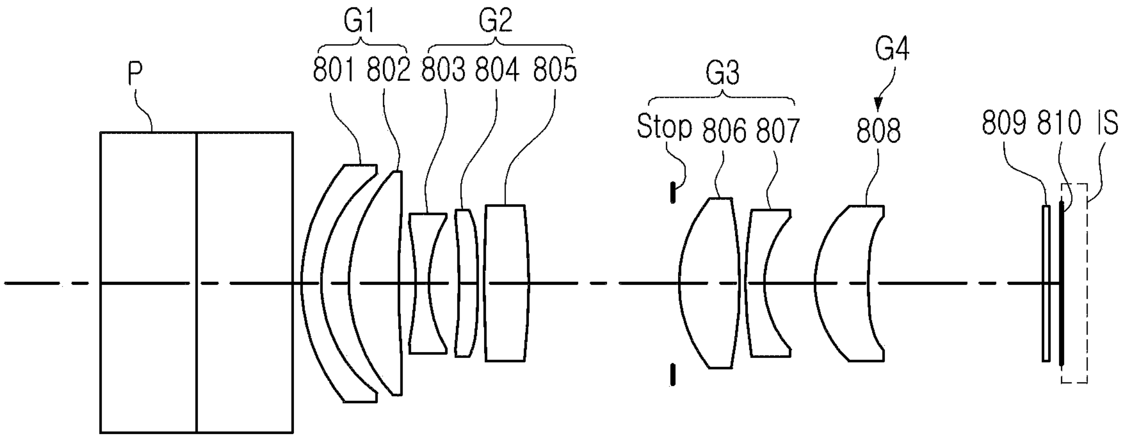
FIG. 22 is a diagram illustrating a wide-angle mode of an optical imaging system according to an eighth embodiment of the present disclosure.
Figure 23:
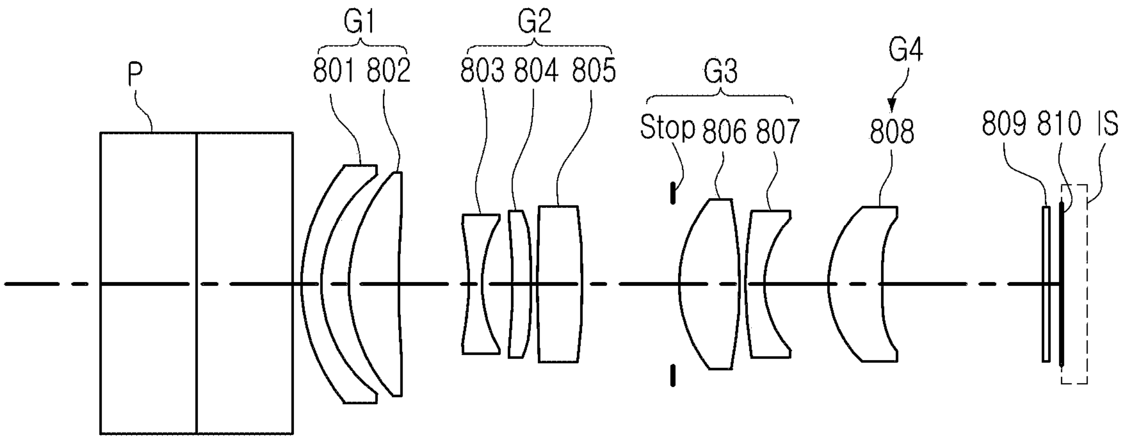
FIG. 23 is a diagram illustrating a normal mode of the optical imaging system of FIG. 22.
Figure 24:
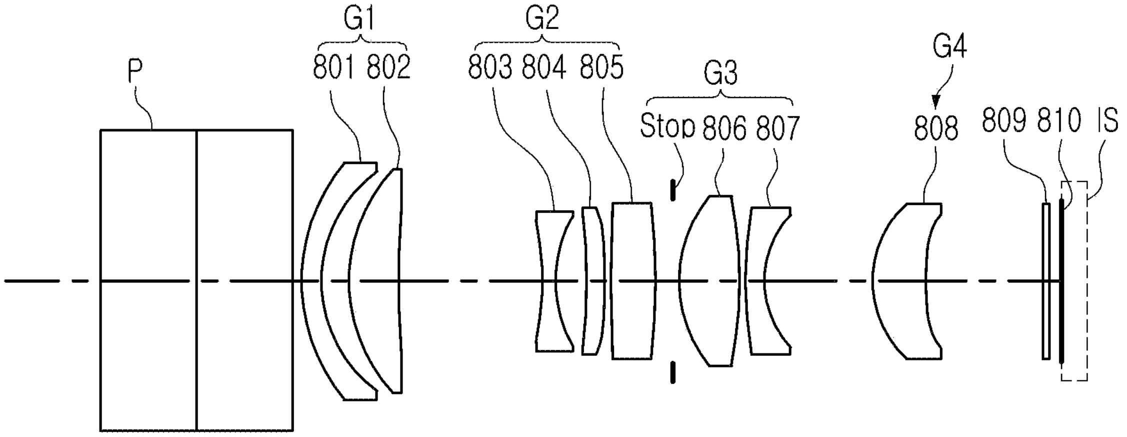
FIG. 24 is a diagram illustrating a telephoto mode of the optical imaging system of FIG. 22.

FIG. 22 is a diagram illustrating a wide-angle mode of an optical imaging system according to an eighth embodiment of the present disclosure, FIG. 23 is a diagram illustrating a normal mode of the optical imaging system of FIG. 22, and FIG. 24 is a diagram illustrating a telephoto mode of the optical imaging system of FIG. 22.

An optical imaging system according to an eighth embodiment of the present disclosure will be described with reference to FIGS. 22 to 24.

The optical imaging system according to the eighth embodiment of the present disclosure includes a first lens group G1, a second lens group G2, a third lens group G3, and a fourth lens group G4. The optical imaging system further includes a reflective member P disposed in front of the first lens group G1.

The first lens group G1 includes a first lens 801 and a second lens 802, the second lens group G2 includes a third lens 803, a fourth lens 804, and a fifth lens 805, the third lens group G3 includes a stop, a sixth lens 806, and a seventh lens 807, and the fourth lens group G4 includes an eighth lens 808 sequentially disposed from an object side of the optical imaging system.

In addition, the optical imaging system may further include a filter 809 and an image sensor IS.

The optical imaging system according to the eighth embodiment of the present disclosure may focus an image on an imaging plane 810. The imaging plane 810 may refer to a surface on which an image is focused by the optical imaging system. As an example, the imaging plane 810 may refer to one surface of the image sensor IS on which light is received incident through the optical imaging system.

In the eighth embodiment of the present disclosure, the reflective member P may be a prism, but may also be provided as a mirror.

At least one lens group among the first to fourth lens groups G1 to G4 may be moved to change a total focal length of the optical imaging system. For example, the first lens group G1 and the third lens group G3 are fixed and the second lens group G2 is movable along the optical axis so that the total focal length of the optical imaging system may be changed. That is, as the second lens group G2 moves away from the object side of the optical imaging system toward an image side of the optical imaging system, the total focal length of the optical imaging system may be changed from the wide-angle mode to the normal mode, and then from the normal mode to the telephoto mode.

In addition, at least one lens group among the first to fourth lens groups G1 to G4 may be moved to correct a focus position according to a change in the total focal length of the optical imaging system. For example, when the total focal length of the optical imaging system is changed from the wide-angle mode to the telephoto mode, the fourth lens group G4 may be moved along the optical axis to correct the focus position.

Characteristics of each lens including a radius of curvature, a thickness of a lens or a distance between lenses, a refractive index, an Abbe number, and an effective radius are illustrated in Table 22 below.

TABLE 22

| Surface No. | Element | Radius of Curvature | Thickness or Distance | Refractive Index | Abbe Number | Effective Radius | Lens Group |
|---|---|---|---|---|---|---|---|
| Object | | Infinity | D0 | | | | |
| S1 | Prism | Infinity | 4 | 1.5168 | 64.2 | 6 | |
| S2 | | Infinity | 4 | 1.5168 | 64.2 | 5.63 | |
| S3 | | Infinity | 0.4 | | | 5.26 | |
| S4 | First | 7.618 | 0.87 | 1.6355 | 23.89 | 5 | First |
| S5 | Lens | 5.342 | 1.125 | | | 4.57 | Lens |
| S6 | Second | 6.588 | 2.18 | 1.535 | 55.73 | 4.65 | Group |
| S7 | Lens | 967.846 | D1 | | | 4.57 | |
| S8 | Third | −10.046 | 0.5 | 1.535 | 55.73 | 2.9 | |
| S9 | Lens | 5.497 | 1.323 | | | 2.76 | |
| S10 | Fourth | −34.556 | 0.7 | 1.535 | 55.73 | 2.84 | Second |
| S11 | Lens | −19.41 | 0.22 | | | 3.1 | Lens |
| S12 | Fifth | 16.289 | 1.83 | 1.6355 | 23.89 | 3.08 | Group |
| S13 | Lens | 217.495 | D2 | | | 3.2 | |
| S14 | Stop | Infinity | 0.289 | | | 3.45 | Third |
| S15 | Sixth | 4.789 | 2.55 | 1.535 | 55.73 | 3.49 | Lens |
| S16 | Lens | −30.51 | 0.201 | | | 3.3 | Group |
| S17 | Seventh | 11.346 | 0.79 | 1.6355 | 23.89 | 3.11 | |
| S18 | Lens | 3.847 | D3 | | | 2.77 | |
| S19 | Eighth | 4.749 | 2.24 | 1.535 | 55.73 | 3.2 | Fourth |
| S20 | Lens | 10.705 | D4 | | | 2.81 | Lens Group |
| S21 | Filter | Infinity | 0.21 | 1.5168 | 64.2 | 3.19 | |
| S22 | | Infinity | D5 | | | 3.2 | |
| S23 | Imaging Plane | Infinity | | | | | |

TABLE 23

| Object at Infinity | | | | Object at Near Focus Position | | | |
|---|---|---|---|---|---|---|---|
| Value | Wide-Angle Mode | Normal Mode | Telephoto Mode | Value | Wide-Angle Mode | Normal Mode | Telephoto Mode |
| D0 | Infinity | Infinity | Infinity | D0 | 400 | 400 | 600 |
| D1 | 0.68952 | 2.98973 | 6.0361 | D1 | 0.68952 | 2.98973 | 6.0361 |
| D2 | 6.09969 | 3.79948 | 0.75311 | D2 | 6.09969 | 3.79948 | 0.75311 |
| D3 | 2.12118 | 2.71456 | 4.53142 | D3 | 1.83913 | 2.27142 | 3.93496 |
| D4 | 7.31705 | 6.72367 | 4.90681 | D4 | 7.5991 | 7.16681 | 5.50327 |
| D5 | 0.1 | 0.1 | 0.1 | D5 | 0.1 | 0.1 | 0.1 |
| f | 10.3208 | 12.8134 | 17.2159 | MAG | 0.02503 | 0.03091 | 0.02767 |
| HFOV | 17.123 | 13.749 | 10.257 | HFOV | 16.887 | 13.484 | 10.137 |
| Fno | 2.032 | 1.976 | 1.947 | Fno | 2.025 | 1.961 | 1.905 |
| L | 39.75544 | 39.75544 | 39.75544 | L | 39.75544 | 39.75544 | 39.75544 |

In Table 23 above, D0 is an object distance, i.e., a distance on the optical axis between an object and a first surface of the reflective member P, D1 is a distance on the optical axis between the second lens 802 and the third lens 803, D2 is a distance on the optical axis between the fifth lens 805 and the stop, D3 is a distance on the optical axis between the seventh lens 807 and the eighth lens 808, D4 is a distance on the optical axis between the eighth lens 808 and the filter 809, and D5 is a distance on the optical axis between the filter 809 and the imaging plane 810.

f is a total focal length of the optical imaging system, MAG is a magnification of the optical imaging system, HFOV is one half of a field of view of the optical imaging system, Fno is an f-number of the optical imaging system, and L is a distance on the optical axis from the first surface of the reflective member P to the imaging plane 810.

The values in Table 23 above are listed for the wide-angle, normal, and telephoto modes for both an object at infinity and an object at a near focus position of the optical imaging system, i.e., a closest position of the object at which the optical imaging system can focus an image of the object.

A focal length fG1 of the first lens group G1 is 20.1618 mm, a focal length fG2 of the second lens group G2 is −11.3913 mm, and a focal length fG3 of the third lens group G3 is 18.7194 mm, and a focal length fG4 of the fourth lens group G4 is 14.105 mm.

The focal length of the first lens 801 is −33.044 mm, the focal length of the second lens 802 is 12.389 mm, the focal length of the third lens 803 is −6.567 mm, the focal length of the fourth lens 804 is 81.462 mm, the focal length of the fifth lens 805 is 27.609 mm, the focal length of the sixth lens 806 is 7.937 mm, the focal length of the seventh lens 807 is −9.550 mm, and the focal length of the eighth lens 808 is 14.105 mm.

One half of a diagonal length of the imaging plane of the image sensor (IMG HT) is 3.2 mm, and an entrance pupil diameter in the telephoto mode (EPDt) is 8.842 mm.

In the eighth embodiment of the present disclosure, the first lens group G1 has a positive refractive power overall, the second lens group G2 has a negative refractive power overall, the third lens group G3 has a positive refractive power overall, and the fourth lens group G4 has a positive refractive power overall.

The first lens 801 has a negative refractive power, a first surface of the first lens 801 is convex, and a second surface of the first lens 801 is concave.

The second lens 802 has a positive refractive power, a first surface of the second lens 802 is convex, and a second surface of the second lens 802 is concave.

The third lens 803 has a negative refractive power, and first and second surfaces of the third lens 803 are concave.

The fourth lens 804 has a positive refractive power, a first surface of the fourth lens 804 is concave, and a second surface of the fourth lens 804 is convex.

The fifth lens 805 has a positive refractive power, and a first surface of the fifth lens 805 is convex, and a second surface of the fifth lens 805 is concave.

The sixth lens 806 has a positive refractive power, and first and second surfaces of the sixth lens 806 are convex. A stop is disposed in front of (e.g., an object-side surface) the sixth lens 806.

The seventh lens 807 has a negative refractive power, a first surface of the seventh lens 807 is convex, and a second surface of the seventh lens 807 is concave.

The eighth lens 808 has a positive refractive power, a first surface of the eighth lens 808 is convex, and a second surface of the eighth lens 808 is concave.

Each surface of the first to eighth lenses 801 to 808 has aspherical coefficients as illustrated in Table 24 below. For example, both an object-side surface and an image-side surface of the first to eighth lenses 801 to 808 are aspherical surfaces.

TABLE 24

| | S4 | S5 | S6 | S7 | S8 | S9 | S10 | S11 |
|---|---|---|---|---|---|---|---|---|
| Conic Constant (K) | 0.287 | −0.245 | −1.936 | −80.000 | −7.851 | 0.628 | 0.206 | 33.628 |
| 4th Coefficient (A) | −1.146E−01 | −2.848E−02 | 2.792E−01 | 6.602E−02 | 3.969E−02 | −1.074E−01 | −1.062E−02 | 2.417E−02 |
| 6th Coefficient (B) | −2.977E−02 | −3.420E−02 | 4.867E−03 | 1.095E−02 | 2.135E−02 | 2.472E−02 | −1.028E−02 | −2.421E−02 |
| 8th Coefficient (C) | −8.113E−03 | −1.341E−02 | 2.503E−03 | −3.520E−03 | −1.607E−02 | −1.078E−02 | −5.457E−03 | −1.064E−02 |
| 10th Coefficient (D) | 8.553E−04 | −2.124E−03 | 4.063E−04 | −7.640E−03 | 4.755E−03 | −2.091E−03 | −5.483E−03 | 2.821E−04 |
| 12th Coefficient (E) | −6.842E−04 | −1.470E−03 | −2.342E−04 | −4.629E−03 | 3.166E−04 | 4.854E−04 | −4.167E−04 | 5.141E−04 |
| 14th Coefficient (F) | 9.054E−04 | 9.315E−04 | −2.503E−05 | −2.171E−03 | 1.751E−03 | −7.140E−04 | −1.138E−03 | 2.995E−03 |
| 16th Coefficient (G) | −1.934E−04 | 8.784E−05 | 3.279E−04 | −4.742E−04 | 1.895E−03 | 7.620E−04 | 2.691E−05 | 8.346E−04 |
| 18th Coefficient (H) | 1.052E−05 | −1.477E−04 | −3.049E−04 | −3.452E−05 | 1.760E−04 | −1.896E−05 | 1.225E−04 | 4.323E−05 |
| 20th Coefficient (J) | 2.269E−04 | 4.986E−04 | 5.135E−05 | 1.189E−04 | 2.813E−04 | 4.937E−05 | 1.117E−04 | −7.742E−04 |
| 22nd Coefficient (L) | −1.733E−04 | −3.040E−04 | 1.546E−01 | −1.803E−04 | −4.670E−05 | −5.287E−05 | 1.263E−04 | −5.023E−04 |

TABLE 24-continued

| | | | | | | | | |
|---|---|---|---|---|---|---|---|---|
| 24th Coefficient (M) | −1.383E−04 | −3.109E−04 | 0.000E+00 | 4.792E−05 | −1.295E−04 | −5.816E−05 | −5.304E−05 | −3.227E−04 |
| 26th Coefficient (N) | 1.580E−04 | 1.974E−04 | 0.000E+00 | 6.372E−05 | 9.239E−07 | 1.012E−05 | −9.126E−06 | 1.634E−04 |
| 28th Coefficient (O) | −1.739E−05 | 4.331E−05 | 0.000E+00 | −8.578E−06 | 1.205E−04 | 7.312E−06 | 1.317E−05 | −8.153E−06 |
| 30th Coefficient (P) | −9.216E−05 | −1.527E−04 | 0.000E+00 | 1.092E−05 | 6.951E−05 | 1.813E−05 | −5.202E−06 | −6.405E−06 |

| | S12 | S13 | S15 | S16 | S17 | S18 | S19 | S20 |
|---|---|---|---|---|---|---|---|---|
| Conic Constant (K) | −70.287 | −80.000 | −0.560 | 63.273 | −34.244 | −0.202 | 0.386 | 12.349 |
| 4th Coefficient (A) | −7.089E−02 | −1.219E−01 | −7.096E−02 | −1.327E−01 | −3.941E−02 | −4.948E−02 | 5.856E−02 | 1.188E−01 |
| 6th Coefficient (B) | −7.760E−03 | −2.097E−04 | −1.644E−02 | 5.117E−02 | 2.406E−02 | 1.010E−02 | 8.830E−03 | −4.932E−04 |
| 8th Coefficient (C) | 1.440E−03 | −5.040E−05 | −5.641E−03 | −1.919E−02 | −2.249E−02 | −2.300E−03 | 1.853E−03 | −2.593E−04 |
| 10th Coefficient (D) | 3.711E−03 | 7.488E−04 | −1.185E−03 | 3.835E−03 | −2.605E−03 | 2.048E−03 | 6.256E−04 | −1.294E−03 |
| 12th Coefficient (E) | −1.353E−03 | −3.048E−04 | −9.695E−04 | −1.276E−02 | −1.031E−02 | −4.993E−04 | 1.058E−04 | −1.717E−04 |
| 14th Coefficient (F) | 1.648E−03 | 1.560E−04 | −1.556E−03 | 4.238E−04 | 5.934E−03 | −1.479E−04 | 1.599E−04 | −2.638E−04 |
| 16th Coefficient (G) | −2.194E−04 | 2.416E−05 | −1.416E−03 | 4.891E−04 | 1.603E−03 | −2.497E−04 | −4.701E−05 | 1.722E−05 |
| 18th Coefficient (H) | 4.382E−05 | 2.832E−05 | −1.119E−03 | 3.200E−03 | 4.391E−04 | 1.055E−04 | 7.706E−05 | −1.010E−04 |
| 20th Coefficient (J) | −2.794E−04 | 3.898E−05 | −7.720E−04 | 1.840E−03 | −1.465E−03 | −2.969E−06 | −1.714E−05 | 2.566E−05 |
| 22nd Coefficient (L) | −1.438E−04 | −1.808E−05 | −5.877E−04 | 2.215E−03 | −6.998E−04 | 1.409E−05 | 3.029E−05 | −3.758E−05 |
| 24th Coefficient (M) | −1.091E−04 | −7.493E−06 | −3.919E−04 | 1.171E−03 | −1.423E−03 | −1.917E−05 | −3.137E−05 | 2.142E−05 |
| 26th Coefficient (N) | 8.952E−05 | −4.824E−06 | −2.951E−04 | 8.026E−04 | −1.045E−03 | −5.689E−06 | 6.463E−08 | −1.849E−05 |
| 28th Coefficient (O) | −1.717E−05 | −1.060E−06 | −1.467E−04 | 2.706E−04 | −6.178E−04 | −7.121E−06 | −2.156E−05 | 3.854E−05 |
| 30th Coefficient (P) | 1.037E−05 | 9.149E−07 | −8.313E−05 | 8.814E−05 | −1.458E−04 | 5.300E−06 | 1.570E−05 | −1.846E−05 |

Figure 25:
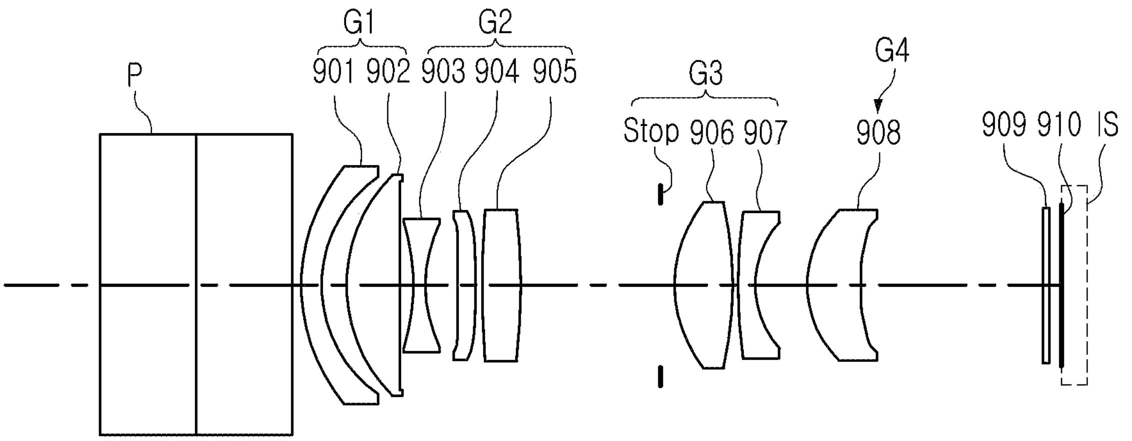
FIG. 25 is a diagram illustrating a wide-angle mode of an optical imaging system according to a ninth embodiment of the present disclosure.
Figure 26:
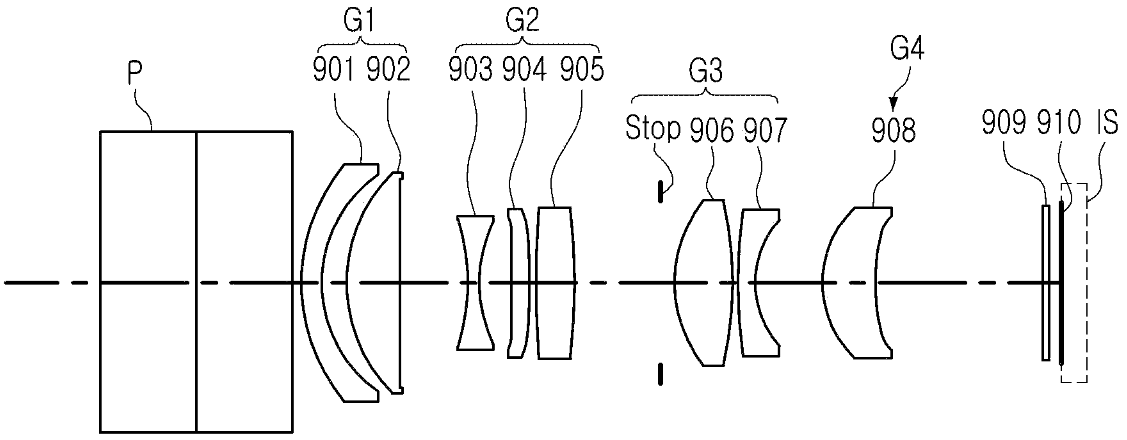
FIG. 26 is a diagram illustrating a normal mode of the optical imaging system of FIG. 25.
Figure 27:
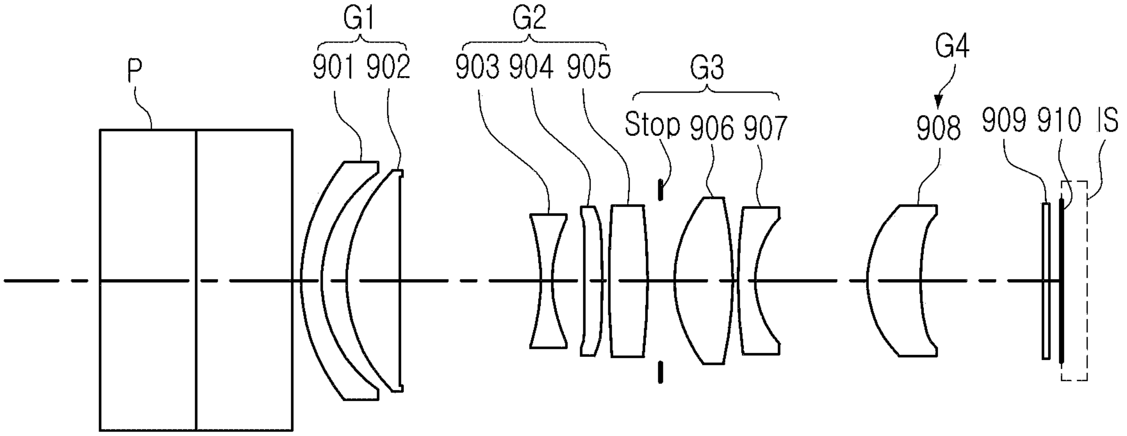
FIG. 27 is a diagram illustrating a telephoto mode of the optical imaging system of FIG. 25.

FIG. 25 is a diagram illustrating a wide-angle mode of an optical imaging system according to a ninth embodiment of the present disclosure, FIG. 26 is a diagram illustrating a normal mode of the optical imaging system of FIG. 25, and FIG. 27 is a diagram illustrating a telephoto mode of the optical imaging system of FIG. 25.

An optical imaging system according to a ninth embodiment of the present disclosure will be described with reference to FIGS. 25 to 27.

The optical imaging system according to the ninth embodiment of the present disclosure includes a first lens group G1, a second lens group G2, a third lens group G3, and a fourth lens group G4. The optical imaging system further includes a reflection member P disposed in front of the first lens group G1.

The first lens group G1 includes a first lens 901 and a second lens 902, the second lens group G2 includes a third lens 903 and a fourth lens 904, and a fifth lens 905, the third lens group G3 includes a stop, a sixth lens 906, and a seventh lens 907, and the fourth lens group G4 includes an eighth lens 908 sequentially disposed from an object side of the optical imaging system.

In addition, the optical imaging system may further include a filter 909 and an image sensor IS.

The optical imaging system according to the ninth embodiment of the present disclosure may focus an image on an imaging plane 910. The imaging plane 910 may refer to a surface on an image is focused by the optical imaging system. As an example, the imaging plane 910 may refer to one surface of the image sensor IS on which light is incident through the optical imaging system.

In the ninth embodiment of the present disclosure, the reflective member P may be a prism, but may also be provided as a mirror.

At least one lens group among the first to fourth lens groups G1 to G4 may be moved to change a total focal length of the optical imaging system. For example, the first lens group G1 and the third lens group G3 are fixed and the second lens group G2 is movable along the optical axis so that the total focal length of the optical imaging system may be changed. That is, as the second lens group G2 moves away from the object side of the optical imaging system toward an image side of the optical imaging system, the total focal length of the optical imaging system may be changed from the wide-angle mode to the normal mode, and then from the normal mode to the telephoto mode.

length of the optical imaging system is changed from the wide-angle mode to the telephoto mode, the fourth lens group G4 may be moved along the optical axis to correct the focus position.

Characteristics of each lens including a radius of curvature, a thickness of a lens or a distance between lenses, a refractive index, an Abbe number, and an effective radius are illustrated in Table 25 below.

TABLE 25

| Surface No. | Element | Radius of Curvature | Thickness or Distance | Refractive Index | Abbe Number | Effective Radius | Lens Group |
|---|---|---|---|---|---|---|---|
| Object | | Infinity | D0 | | | | |
| S1 | Prism | Infinity | 4 | 1.5168 | 64.2 | 6 | |
| S2 | | Infinity | 4 | 1.5168 | 64.2 | 5.63 | |
| S3 | | Infinity | 0.4 | | | 5.26 | |
| S4 | First | 7.549 | 0.94 | 1.6355 | 23.89 | 5 | First |
| S5 | Lens | 5.312 | 1.049 | | | 4.55 | Lens |
| S6 | Second | 6.502 | 2.14 | 1.535 | 55.73 | 4.61 | Group |
| S7 | Lens | 309.658 | D1 | | | 4.52 | |
| S8 | Third | −10.013 | 0.5 | 1.535 | 55.73 | 2.8 | Second |
| S9 | Lens | 5.51 | 1.437 | | | 2.7 | Lens |
| S10 | Fourth | −34.38 | 0.72 | 1.535 | 55.73 | 2.83 | Group |
| S11 | Lens | −19.339 | 0.267 | | | 3.1 | |
| S12 | Fifth | 16.562 | 1.54 | 1.6355 | 23.89 | 3.09 | |
| S13 | Lens | 198.565 | D2 | | | 3.2 | |
| S14 | Stop | Infinity | 0.61 | | | 3.45 | Third |
| S15 | Sixth | 4.788 | 2.5 | 1.535 | 55.73 | 3.44 | Lens |
| S16 | Lens | −30.564 | 0.165 | | | 3.25 | Group |
| S17 | Seventh | 11.366 | 0.7 | 1.6355 | 23.89 | 3.07 | |
| S18 | Lens | 3.855 | D3 | | | 2.76 | |
| S19 | Eighth | 4.761 | 2.24 | 1.535 | 55.73 | 3.2 | Fourth |
| S20 | Lens | 10.736 | D4 | | | 2.81 | Lens Group |
| S21 | Filter | Infinity | 0.21 | 1.5168 | 64.2 | 3.2 | |
| S22 | | Infinity | D5 | | | 3.21 | |
| S23 | Imaging Plane | Infinity | | | | | |

TABLE 26

| Object at Infinity | | | | Object at Near Focus Position | | | |
|---|---|---|---|---|---|---|---|
| Value | Wide-Angle Mode | Normal Mode | Telephoto Mode | Value | Wide-Angle Mode | Normal Mode | Telephoto Mode |
| D0 | Infinity | Infinity | Infinity | D0 | 400 | 400 | 600 |
| D1 | 0.55 | 2.82959 | 5.90918 | D1 | 0.55 | 2.82959 | 5.90918 |
| D2 | 5.85918 | 3.57959 | 0.5 | D2 | 5.85918 | 3.57959 | 0.5 |
| D3 | 2.21306 | 2.78719 | 4.57997 | D3 | 1.93398 | 2.35178 | 3.9967 |
| D4 | 7.60331 | 7.02918 | 5.2364 | D4 | 7.88239 | 7.46459 | 5.81967 |
| D5 | 0.1 | 0.1 | 0.1 | D5 | 0.1 | 0.1 | 0.1 |
| f | 10.3392 | 12.8079 | 17.2415 | MAG | 0.02509 | 0.03092 | 0.02774 |
| HFOV | 17.292 | 13.931 | 10.403 | HFOV | 17.051 | 13.659 | 10.271 |
| Fno | 2.079 | 2.025 | 1.992 | Fno | 2.072 | 2.013 | 1.927 |
| L | 39.74355 | 39.74355 | 39.74355 | L | 39.74355 | 39.74355 | 39.74355 |

In addition, at least one lens group among the first to fourth lens groups G1 to G4 may be moved to correct a focus position according to a change in the total focal length of the optical imaging system. For example, when the total focal In Table 26 above, D0 is an object distance, i.e., a distance on the optical axis between an object and a first surface of the reflective member P, D1 is a distance on the optical axis between the second lens 902 and the third lens 903, D2 is a distance on the optical axis between the fifth lens 905 and the stop, D3 is a distance on the optical axis between the seventh lens 907 and the eighth lens 908, D4 is a distance on the optical axis between the eighth lens 908 and the filter 909, and D5 is a distance on the optical axis between the filter 909 and the imaging plane 910.

f is a total focal length of the optical imaging system, MAG is a magnification of the optical imaging system, HFOV is one half of a field of view of the optical imaging system, Fno is an f-number of the optical imaging system, and L is a distance on the optical axis from the first surface of the reflective member P to the imaging plane 910.

The values in Table 26 above are listed for the wide-angle, normal, and telephoto modes for both an object at infinity and an object at a near focus position of the optical imaging system, i.e., a closest position of the object at which the optical imaging system can focus an image of the object.

A focal length fG1 of the first lens group G1 is 20.1516 mm, a focal length fG2 of the second lens group G2 is −11.4013 mm, a focal length fG3 of the third lens group G3 is 19.5130 mm, and a focal length fG4 of the fourth lens group G4 is 14.142 mm.

The focal length of the first lens 901 is −33.712 mm, the focal length of the second lens 902 is 12.383 mm, the focal length of the third lens 903 is −6.570 mm, the focal length of the fourth lens 904 is 81.269 mm, the focal length of the fifth lens 905 is 28.340 mm, the focal length of the sixth lens 906 is 7.933 mm, the focal length of the seventh lens 907 is −9.524 mm, and the focal length of the eighth lens 908 is 14.142 mm.

One half of a diagonal length of the imaging plane of the image sensor (IMG HT) is 3.2 mm, and an entrance pupil diameter in the telephoto mode (EPDt) is 8.655 mm.

In the ninth embodiment of the present disclosure, the first lens group G1 has a positive refractive power overall, the second lens group G2 has a negative refractive power overall, the third lens group G3 has a positive refractive power overall, and the fourth lens group G4 has a positive refractive power overall.

The first lens 901 has a negative refractive power, a first surface of the first lens 901 is convex, and a second surface of the first lens 901 is concave.

The second lens 902 has a positive refractive power, a first surface of the second lens 902 is convex, and a second surface of the second lens 902 is concave.

The third lens 903 has a negative refractive power, and first and second surfaces of the third lens 903 are concave.

The fourth lens 904 has a positive refractive power, a first surface of the fourth lens 904 is concave, and a second surface of the fourth lens 904 is convex.

The fifth lens 905 has a positive refractive power, a first surface of the fifth lens 905 is convex, and a second surface of the fifth lens 905 is concave.

The sixth lens 906 has a positive refractive power, and first and second surfaces of the sixth lens 906 are convex. A stop is disposed in front of (e.g., an object-side surface) the sixth lens 906.

The seventh lens 907 has a negative refractive power, a first surface of the seventh lens 907 is convex, and a second surface of the seventh lens 907 is concave.

The eighth lens 908 has a positive refractive power, a first surface of the eighth lens 908 is convex, and a second surface of the eighth lens 908 is concave.

Each surface of the first to eighth lenses 901 to 908 has aspherical coefficients as illustrated in Table 27 below. For example, both an object-side surface and an image-side surface of the first to eighth lenses 901 to 908 are aspherical surfaces.

TABLE 27

| | S4 | S5 | S6 | S7 | S8 | S9 | S10 | S11 |
|---|---|---|---|---|---|---|---|---|
| Conic Constant (K) | 0.284 | −0.245 | −1.925 | −80.000 | −7.428 | 0.640 | 3.411 | 33.665 |
| 4th Coefficient (A) | −1.154E−01 | −5.143E−03 | 4.298E−01 | 3.767E−02 | 3.392E−02 | −1.065E−01 | −1.122E−02 | 1.642E−02 |
| 6th Coefficient (B) | −3.075E−02 | −1.640E−02 | 9.567E−03 | 6.641E−03 | 2.314E−02 | 2.493E−02 | −1.014E−02 | −3.244E−02 |
| 8th Coefficient (C) | −7.953E−03 | −7.289E−03 | −1.264E−03 | 4.087E−03 | −1.571E−02 | −1.045E−02 | −5.517E−03 | −1.038E−02 |
| 10th Coefficient (D) | 8.656E−04 | −2.253E−04 | −5.813E−03 | −3.210E−04 | 4.619E−03 | −2.027E−03 | −5.226E−03 | 3.638E−03 |
| 12th Coefficient (E) | −5.337E−04 | −1.286E−03 | −4.994E−03 | −5.482E−05 | 4.108E−04 | 5.543E−04 | −4.909E−04 | 3.132E−03 |
| 14th Coefficient (F) | 6.110E−04 | 4.708E−04 | −2.050E−03 | −2.507E−04 | 1.540E−03 | −6.705E−04 | −9.088E−04 | 3.092E−03 |
| 16th Coefficient (G) | −1.145E−04 | 1.127E−04 | −1.104E−03 | 6.196E−06 | 1.955E−03 | 5.530E−04 | 4.626E−05 | −8.512E−04 |
| 18th Coefficient (H) | −2.164E−05 | −3.747E−04 | −4.672E−04 | −8.532E−05 | 2.126E−04 | −1.300E−04 | 1.970E−04 | −1.674E−03 |
| 20th Coefficient (J) | 2.534E−04 | 1.455E−04 | 2.935E−04 | 1.794E−05 | 3.000E−04 | −5.891E−05 | 6.606E−05 | −1.513E−03 |
| 22nd Coefficient (L) | −1.333E−04 | 0.000E+00 | −2.539E−04 | 9.473E−05 | −4.732E−04 | 1.790E−05 | 1.161E−04 | −7.850E−04 |

TABLE 27-continued

| | | | | | | | | |
|---|---|---|---|---|---|---|---|---|
| 24th Coefficient (M) | −4.511E−05 | 0.000E+00 | −1.731E−04 | 2.143E−05 | −1.535E−04 | 4.911E−05 | 7.664E−06 | −4.550E−04 |
| 26th Coefficient (N) | 1.686E−04 | 0.000E+00 | 1.794E−04 | −4.071E−05 | 5.314E−06 | 1.102E−04 | 4.471E−06 | −3.632E−04 |
| 28th Coefficient (O) | −2.500E−05 | 0.000E+00 | 2.052E−05 | −1.334E−05 | 8.299E−05 | 7.371E−05 | −2.969E−06 | 3.108E−05 |
| 30th Coefficient (P) | −8.136E−05 | 0.000E+00 | −5.558E−05 | 0.000E+00 | 4.374E−05 | 4.783E−05 | −1.065E−05 | 2.280E−05 |

| | S12 | S13 | S15 | S16 | S17 | S18 | S19 | S20 |
|---|---|---|---|---|---|---|---|---|
| Conic Constant (K) | −67.923 | −80.000 | −0.561 | 63.195 | −33.913 | −0.203 | 0.381 | 12.307 |
| 4th Coefficient (A) | −6.928E−02 | −1.235E−01 | −7.115E−02 | −1.323E−01 | −3.781E−02 | −4.985E−02 | 5.330E−02 | 1.072E−01 |
| 6th Coefficient (B) | −7.786E−03 | 6.714E−04 | −1.659E−02 | 5.074E−02 | 2.350E−02 | 1.062E−02 | 1.142E−02 | −6.806E−04 |
| 8th Coefficient (C) | 1.308E−03 | −9.045E−05 | −5.895E−03 | −1.877E−02 | −2.280E−02 | −3.035E−03 | 2.014E−03 | 1.133E−04 |
| 10th Coefficient (D) | 3.793E−03 | 1.108E−03 | −1.256E−03 | 3.499E−03 | −2.417E−03 | 2.198E−03 | 9.276E−04 | −1.211E−03 |
| 12th Coefficient (E) | −1.351E−03 | −4.423E−04 | −1.190E−03 | −1.272E−02 | −1.026E−02 | −4.652E−04 | 1.836E−05 | −8.387E−05 |
| 14th Coefficient (F) | 1.546E−03 | 2.060E−04 | −1.510E−03 | 6.013E−04 | 5.934E−03 | −7.268E−05 | 1.927E−04 | −2.751E−04 |
| 16th Coefficient (G) | −1.134E−04 | 1.268E−05 | −1.410E−03 | 4.039E−04 | 1.567E−03 | −2.986E−04 | −8.546E−05 | 1.746E−05 |
| 18th Coefficient (H) | 4.857E−05 | 4.316E−05 | −1.002E−03 | 3.179E−03 | 4.246E−04 | 1.379E−04 | 9.915E−05 | −1.125E−04 |
| 20th Coefficient (J) | −2.707E−04 | 3.620E−05 | −6.836E−04 | 1.781E−03 | −1.484E−03 | −3.985E−05 | −3.648E−05 | 2.744E−05 |
| 22nd Coefficient (L) | −1.295E−04 | −1.249E−05 | −4.727E−04 | 2.322E−03 | −6.162E−04 | 5.713E−05 | 4.340E−05 | −3.314E−05 |
| 24th Coefficient (M) | −1.184E−04 | −8.808E−06 | −3.136E−04 | 1.125E−03 | −1.480E−03 | −2.477E−05 | −3.165E−05 | 2.666E−05 |
| 26th Coefficient (N) | 4.600E−05 | −6.893E−06 | −2.003E−04 | 8.706E−04 | −1.000E−03 | 3.136E−06 | 5.922E−06 | −2.180E−05 |
| 28th Coefficient (O) | 1.548E−05 | 6.838E−07 | −7.255E−05 | 2.248E−04 | −7.103E−04 | −1.225E−05 | −2.187E−05 | 3.718E−05 |
| 30th Coefficient (P) | 2.329E−05 | 1.178E−07 | −3.515E−05 | 1.059E−04 | −1.341E−04 | 8.455E−06 | 1.866E−05 | −1.795E−05 |

Figure 28:
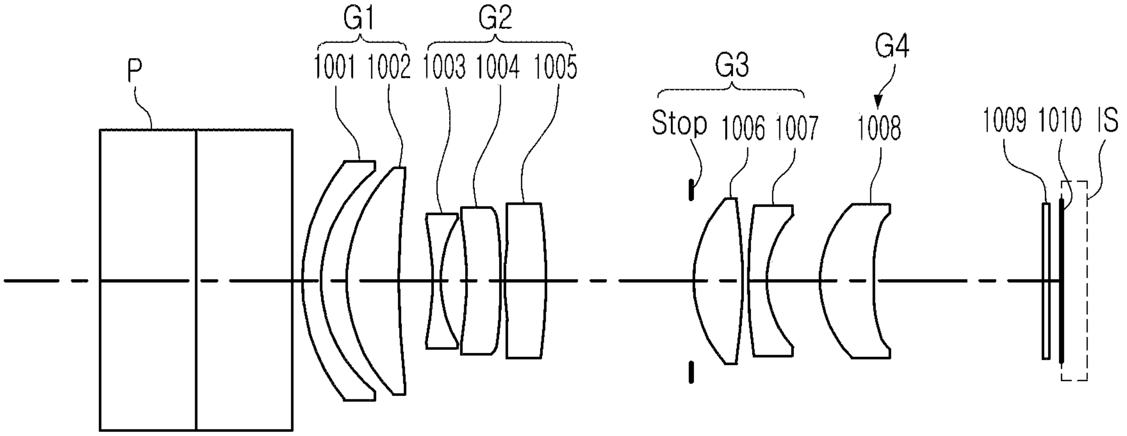
FIG. 28 is a diagram illustrating a wide-angle mode of an optical imaging system according to a tenth embodiment of the present disclosure.
Figure 29:
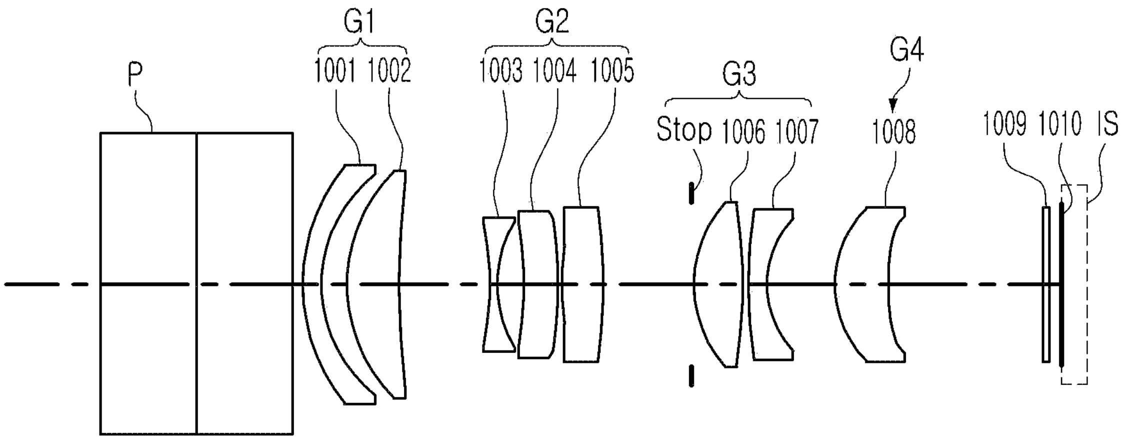
FIG. 29 is a diagram illustrating a normal mode of the optical imaging system of FIG. 28.
Figure 30:
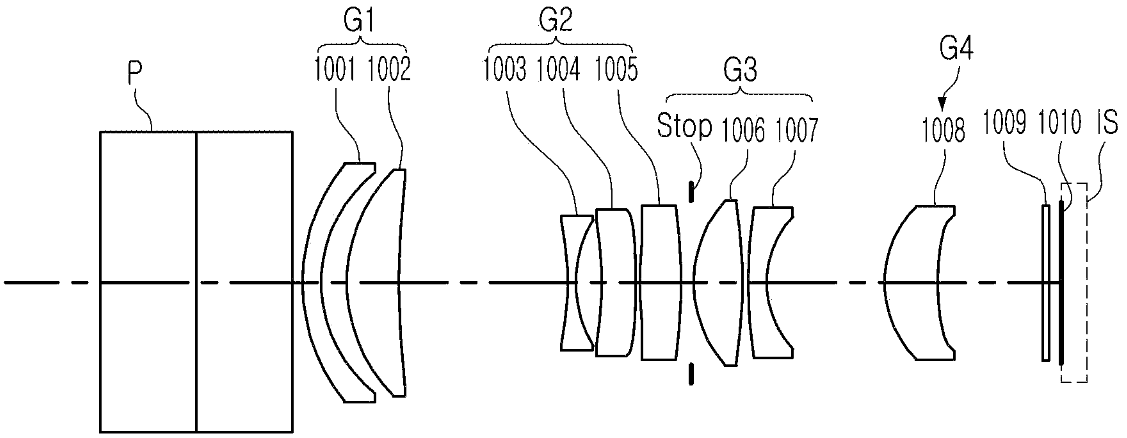
FIG. 30 is a diagram illustrating a telephoto mode of the optical imaging system of FIG. 28.

FIG. 28 is a diagram illustrating a wide-angle mode of an optical imaging system according to a tenth embodiment of the present disclosure, FIG. 29 is a diagram illustrating a normal mode of the optical imaging system of FIG. 28, and FIG. 30 is a diagram illustrating a telephoto mode of an optical imaging system of FIG. 28.

An optical imaging system according to a tenth embodiment of the present disclosure will be described with reference to FIGS. 28 to 30.

The optical imaging system according to the tenth embodiment of the present disclosure includes a first lens group G1, a second lens group G2, a third lens group G3, and a fourth lens group G4. The optical imaging system further includes a reflective member P disposed in front of the first lens group G1.

The first lens group G1 includes a first lens 1001 and a second lens 1002, the second lens group G2 includes a third lens 1003, a fourth lens 1004, and a fifth lens 1005, the third lens G3 includes a stop, a sixth lens 1006, and a seventh lens 1007, and the fourth lens G4 includes an eighth lens 1008 sequentially disposed from an object side of the optical imaging system.

In addition, the optical imaging system may further include a filter 1009 and an image sensor IS.

The optical imaging system according to the tenth embodiment of the present disclosure may focus an image on an imaging plane 1010. The imaging plane 1010 may refer to a surface on which an image is focused by the optical imaging system. As an example, the imaging plane 1010 may refer to one surface of the image sensor IS on which light is incident through the optical imaging system.

In the tenth embodiment of the present disclosure, the reflective member P may be a prism, but may also be provided as a mirror.

At least one lens group among the first to fourth lens groups G1 to G4 may be moved to change a total focal length of the optical imaging system. For example, the first lens group G1 and the third lens group G3 are fixed and the second lens group G2 is movable along the optical axis so that the total focal length of the optical imaging system may be changed. That is, as the second lens group G2 moves away from the object side of the optical imaging system toward an image side of the optical imaging system, the total focal length of the optical imaging system may be changed from the wide-angle mode to the normal mode, and then from the normal mode to the telephoto mode.

In addition, at least one lens group among the first to fourth lens groups G1 to G4 may be moved to correct a focus position according to a change in the total focal length of the optical imaging system. For example, when the total focal length of the optical imaging system is changed from the wide-angle mode to the telephoto mode, the fourth lens group G4 may be moved along the optical axis to correct the focus position.

Characteristics of each lens including a radius of curvature, a thickness of a lens or a distance between lenses, a refractive index, an Abbe number, and an effective radius are illustrated in Table 28 below.

TABLE 28

| Surface No. | Element | Radius of Curvature | Thickness or Distance | Refractive Index | Abbe Number | Effective Radius | Lens Group |
|---|---|---|---|---|---|---|---|
| Object | | Infinity | D0 | | | | |
| S1 | Prism | Infinity | 4 | 1.5168 | 64.2 | 6 | |
| S2 | | Infinity | 4 | 1.5168 | 64.2 | 5.62 | |
| S3 | | Infinity | 0.4 | | | 5.27 | |
| S4 | First | 7.532 | 0.73 | 1.6355 | 23.89 | 5 | First |
| S5 | Lens | 5.374 | 1.181 | | | 4.63 | Lens |
| S6 | Second | 6.613 | 2.3 | 1.535 | 55.73 | 4.73 | Group |
| S7 | Lens | 148.985 | D1 | | | 4.64 | |
| S8 | Third | −10.941 | 0.38 | 1.535 | 55.73 | 2.8 | Second |
| S9 | Lens | 5.245 | 0.948 | | | 2.68 | Lens |
| S10 | Fourth | −39.088 | 1.52 | 1.535 | 55.73 | 2.7 | Group |
| S11 | Lens | −19.187 | 0.15 | | | 3.1 | |
| S12 | Fifth | 19.162 | 1.67 | 1.6355 | 23.89 | 3.08 | |
| S13 | Lens | −150.267 | D2 | | | 3.2 | |
| S14 | Stop | Infinity | 0.15 | | | 3.45 | Third |
| S15 | Sixth | 4.793 | 2.07 | 1.535 | 55.73 | 3.41 | Lens |
| S16 | Lens | −30.573 | 0.15 | | | 3.3 | Group |
| S17 | Seventh | 11.493 | 0.8 | 1.6355 | 23.89 | 3.13 | |
| S18 | Lens | 3.947 | D3 | | | 2.79 | |
| S19 | Eighth | 4.853 | 2.27 | 1.535 | 55.73 | 3.2 | Fourth |
| S20 | Lens | 10.686 | D4 | | | 2.83 | Lens Group |
| S21 | Filter | Infinity | 0.21 | 1.5168 | 64.2 | 3.18 | |
| S22 | | Infinity | D5 | | | 5.27 | |
| S23 | Imaging Plane | Infinity | | | | | |

TABLE 29

| | Object at Infinity | | | | Object at Near Focus Position | | |
|---|---|---|---|---|---|---|---|
| Value | Wide-Angle Mode | Normal Mode | Telephoto Mode | Value | Wide-Angle Mode | Normal Mode | Telephoto Mode |
| D0 | Infinity | Infinity | Infinity | D0 | 400 | 400 | 600 |
| D1 | 1.29531 | 3.70647 | 6.91762 | D1 | 1.29531 | 3.70647 | 6.91762 |
| D2 | 6.12231 | 3.71115 | 0.5 | D2 | 6.12231 | 3.71115 | 0.5 |
| D3 | 2.1887 | 2.86291 | 4.8205 | D3 | 1.89997 | 2.40854 | 4.19204 |
| D4 | 7.0627 | 6.38849 | 4.4309 | D4 | 7.35143 | 6.84286 | 5.05936 |
| D5 | 0.1 | 0.1 | 0.1 | D5 | 0.1 | 0.1 | 0.1 |
| f | 10.3368 | 12.8047 | 17.2399 | MAG | 0.02501 | 0.03078 | 0.02759 |
| HFOV | 17.218 | 13.907 | 10.391 | HFOV | 16.978 | 13.637 | 10.283 |
| Fno | 1.986 | 1.93 | 1.908 | Fno | 1.975 | 1.912 | 1.852 |
| L | 39.69802 | 39.69802 | 39.69802 | L | 39.69802 | 39.69802 | 39.69802 |

In Table 29 above, D0 is an object distance, i.e., a distance on the optical axis between an object and a first surface of the reflective member P, D1 is a distance on the optical axis between the second lens 1002 and the third lens 1003, D2 is a distance on the optical axis between the fifth lens 1005 and the stop, D3 is a distance on the optical axis between the seventh lens 1007 and the eighth lens 1008, D4 is a distance on the optical axis between the eighth lens 1008 and the filter 1009, and D5 is a distance on the optical axis between the filter 1009 and the imaging plane 1010.

f is a total focal length of the optical imaging system, MAG is a magnification of the optical imaging system, HFOV is one half of a field of view of the optical imaging system, Fno is an f-number of the optical imaging system, and L is a distance on the optical axis from the first surface of the reflective member P to the imaging plane 1010.

The values in Table 29 above are listed for the wide-angle, normal, and telephoto modes for both an object at infinity and an object at a near focus position of the optical imaging system, i.e., a closest position of the object at which the optical imaging system can focus an image of the object.

A focal length fG1 of the first lens group G1 is 20.8622 mm, a focal length fG2 of the second lens group G2 is −12.4202 mm, and a focal length fG3 of the third lens group G3 is 19.1318 mm, and a focal length fG4 of the fourth lens group G4 is 14.633 mm.

The focal length of the first lens 1001 is −33.981 mm, the focal length of the second lens 1002 is 12.862 mm, the focal length of the third lens 1003 is −6.573 mm, the focal length of the fourth lens 1004 is 68.614 mm, the focal length of the fifth lens 1005 is 26.845 mm, the focal length of the sixth lens 1006 is 7.906 mm, the focal length of the seventh lens 1007 is −9.866 mm, and the focal length of the eighth lens 1008 is 14.633 mm.

One half of a diagonal length of the imaging plane of the image sensor (IMG HT) is 3.2 mm, and an entrance pupil diameter in the telephoto mode (EPDt) is 9.036 mm.

In the tenth embodiment of the present disclosure, the first lens group G1 has a positive refractive power overall, the second lens group G2 has a negative refractive power overall, the third lens group G3 has a positive refractive power overall, and the fourth lens group G4 has a positive refractive power overall.

The first lens 1001 has a negative refractive power, a first surface of the first lens 1001 is convex, and a second surface of the first lens 1001 is concave.

The second lens 1002 has a positive refractive power, a first surface of the second lens 1002 is convex, and a second surface of the second lens 1002 is concave.

The third lens 1003 has a negative refractive power, and first and second surfaces of the third lens 1003 are concave.

The fourth lens 1004 has a positive refractive power, a first surface of the fourth lens 1004 is concave, and a second surface of the fourth lens 1004 is convex.

The fifth lens 1005 has a positive refractive power, and first and second surfaces of the fifth lens 1005 are convex.

The sixth lens 1006 has a positive refractive power, and first and second surfaces of the sixth lens 1006 are convex. A stop is disposed in front of (e.g., an object-side surface) the sixth lens 1006.

The seventh lens 1007 has a negative refractive power, a first surface of the seventh lens 1007 is convex, and a second surface of the seventh lens 1007 is concave.

The eighth lens 1008 has a positive refractive power, a first surface of the eighth lens 1008 is convex, and the second surface of the eighth lens 1008 is concave.

Each surface of the first to eighth lenses 1001 to 1008 has aspherical coefficients as illustrated in Table 30 below. For example, both an object-side surface and an image-side surface of the first to eighth lenses 1001 to 1008 are aspherical surfaces.

TABLE 30

| | S4 | S5 | S6 | S7 | S8 | S9 | S10 | S11 |
|---|---|---|---|---|---|---|---|---|
| Conic Constant (K) | 0.276 | −0.239 | −1.946 | 13.478 | −7.611 | 0.715 | 12.883 | 33.433 |
| 4th Coefficient (A) | −6.204E−02 | −2.742E−02 | 4.255E−01 | 6.885E−02 | −1.233E−02 | −9.786E−02 | −1.235E−02 | 1.218E−02 |
| 6th Coefficient (B) | −1.068E−02 | −3.180E−02 | 8.853E−03 | 7.851E−03 | 1.622E−03 | 2.578E−02 | −1.136E−02 | −2.225E−02 |
| 8th Coefficient (C) | −3.962E−03 | −1.361E−02 | −4.491E−04 | −2.720E−03 | 1.635E−04 | −1.573E−02 | −7.837E−03 | 6.471E−05 |
| 10th Coefficient (D) | 8.587E−04 | −3.566E−03 | −4.533E−03 | −7.362E−03 | −5.485E−05 | −5.370E−03 | −6.947E−03 | −3.844E−04 |
| 12th Coefficient (E) | −1.127E−03 | −2.677E−03 | −4.186E−03 | −4.256E−03 | 3.657E−06 | −1.692E−03 | −2.202E−03 | −2.223E−05 |
| 14th Coefficient (F) | 5.870E−04 | 5.986E−04 | −2.486E−03 | −2.230E−03 | 1.604E−07 | −1.705E−03 | −1.558E−03 | 9.880E−04 |
| 16th Coefficient (G) | −1.455E−04 | −1.328E−04 | −1.225E−03 | −5.412E−05 | −2.973E−08 | −6.498E−06 | −4.996E−04 | 2.718E−04 |
| 18th Coefficient (H) | −1.324E−01 | 2.026E−04 | −5.223E−04 | 2.444E−04 | 1.186E−09 | −1.599E−04 | −2.472E−04 | 1.623E−04 |
| 20th Coefficient (J) | 2.523E−02 | 3.623E−04 | −7.764E−05 | 4.705E−04 | −1.348E−11 | 1.508E−04 | 9.131E−05 | 2.253E−04 |
| 22nd Coefficient (L) | −9.824E−03 | −7.937E−06 | −9.391E−05 | 2.581E−04 | 6.328E−05 | −8.707E−05 | 3.535E−05 | −3.992E−05 |

TABLE 30-continued

| | | | | | | | | |
|---|---|---|---|---|---|---|---|---|
| 24th Coefficient (M) | 0.000E+00 | 1.927E−04 | 1.970E−04 | 1.813E−04 | 0.000E+00 | 2.434E−05 | −3.221E−06 | −1.444E−04 |
| 26th Coefficient (N) | 0.000E+00 | 5.217E−05 | 2.058E−04 | −6.527E−05 | 0.000E+00 | 3.981E−05 | 5.628E−05 | 1.633E−04 |
| 28th Coefficient (O) | 0.000E+00 | −9.251E−05 | 2.212E−05 | −1.036E−04 | 0.000E+00 | −1.916E−05 | 5.533E−06 | −8.329E−05 |
| 30th Coefficient (P) | 0.000E+00 | −9.798E−05 | −2.408E−05 | −1.156E−05 | 0.000E+00 | 2.506E−05 | −1.596E−06 | 4.171E−05 |

| | S12 | S13 | S15 | S16 | S17 | S18 | S19 | S20 |
|---|---|---|---|---|---|---|---|---|
| Conic Constant (K) | −80.000 | −28.611 | −0.536 | 62.663 | −34.001 | −0.177 | 0.269 | 12.575 |
| 4th Coefficient (A) | −7.195E−02 | −1.178E−01 | −4.558E−02 | −1.249E−01 | −3.382E−02 | −4.341E−02 | 4.401E−02 | 6.814E−02 |
| 6th Coefficient (B) | −1.272E−02 | 1.443E−03 | −1.489E−02 | 5.117E−02 | 3.033E−02 | 1.408E−02 | 1.585E−02 | −4.204E−03 |
| 8th Coefficient (C) | 2.154E−03 | −3.540E−04 | −3.392E−03 | −2.221E−02 | −2.809E−02 | −4.482E−03 | −3.066E−04 | −2.478E−03 |
| 10th Coefficient (D) | 6.405E−04 | 7.921E−04 | 3.249E−04 | 2.931E−03 | −8.154E−04 | 2.071E−03 | 1.388E−03 | −1.541E−03 |
| 12th Coefficient (E) | −9.023E−04 | −4.781E−04 | 3.743E−04 | −1.203E−02 | −9.399E−03 | −6.775E−04 | −5.211E−04 | −5.110E−04 |
| 14th Coefficient (F) | 6.040E−04 | 2.289E−04 | 2.999E−04 | 1.288E−03 | 5.536E−03 | 3.180E−04 | 3.464E−04 | −3.162E−04 |
| 16th Coefficient (G) | −1.038E−04 | −8.781E−05 | −9.356E−05 | −4.044E−04 | 7.967E−04 | −4.212E−04 | −2.189E−04 | −5.534E−05 |
| 18th Coefficient (H) | 4.029E−05 | 6.255E−05 | −3.126E−05 | 4.220E−03 | 1.691E−03 | 2.410E−04 | 1.857E−04 | −1.053E−04 |
| 20th Coefficient (J) | 1.224E−04 | −3.823E−07 | −2.178E−04 | 1.322E−03 | −2.203E−03 | −1.613E−04 | −9.871E−05 | −1.274E−05 |
| 22nd Coefficient (L) | 1.425E−05 | 1.926E−05 | −1.140E−05 | 2.751E−03 | −4.632E−04 | 9.885E−05 | 9.506E−05 | −2.701E−05 |
| 24th Coefficient (M) | −1.216E−04 | −3.031E−05 | 0.000E+00 | 5.741E−04 | −1.924E−03 | −3.848E−05 | −4.690E−05 | 3.409E−05 |
| 26th Coefficient (N) | 1.165E−04 | 2.009E−05 | 0.000E+00 | 1.320E−03 | −5.313E−04 | 2.685E−05 | 3.346E−05 | −2.264E−05 |
| 28th Coefficient (O) | −6.619E−05 | −1.772E−05 | 0.000E+00 | 1.117E−04 | −9.015E−04 | −1.429E−05 | −5.136E−05 | 3.358E−05 |
| 30th Coefficient (P) | 1.708E−05 | 8.854E−06 | 0.000E+00 | 2.127E−04 | −9.486E−05 | 2.260E−06 | 2.048E−05 | −1.774E−05 |

Table 31 below lists the focal lengths fG1, fG2, fG3, and fG4 of the first to fourth lens groups G1, G2, G3, and G4 in the first to tenth embodiments.

TABLE 31

| Embodiment | fG1 | fG2 | fG3 | fG4 |
|---|---|---|---|---|
| 1 | 27.3746 | −11.8531 | 19.1040 | 11.530 |
| 2 | 25.9987 | −11.7160 | 18.5459 | 12.331 |
| 3 | 20.5641 | −12.2399 | 19.2467 | 14.609 |
| 4 | 23.1731 | −13.3389 | 17.1871 | 14.868 |

TABLE 31-continued

| Embodiment | fG1 | fG2 | fG3 | fG4 |
|---|---|---|---|---|
| 5 | 22.5202 | −11.4380 | 18.5548 | 14.453 |
| 6 | 20.7242 | −12.0816 | 16.6347 | 16.206 |
| 7 | 19.4741 | −11.3364 | 17.0254 | 14.941 |
| 8 | 20.1618 | −11.3913 | 18.7194 | 14.105 |
| 9 | 20.1516 | −11.4013 | 19.5130 | 14.142 |
| 10 | 20.8622 | −12.4202 | 19.1318 | 14.633 |

Table 32 below lists the focal lengths f1 to f8 of the first to eighth lenses in the first to tenth embodiments.

TABLE 32

| Embodiment | f1 | f2 | f3 | f4 | f5 | f6 | f7 | f8 |
|---|---|---|---|---|---|---|---|---|
| 1 | −40.550 | 15.774 | −7.105 | 67.098 | 37.618 | 7.774 | −7.979 | 11.530 |
| 2 | −41.474 | 15.478 | −6.991 | 64.057 | 37.723 | 7.923 | −8.526 | 12.331 |
| 3 | −33.613 | 12.729 | −6.541 | 67.506 | 26.832 | 7.894 | −9.850 | 14.609 |
| 4 | −34.940 | 13.578 | −6.774 | 66.463 | 27.321 | 7.941 | −10.044 | 14.868 |
| 5 | −36.682 | 13.656 | −6.788 | 75.764 | 34.465 | 7.948 | −9.756 | 14.453 |
| 6 | −34.006 | 12.888 | −6.608 | 72.702 | 26.597 | 7.906 | −10.514 | 16.206 |
| 7 | −33.432 | 12.311 | −6.558 | 83.839 | 26.466 | 7.889 | −10.014 | 14.941 |
| 8 | −33.044 | 12.389 | −6.567 | 81.462 | 27.609 | 7.937 | −9.550 | 14.105 |
| 9 | −33.712 | 12.383 | −6.570 | 81.269 | 28.340 | 7.933 | −9.524 | 14.142 |
| 10 | −33.981 | 12.862 | −6.573 | 68.614 | 26.845 | 7.906 | −9.866 | 14.633 |

Table 33 below lists the values of SD, IMG HT, EPDt, LG3i, L, LG34 (infinity), LG34 (near), fG2, fG4, Fnot (infinity), Fnow (infinity), Fnot (near), Fnow (near), SD/IMG HT, EPDV/(2×IMG HT), LGSV/L, LG34/LG3i (infinity), LG34/LG3i (near), fG2/fG4, Fnot/Fnow (infinity), and Fnot/Fnow (near) in the first to tenth embodiments.

TABLE 33

| Value | Emb. 1 | Emb. 2 | Emb. 3 | Emb. 4 | Emb. 5 |
|---|---|---|---|---|---|
| SD | 3.35 | 3.08 | 3.45 | 3.5 | 3.45 |
| IMG HT | 3.2 | 3.2 | 3.2 | 3.2 | 3.2 |
| EPDt | 7.626 | 7.629 | 8.941 | 8.460 | 8.579 |
| LG3i | 15.94305 | 16.543 | 14.84371 | 16.19813 | 16.22514 |
| L | 39.69971 | 39.692 | 39.68241 | 39.7483 | 39.75286 |
| LG34 (infinity) | 2.40407 | 3.06362 | 4.84 | 3.48477 | 4 |
| LG34 (near) | 1.89978 | 2.55069 | 4.21553 | 2.92921 | 3.44282 |
| fG2 | −11.8531 | −11.7160 | −12.2399 | −13.3389 | −11.4380 |
| fG4 | 11.530 | 12.331 | 14.609 | 14.868 | 14.453 |
| Fnot (infinity) | 2.258 | 2.258 | 1.928 | 2.036 | 2.009 |
| Fnow (infinity) | 2.023 | 2.312 | 2.014 | 2.062 | 2.037 |
| Fnot (near) | 2.313 | 2.304 | 1.862 | 1.998 | 1.97 |
| Fnow (near) | 2.054 | 2.344 | 2.003 | 2.055 | 2.03 |
| SD/IMG HT | 1.05 | 0.96 | 1.08 | 1.09 | 1.08 |
| EPDt/(2xIMG HT) | 1.19 | 1.19 | 1.40 | 1.32 | 1.34 |
| LG3i/L | 0.40 | 0.42 | 0.37 | 0.41 | 0.41 |
| LG34/LG3i (infinity) | 0.15 | 0.19 | 0.33 | 0.22 | 0.25 |
| LG34/LG3i (near) | 0.12 | 0.15 | 0.28 | 0.18 | 0.21 |
| fG2/fG4 | −1.03 | −0.95 | −0.84 | −0.90 | −0.79 |
| Fnot/Fnow (infinity) | 1.12 | 0.98 | 0.96 | 0.99 | 0.99 |
| Fnot/Fnow (near) | 1.13 | 0.98 | 0.93 | 0.97 | 0.97 |

| Value | Emb. 6 | Emb. 7 | Emb. 8 | Emb. 9 | Emb. 10 |
|---|---|---|---|---|---|
| SD | 3.45 | 3.45 | 3.45 | 3.45 | 3.45 |
| IMG HT | 3.2 | 3.2 | 3.2 | 3.2 | 3.2 |
| EPDt | 8.639 | 8.864 | 8.842 | 8.655 | 9.036 |
| LG3i | 14.84958 | 14.85075 | 15.52923 | 15.73137 | 14.8514 |
| L | 39.69401 | 39.69512 | 39.75544 | 39.74355 | 39.69802 |
| LG34 (infinity) | 5.04327 | 5 | 4.53142 | 4.57997 | 4.8205 |
| LG34 (near) | 4.34719 | 4.33406 | 3.93496 | 3.9967 | 4.19204 |
| fG2 | −12.0816 | −11.3364 | −11.3913 | −11.4013 | −12.4202 |
| fG4 | 16.206 | 14.941 | 14.105 | 14.142 | 14.633 |
| Fnot (infinity) | 1.994 | 1.944 | 1.947 | 1.992 | 1.908 |
| Fnow (infinity) | 1.959 | 2.05 | 2.032 | 2.079 | 1.986 |
| Fnot (near) | 1.914 | 1.891 | 1.905 | 1.927 | 1.852 |
| Fnow (near) | 1.946 | 2.037 | 2.025 | 2.072 | 1.975 |

TABLE 33-continued

| | | | | | |
|---|---|---|---|---|---|
| SD/IMG HT | 1.08 | 1.08 | 1.08 | 1.08 | 1.08 |
| EPDt/(2xIMG HT) | 1.35 | 1.39 | 1.38 | 1.35 | 1.41 |
| LG3i/L | 0.37 | 0.37 | 0.39 | 0.40 | 0.37 |
| LG34/LG3i (infinity) | 0.34 | 0.34 | 0.29 | 0.29 | 0.32 |
| LG34/LG3i (near) | 0.29 | 0.29 | 0.25 | 0.25 | 0.28 |
| fG2/fG4 | −0.75 | −0.76 | −0.81 | −0.81 | −0.85 |
| Fnot/Fnow (infinity) | 1.02 | 0.95 | 0.96 | 0.96 | 0.96 |
| Fnot/Fnow (near) | 0.98 | 0.93 | 0.94 | 0.93 | 0.94 |

As described above, in the optical imaging system according to embodiments of the present disclosure, an optical zoom function may be implemented by varying a focal length of the optical imaging system.

While this disclosure includes specific examples, it will be apparent after an understanding of the disclosure of this application that various changes in form and details may be made in these examples without departing from the spirit and scope of the claims and their equivalents. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:

a first lens group, a second lens group, a third lens group, and a fourth lens group sequentially disposed in ascending numerical order along an optical axis of the optical imaging system from an object side of the optical imaging system toward an image side of the optical imaging system, at least one lens group among the first lens group to the fourth lens group being configured to be movable along the optical axis; and a reflective member disposed on an object side of the first lens group and comprising a reflective surface configured to change an optical path of the optical imaging system, wherein the first lens group has a positive refractive power, 0.8≤Fnot/Fnow≤1.3 is satisfied, where Fnot is an F-number of the optical imaging system in a telephoto mode of the optical imaging system, and Fnow is an F-number of the optical imaging system in a wide-angle mode of the optical imaging system, the first lens group comprises a first lens and a second lens sequentially disposed in ascending numerical order along the optical axis from an object side of the first lens group toward an image side of the first lens group, and one of the first lens and the second lens has a positive focal length and an Abbe number of 50 or more, and another one of the first lens and the second lens has a negative focal length and an Abbe number of 30 or less.

2. The optical imaging system of claim 1, wherein all lenses included in the first lens group to the fourth lens group are made of plastic.

3. The optical imaging system of claim 2, wherein all lenses included in the first lens group to the fourth lens group have a refractive index of 1.7 or less and an Abbe number between 20 and 60.

4. The optical imaging system of claim 1, wherein the second lens group has a negative refractive power, comprises at least two lenses, and is configured to move away from the object side of the optical imaging system toward the image side of the optical imaging system to narrow a field of view of the optical imaging system.

5. The optical imaging system of claim 4, wherein the first lens group and the third lens group are fixedly disposed, and the fourth lens group is configured to move along the optical axis to correct a focus position of the optical imaging system.

6. The optical imaging system of claim 5, wherein −1.2≤fG2/fG4≤−0.7 is satisfied, where fG2 is a focal length of the second lens group, and fG4 is a focal length of the fourth lens group.

7. The optical imaging system of claim 5, wherein LG34/LG3i≤0.4 is satisfied, where LG34 is a distance along the optical axis from an image-side surface of a rearmost lens among lenses included in the third lens group to an object-side surface of a frontmost lens among lenses included in the fourth lens group in the telephoto mode, and LG3i is a distance along the optical axis from an object-side surface of a frontmost lens among lenses included in the third lens group to an imaging plane of the optical imaging system.

8. The optical imaging system of claim 5, wherein 0.3≤LG3i/L≤0.7 is satisfied, where LG3i is a distance along the optical axis from an object-side surface of a frontmost lens among lenses included in the third lens group to an imaging plane of the optical imaging system, and L is a distance along the optical axis from a first surface of the reflective member to the imaging plane.

9. The optical imaging system of claim 4, wherein each of the third lens group and the fourth lens group has a positive refractive power.

10. The optical imaging system of claim 4, wherein the third lens group comprises a stop and a plurality of lenses sequentially disposed from an object side of the third lens group toward an image side of the third lens group, and a lens disposed closest to the stop among the plurality of lenses included in the third lens group has a positive refractive power.

11. The optical imaging system of claim 10, wherein SD/IMG HT≤1.2 is satisfied, where SD is a radius of the stop, and IMG HT is one half of a diagonal length of an imaging plane of the optical imaging system.

12. The optical imaging system of claim 10, wherein the third lens group comprises two lenses, one of the two lenses of the third lens group has a positive focal length and an Abbe number of 50 or more, and another one of the two lenses of the third lens group has a negative focal length and an Abbe number of 30 or less.

13. The optical imaging system of claim 1, wherein EPDt/(2×IMG HT)≤1.5 is satisfied, where EPDt is an entrance pupil diameter of the optical imaging system in the telephoto mode, and IMG HT is one half of a diagonal length of an imaging plane of the optical imaging system.

14. The optical imaging system of claim 1, wherein the fourth lens group comprises a lens having an Abbe number greater than 50.

15. The optical imaging system of claim 1, wherein the first lens group comprises at least one lens having a meniscus shape that is convex toward the object side of the optical imaging system, the second lens group comprises a lens having a meniscus shape that is convex toward the image side of the optical imaging system, the third lens group comprises a lens having a meniscus shape that is convex toward the object side of the optical imaging system, and the fourth lens group comprises a lens having a meniscus shape that is convex toward the object side of the optical imaging system.

16. An optical imaging system comprising:

a first lens group having a positive refractive power, a second lens group having a negative refractive power, a third lens group having a positive refractive power, and a fourth lens group having a positive refractive power sequentially disposed in ascending numerical order along an optical axis of the optical imaging system from an object side of the optical imaging system toward an image side of the optical imaging system, at least one lens group among the first lens group to the fourth lens group being configured to be movable along the optical axis to change a focal length of the optical imaging system between a wide-angle mode and a telephoto mode; and a reflective member disposed on an object side of the first lens group and comprising a reflective surface configured to change an optical path of the optical imaging system, wherein LG34/LG3i≤0.4 is satisfied, where LG34 is a distance along the optical axis from an image-side surface of a rearmost lens among lenses included in the third lens group to an object-side surface of a frontmost lens among lenses included in the fourth lens group in the telephoto mode, and LG3i is a distance along the optical axis from an object-side surface of a frontmost lens among lenses included in the third lens group to an imaging plane of the optical imaging system.

17. The optical imaging system of claim 16, wherein 0.8≤Fnot/Fnow≤1.3 is satisfied, where Fnot is an F-number of the optical imaging system in the telephoto mode, and Fnow is an F-number of the optical imaging system in the wide-angle mode.

18. The optical imaging system of claim 16, wherein the first lens group comprises a first lens and a second lens sequentially disposed in ascending numerical order along the optical axis from an object side of the first lens group toward an image side of the first lens group, and one of the first lens and the second lens has a positive focal length and an Abbe number of 50 or more, and another one of the first lens and the second lens has a negative focal length and an Abbe number of 30 or less.

19. The optical imaging system of claim 16, wherein the third lens group comprises a stop and a plurality of lenses sequentially disposed from an object side of the third lens group toward an image side of the third lens group, and a lens disposed closest to the stop among the plurality of lenses included in the third lens group has a positive refractive power.

20. An optical imaging system comprising:

a first lens group having a positive refractive power, a second lens group having a negative refractive power, a third lens group having a positive refractive power, and a fourth lens group having a positive refractive power sequentially disposed in ascending numerical order along an optical axis of the optical imaging system from an object side of the optical imaging system toward an image side of the optical imaging system, at least one lens group among the first lens group to the fourth lens group being configured to be movable along the optical axis to change a focal length of the optical imaging system between a wide-angle mode and a telephoto mode, and at least other lens group among the first lens group to the fourth lens group being configured to be movable along the optical axis to change a focal position of the optical imaging system; and a reflective member disposed on an object side of the first lens group and comprising a reflective surface configured to change an optical path of the optical imaging system, wherein 0.3≤LG3i/L≤0.7 is satisfied, where LG3i is a distance along the optical axis from an object-side surface of a frontmost lens among lenses included in the third lens group to an imaging plane of the optical imaging system, and L is a distance along the optical axis from a first surface of the reflective member to the imaging plane.

21. The optical imaging system of claim 20, wherein 0.8≤Fnot/Fnow≤1.3 is satisfied, where Fnot is an F-number of the optical imaging system in the telephoto mode, and Fnow is an F-number of the optical imaging system in the wide-angle mode.

22. The optical imaging system of claim 20, wherein −1.2≤fG2/fG4≤−0.7 is satisfied, where fG2 is a focal length of the second lens group, and fG4 is a focal length of the fourth lens group.

23. The optical imaging system of claim 20, wherein the first lens group comprises at least one lens having a meniscus shape that is convex toward the object side of the optical imaging system, the second lens group comprises a lens having a meniscus shape that is convex toward the image side of the optical imaging system, the third lens group comprises a lens having a meniscus shape that is convex toward the object side of the optical imaging system, and the fourth lens group comprises a lens having a meniscus shape that is convex toward the object side of the optical imaging system.

* * * * *